US012082602B2

United States Patent
Zhao et al.

(10) Patent No.: US 12,082,602 B2
(45) Date of Patent: *Sep. 10, 2024

(54) METHOD FOR PRODUCING STABILIZED WHOLE WHEAT FLOUR

(71) Applicant: INTERCONTINENTAL GREAT BRANDS LLC, East Hanover, NJ (US)

(72) Inventors: Bin Zhao, East Hanover, NJ (US); Ning Zhou, East Hanover, NJ (US); Timothy S. Hansen, LaGrange, IL (US); Michael A. Duffin, Toronto (CA); Domenico R. Cassone, Branchburg, NJ (US); Diane L. Gannon, Perrysburg, OH (US); Lynn C. Haynes, Morris Plains, NJ (US); James M. Manns, Stockholm, NJ (US); Jeanny E. Zimeri, Budd Lake, NJ (US); Peter Worfolk, Innisfil (CA); Anthony Pracek, Mississauga (CA)

(73) Assignee: Intercontinental Great Brands LLC, East Hanover, NJ (US)

( * ) Notice: Subject to any disclaimer, the term of this patent is extended or adjusted under 35 U.S.C. 154(b) by 434 days.

This patent is subject to a terminal disclaimer.

(21) Appl. No.: 16/254,746

(22) Filed: Jan. 23, 2019

(65) Prior Publication Data

US 2019/0150487 A1    May 23, 2019

Related U.S. Application Data

(63) Continuation of application No. 14/111,679, filed as application No. PCT/US2012/033500 on Apr. 13, 2012, now Pat. No. 10,212,958.

(Continued)

(51) Int. Cl.
*A23L 7/10*       (2016.01)
*A21D 2/14*       (2006.01)
(Continued)

(52) U.S. Cl.
CPC .............. *A23L 7/197* (2016.08); *A21D 2/145* (2013.01); *A21D 2/36* (2013.01); *A21D 2/38* (2013.01);
(Continued)

(58) Field of Classification Search
None
See application file for complete search history.

(56) References Cited

U.S. PATENT DOCUMENTS

| 2,930,699 A | 3/1960 | De Sollano |
| 3,832,472 A | 8/1974 | Rodgers |

(Continued)

FOREIGN PATENT DOCUMENTS

| EP | 1900290 | 3/2008 |
| JP | 59232058 | 12/1984 |

(Continued)

OTHER PUBLICATIONS

Australian Examination Report No. 1 for corresponding Australian Application No. 2012242674, dated May 8, 2014, 4 pages.
(Continued)

*Primary Examiner* — Lien T Tran
(74) *Attorney, Agent, or Firm* — Fitch, Even, Tabin & Flannery LLP

(57) ABSTRACT

A stabilized flour, such as stabilized whole grain wheat flour, exhibiting unexpectedly superior extended shelf life and superior biscuit baking functionality, may be produced with or without heating to inhibit lipase by subjecting whole grains or a bran and germ fraction or component to treatment with a lipase inhibitor, such as an acid or green tea extract. Treatment with the lipase inhibitor may be performed during tempering of the whole grains or berries or during hydration of the bran and germ fraction or component.

18 Claims, 7 Drawing Sheets

Related U.S. Application Data

(60) Provisional application No. 61/457,514, filed on Apr. 14, 2011.

(51) Int. Cl.
    *A21D 2/36*     (2006.01)
    *A21D 2/38*     (2006.01)
    *A21D 6/00*     (2006.01)
    *A21D 13/02*     (2006.01)
    *B02B 1/08*     (2006.01)

(52) U.S. Cl.
    CPC ............... *A21D 6/00* (2013.01); *A21D 13/02* (2013.01); *A23L 7/198* (2016.08); *B02B 1/08* (2013.01); *A23V 2002/00* (2013.01)

(56) References Cited

U.S. PATENT DOCUMENTS

| | | |
|---|---|---|
| 3,851,085 A | 11/1974 | Rodgers |
| 3,958,016 A | 5/1976 | Galle |
| 4,089,259 A | 5/1978 | Stickle |
| 4,737,371 A | 4/1988 | Bookwalter |
| 4,956,190 A | 9/1990 | Chawan |
| 5,066,506 A | 11/1991 | Creighton |
| 5,169,660 A | 12/1992 | Collins |
| 5,352,473 A | 10/1994 | Chiqurupati |
| 5,395,639 A | 3/1995 | Chawan |
| 6,497,909 B1 | 12/2002 | Metzger |
| 6,524,631 B1 | 2/2003 | Dicks |
| 6,616,957 B1 | 9/2003 | Wilhelm |
| 6,858,247 B2 | 2/2005 | Sakai |
| 7,118,688 B2 | 10/2006 | Mora-Gutierrez |
| 7,258,888 B2 | 8/2007 | Dreese |
| 2003/0044505 A1 | 3/2003 | Chen |
| 2003/0104103 A1* | 6/2003 | Monsalve-Gonzalez ..................... A23L 7/135 426/549 |
| 2005/0123667 A1 | 6/2005 | Sakuma |
| 2005/0255219 A1 | 11/2005 | Dreese |
| 2006/0251791 A1 | 11/2006 | Rubio |
| 2007/0184175 A1 | 8/2007 | Rubio |
| 2007/0286932 A1 | 12/2007 | Horgan |
| 2007/0292583 A1 | 12/2007 | Haynes |
| 2008/0311274 A1 | 12/2008 | Xu |
| 2009/0065745 A1 | 3/2009 | Kido |
| 2012/0034343 A1 | 2/2012 | Mikkelsen |

FOREIGN PATENT DOCUMENTS

| | | |
|---|---|---|
| JP | 03219872 | 9/1991 |
| RU | 2220001 | 12/2003 |
| WO | 99371469 | 7/1999 |
| WO | 2004069179 | 8/2004 |
| WO | 2007149320 | 12/2007 |

OTHER PUBLICATIONS

Australian Examination Report No. 2 for corresponding Australian Application No. 2012242674, dated Apr. 24, 2015, 4 pages.
Canadian Office Action for corresponding Canadian Application No. 2,833,045 dated Feb. 20, 2018, 4 pages.
Chinese Office Action for corresponding Chinese Application No. 201280029090.6 dated Aug. 5, 2015, 54 pages.
Chinese Office Action for corresponding Chinese Application No. 201280029090.6 dated Oct. 10, 2014, 55 pages.
European Office Action for corresponding European Application No. 12720718.1-1105 dated Jun. 27, 2018, 7 pages.
International Search Report and Written Opinion dated Jan. 4, 2013 for PCT/US2012/033500.
Japanese Office Action for corresponding Japanese Application No. 2014-505334 dated Apr. 5, 2016, 14 pages.
Japanese Office Action for corresponding Japanese Application No. 2014-505334 dated Aug. 23, 2016, 5 pages.
Mexican Office Action for corresponding Mexican Application No. MX/a/2013/011962 dated Dec. 1, 2017, 12 pages.
Prabhakar et al., A Simple Chemical Method for Stabilization of Rice Bran, JAOCs, vol. 63, No. 5 (May 1986), 644-646.
Prakash et al., Physico-chemical and Nutritional Traits of Rice Bran Protein Concentrate-based Weaning Goods, J. Food Sci. Technol. 1995, vol. 32, No. 5, 395-399.
Rizzello, Carlo Giuseppe, et al., "Effect of Sourdough Fermentation on Stabilisation, and Chemical and Nutritional Characteristics of Wheat Germ," Food Chemisty, vol. 119, 2010, pp. 1079-1089.
Brazilian Office Action for corresponding Brazilian Application No. 1120130263326 dated Mar. 3, 2021, 7 pages.
Brazilian Office Action for corresponding Brazilian Application No. 12 2021 000227 4 dated Mar. 17, 2021, 6 pages.
Brazilian Preliminary Office Action for corresponding Brazilian Application No. 1120130263326 dated Oct. 13, 2020, 3 pages.
Canadian Office Action for corresponding Canadian Application No. 3,060,899 dated Mar. 15, 2021, 3 pages.
Canadian Office Action for corresponding Canadian Application No. 3,060,899 dated Oct. 6, 2021, 3 pages.
Mexican Office Action for corresponding Mexican Application No. MX/a/2019/008100 dated Dec. 2, 2022, 8 pages.
Mexican Office Action for corresponding Mexican Application No. MX/a/2019/008100 dated May 30, 2023, 13 pages.
Ni Fangyan et al., Analysis on Influence Factors of Lactic Acid Retention Capacity of the High-quality Strong Gluten Nheat, Cereal and Feed Industry, Mar. 2006, pp. 10-13 (English abstract).

* cited by examiner

METHOD FOR PRODUCING STABILIZED WHOLE WHEAT FLOUR

CROSS REFERENCE TO RELATED APPLICATIONS

This application is a continuation of application Ser. No. 14/111,679, filed Dec. 23, 2013 Now U.S. Pat. No. 10,212,958, which is a U.S. national phase application of International Application No. PCT/US12/33500, filed Apr. 13, 2012, designating the United States, which claims the benefit of U.S. Provisional Application No. 61/457,514, filed on Apr. 14, 2011, which is incorporated by reference herein its entirety.

FIELD OF THE INVENTION

The present invention relates to methods for extending the shelf life of whole grain flours through inhibition or reduction of the enzymes that produce rancidity. The present invention also relates to stabilized whole grain flours and to food products, such as baked goods made from such stabilized flours.

BACKGROUND

The free fatty acid content of whole grain flour increases during storage, which subsequently results in rancid flavor and short shelf life of the whole grain flour and products made with the whole grain flour. Lipase is the enzyme in whole grain flour that hydrolyzes lipids to produce free fatty acids. Whole grain wheat flours containing bran and germ are less stable than white refined wheat flours because generally the enzymes responsible for causing production of free fatty acids and rancidity, and the lipids upon which the enzymes act are largely removed with the bran and germ during milling of the whole grains or berries to produce white refined wheat flours. Storage of whole grain wheat flours for as little as 30 days at 75° F. can result in the development of undesirable odors and flavors in products made with the whole grain flour. Concurrent with the development of off-flavors is an increase in the amount of free fatty acids in the flours, correlated with increased rate of oxygen uptake in the flours and the formation of the oxidative components of rancidity. Decreasing particle size increases the rate and extent of the deterioration of grain components. Heat and moisture treatment is commonly used to inactivate enzymes responsible for flour deterioration, although it is recently shown to contribute to oxidative rancidity as measured by hexanal formation, a common marker used to detect oxidative rancidity, in oat flour. This increase in oxidative rancidity is believed to be due to disintegration of cellular structures, such as by milling and heat and moisture treatment, that tend to stabilize lipids, or due to inactivation of heat-labile antioxidants. Also, the use of heat and moisture to inactivate enzymes tends to result in protein denaturization and starch gelatinization which can adversely affect protein functionality and starch functionality which in turn can adversely affect dough machinability and baking characteristics. Increasing stabilization temperatures, moisture contents and treatment times to achieve greater enzyme inactivation tends to exacerbate problems with protein functionality and starch functionality.

Lipase, which causes hydrolytic rancidity in milled products of sound, ungerminated wheat, is found almost exclusively in the bran component. The other key lipid-degrading enzyme, lipoxygenase (LPO), is present almost exclusively in the germ and also is involved in the development of rancidity. Thus, bran-containing wheat flours or graham flours are much more susceptible to the development of rancidity than are white flours which contain little or no bran and germ.

Enzyme-catalyzed lipid degradation that occurs in high extraction wheat flour, causing rancidity in such flour, is believed to occur by the action of lipase followed by the action of LPO. It is believed that when lipase, the enzyme found almost exclusively in the bran portion of the grain, is activated during milling, it reacts with unstable oils naturally occurring in the grain and breaks down the unstable oils to free fatty acids (FFA). This process may take weeks or even months. Then, LPO, the enzyme found almost exclusively in the germ portion of the grain, oxidizes FFA in the presence of oxygen, producing volatile breakdown products such as peroxides that, in turn, generate rancid aldehydes. In the absence of moisture, oxidation of FFA is also a very slow process and can take up to several weeks until noticeable amounts of rancid aldehydes can be detected. However, in the presence of moisture, or water, that is normally added to wheat flour in large amounts during the dough work-up stage, enzyme-catalyzed oxidation of free fatty acids tends to proceed to a great extent very quickly, causing formation of large amounts of rancid aldehydes in a matter of just a few minutes.

Accordingly, there is a long felt need for a method of producing a whole grain flour that is stabilized against enzymatic degradation.

SUMMARY

In an embodiment, a stabilized flour, such as stabilized whole grain wheat flour, exhibiting unexpectedly superior extended shelf life and superior biscuit baking functionality, may be produced with or without heating to inhibit or inactivate lipase by subjecting whole grains or a bran and germ fraction or component to treatment with a lipase inhibitor to obtain a stabilized flour having a free fatty acid content of less than 4200 ppm when stored at 100° F. for 30 days wherein the amounts of the inhibitor during treatment is at least 0.1 moles of inhibitor per 100 lbs. of whole grains. In embodiments of the invention, the treatment with the lipase inhibitor is delivered in an aqueous solution with a concentration of at least 0.8 molar and may reduce the pH of the whole grain flour, bran and germ fraction or component to a pH of less than 6, preferably less than or equal to 5.8, for example from 4.4 to 5.8. In another embodiment, treatment with the lipase inhibitor may be performed during tempering of the whole grains or during hydration of the bran and germ fraction or component.

In another embodiment, a method for producing stabilized whole grain flour including bran, germ and endosperm, with extended shelf life and improved baking functionality is disclosed and includes the steps of treating the bran and germ with a lipase inhibitor; and producing a stabilized whole grain flour wherein starch gelatinization may be less than 10%, as measured by differential scanning calorimetry and wherein the lactic acid solvent retention capacity is greater than 70%.

In yet another embodiment, a stabilized whole grain flour including bran, germ and endosperm with extended shelf life and improved baking functionality is disclosed, wherein the stabilized whole grain flour has a free fatty acid content of less than 4200 ppm when stored at 100° F. for 30 days, a starch gelatinization of less than 10%, as measured by differential scanning calorimetry and wherein the lactic acid solvent retention capacity is greater than 70%.

In another aspect of the invention, the bran and germ may be treated with the lipase inhibitor after milling of the whole grains.

In another embodiment of the invention, baked goods containing stabilized whole grain flour, at least one sugar, at least one oil or fat, and a lipase inhibitor which stabilizes the whole grain flour are provided where the baked goods have positive sensory attributes which are increased and negative sensory attributes are decreased compared to a control produced without stabilization treatment or using heat stabilization alone without a lipase inhibitor, by at least 3%, based upon sensory evaluation by an expert taste panel using a scale of 1 to 100 where a rating of 1 has the lowest intensity, and a rating of 100 has the highest intensity of the sensory attribute.

DETAILED DESCRIPTION OF THE INVENTION

Figure 1:
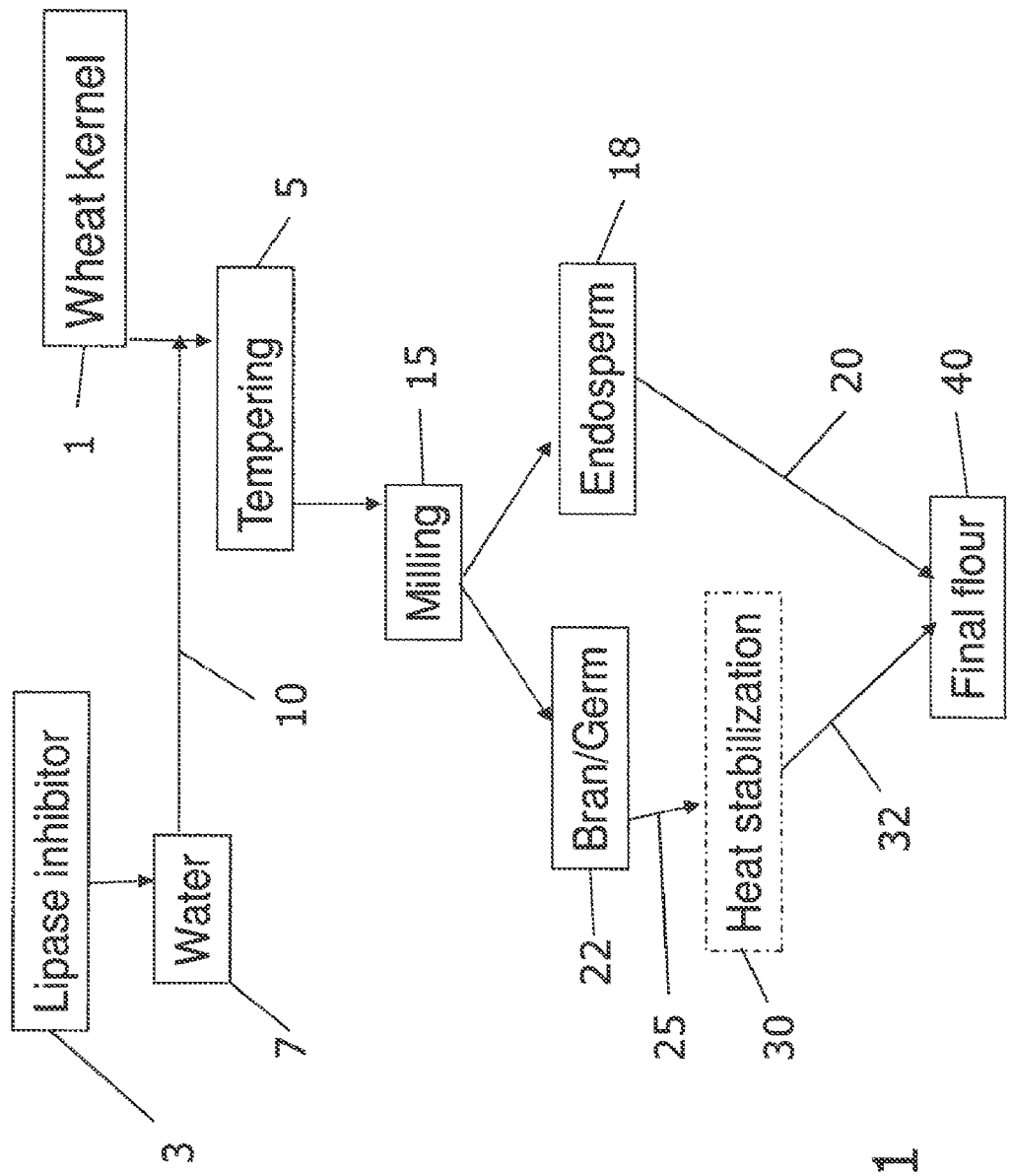
FIG. 1 shows a block flow process schematic diagram for the production of stabilized whole grain flour where treatment of whole grains with a lipase inhibitor is conducted during tempering in accordance with methods of the present invention.

Reference now will be made to certain detailed aspects of various embodiments of the invention. It is to be understood that the disclosed embodiments are merely exemplary of the invention that may be embodied in numerous and alternative forms. Therefore, specific details disclosed herein are not to be interpreted as limiting, but merely as a representative basis for any aspect of the invention and/or as a representative basis for teaching one skilled in the art to variously employ the invention.

Except in the examples, or where otherwise expressly indicated, all numerical quantities in this description indicating amounts of material and/or use are to be understood as modified by the word "about" in describing the broadest scope of the invention. Practice within the numerical limits stated is generally preferred.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way. Notably, the figures are not to scale.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "whole grain" includes the grain in its entirety, for example as a wheat berry or kernel, prior to any processing. As indicated in the U.S. Food and Drug Administration (FDA) Feb. 15, 2006 draft guidance and as used herein, the term "whole grain" includes cereal grains that consist of the intact, ground, cracked or flaked fruit of the grains whose principal components—the starchy endosperm, germ and bran—are present in the same relative proportions as they exist in the intact grain. The FDA outlined that such grains may include barley, buckwheat, bulgur, corn, millet, flee, rye, oats, sorghum, wheat and wild rice.

The term "refined wheat flour product" is a wheat flour that meets the FDA standards for a refined wheat flour product of a particle size in which not less than 98% passes through a U.S. Wire 70 sieve (210 microns).

The term "milling" as used herein includes the steps of rolling, breaking sifting and sorting the whole grain to separate it into its constituent parts, which may also result in some reduction of particle size of the constituent parts.

The term "grinding" as used herein includes any process directed to reducing particle size, including but not limited to colliding particles against one another or mechanically reducing the particle size.

The term "tempering" as used herein is the process of adding water to wheat before milling to toughen the bran and mellow the endosperm of the kernel and thus improve flour separation efficiency.

The term "hydration" or "post-hydration" as used herein refers to the step of adjusting hydration post-milling or post-grinding to adjust the moisture content of an individual constituent and/or to adjust the moisture content of the final flour.

Also, as used herein, lipase or enzyme "inhibition" means that the lipase or enzyme is no longer producing its enzyme product or has substantially reduced the production of its enzyme product. The term "inhibition" as used herein further includes lipase inactivation, wherein the lipase or enzyme is inactivated or substantially inactivated. For example, lipase inhibition means that the lipase enzyme is not hydrolyzing the triglycerides and releasing free fatty acids in the flour. The inhibition or ability of the enzyme to produce its enzyme product may be reversible or irreversible. For example, heating of an enzyme to denature the enzyme may irreversibly inactivate the enzyme. Treatment with an enzyme inhibitor may reversibly or irreversibly inactivate an enzyme. For example, acid treatment to inhibit lipase reduces production of the enzyme product, i.e. formation of free fatty acids. However, with reversible inhibition, there may still be extractable enzyme activity or measurable lipase activity. When extracting the enzyme to measure its activity, the inhibition to its activity may be removed by placing the enzyme into a higher pH environment where its activity is restored or reversed. Also, acid treatment may lower the pH to such an extent that the lipase inhibition is irreversible or the lipase inactivation is irreversible, so that there is both reduced formation of enzyme product and lower extractable enzyme activity.

In yet other embodiments, all or a portion of the lipase may be inhibited or inactivated reversibly or irreversibly. In embodiments of the invention, all or a portion of the lipase may first be reversibly inhibited or inactivated in a first stabilization stage, and then irreversibly inhibited or inactivated in a second stabilization stage. The lipase inhibitor may be retained in the whole grain flour or bran and germ fraction or component to substantially inhibit or inactivate the lipase to substantially reduce the formation of free fatty acids, upon which lipoxygenase would otherwise act to eventually produce rancid aldehydes. In another embodiment, the lipase inhibitor reduces free fatty acid formation and permits reduction of the amount of exposure of the whole grain, bran and germ fraction or component, or starch to high temperature and moisture encountered with heat stabilization. The reduced exposure helps to avoid excessive starch gelatinization and protein denaturization or alteration, which can adversely affect dough machinability, starch functionality, and baking characteristics. It has been found that use of the lipase inhibitor to reversibly inhibit or reversibly inactivate lipase unexpectedly makes the lipase more susceptible to killing or denaturing or permanently inactivating the lipase with heat. Employing the lipase inhibitor with heat stabilization provides unexpectedly lower amounts of live or active lipase or extractable lipase activity, or production of free fatty acids. Substantial reduction in the production of free fatty acids is achieved with reduced gelatinization of starch and denaturing or altering of protein with milder stabilization temperatures, less water, or shorter stabilization times even when very fine grinding is employed.

Whole Grain Flour and the Problem of Rancidity

As set forth above, the problem of rancidity is a problem that limits the shelf-life of whole grain flours. Several theories have been propounded, some of which are outlined below, but none of which are intended to limit any of the embodiments described herein.

Rancidity in cereal products may be due to hydrolytic (enzymatic) or oxidative degradation reactions, or both. Often, hydrolysis may predispose products to subsequent oxidative rancidity. Nature has provided a number of protective features in seeds to prevent rancidity and spoilage, enabling seeds to survive periods of adverse conditions before attaining an appropriate environment for germination and growth. Rancidity is less likely to develop when lipid materials, for example, seed oil, are unable to interact with reactants or catalysts such as air and enzymes. One protective feature in cereal grains is the provision of separate compartments for storing lipids and enzymes so that they cannot interact.

Milling cereal grains involves breaking down the separate compartments, bran, germ and endosperm, such that the lipid and enzymatic components of the grain are able to interact, greatly increasing the development of rancidity. Increasing milling to reduce grittiness caused by bran particles tends to increase surface area, reduce natural encapsulation of lipids, and increase interaction between the lipids and enzymatic components thereby increasing the development of rancidity.

Thus, high-extraction flours, that is, those containing substantial amounts of bran and germ, are less stable than white flours. Prolonged storage of high-extraction flours often leads to the development of rancidity. Rancidity includes adverse quality factors arising directly or indirectly from reactions with endogenous lipids, producing a reduction in baking quality of the flour, undesirable tastes and odors, and/or unacceptable functional properties. A main reason for the development of rancidity in high-extraction flours is the enzymatic degradation of unstable natural oils. Rich supplies of unstable natural oils are contained in the germ portion of grains used to make high-extraction flours. White flours, on the other hand, contain little or no unstable natural oils or fats because they are made predominantly from the endosperm portion of grains and are generally substantially free of bran and germ.

A Solution to Rancidity and the Related Problems

An inventive aspect of the invention provides a process for extending the shelf life of whole grain flours containing natural proportions of bran, germ, and endosperm, and products containing the stabilized whole grain flours using a lipase inhibitor. The lipase inhibitor is retained in the whole grain flour to inhibit lipase to reduce free fatty acid formation. In embodiments of the invention, the lipase inhibitor may be employed with or without heat stabilization, to permanently or irreversibly inhibit lipase to reduce free fatty acid formation. The lipase inhibitor reduces free fatty acid formation while reducing the amount of exposure of the whole grain to high temperatures and moisture which tend to increase starch gelatinization and protein denaturization or alteration, and which can adversely affect dough machinability, starch functionality, and baking characteristics.

In embodiments where heat stabilization is employed, it has been found that use of the lipase inhibitor to inhibit or reversibly inactivate lipase unexpectedly makes the lipase more susceptible to killing or denaturing or permanently inactivating the lipase with heat. The increased susceptibility of lipase to heat is believed to be due to opening up or unfolding of the lipase molecules by action of the inhibitor. Employing the lipase inhibitor with heat stabilization provides unexpectedly lower amounts of live or active lipase or extractable lipase activity, or production of free fatty acids. Substantial reduction in the production of free fatty acids is achieved with reduced gelatinization of starch and denaturing or altering of protein with milder stabilization temperatures, less water, or shorter stabilization times even when very fine grinding is employed. In existing flour mills where addition of heating equipment or steam injection for heat stabilization may not be feasible or may be limited because of space, time, or cost considerations, substantial reduction of free fatty acid production can still be readily achieved by use of a lipase inhibitor in accordance with methods of the present invention.

This methodology may be employed to produce stabilized whole grain flours even with very fine particle size, such as production of a whole grain wheat flour in which not less than 98% passes through a U.S. Wire 70 sieve (210 microns). The stabilized whole grain flours may be produced with low degrees of starch damage due to abrasion and low degrees of starch gelatinization or protein denaturization due to heat and moisture treatment. In one inventive aspect, the stabilized whole wheat flours have dough and baking functionalities, and may have particle sizes approaching those of white refined wheat flour. They may be used in the consistent mass production of highly machinable, sheetable doughs for making baked goods such as cookies, crackers, and snacks with excellent oven spread and appearance, and a non-gritty mouthfeel.

In another inventive aspect, this methodology may be used to produce stabilized whole grain flours, such as a very finely ground whole wheat flour, and a very finely ground stabilized bran component which exhibit unexpectedly low sodium carbonate-water sorption, and an unexpectedly long shelf life, with unexpectedly low free fatty acid contents and hexanal contents at 1 month or more under accelerated storage conditions. A high level of lipase enzyme inhibition and/or inactivation to substantially reduce free fatty acid production may be achieved, while retaining unexpectedly high levels of essential nutrients, such as antioxidants and vitamins that are lost with high temperature stabilization treatments. Furthermore, acrylamide formation may be controlled to unexpectedly low levels using the stabilization conditions of the present invention.

In embodiments of the invention, the shelf life of a whole grain flour is extended by treating the bran and germ of whole grains or berries with an aqueous solution of a lipase inhibitor to inhibit or inactivate lipase to obtain a stabilized whole grain flour having a free fatty acid content of less than about 4200 ppm, preferably less than about 3,500 ppm, most preferably less than about 3,000 ppm, for example 2,000 ppm to about 2800 ppm, when stored at 100° F. for 30 days. Unexpectedly superior results are obtained when the concentration of the lipase inhibitor in the aqueous solution during treatment is at least about 0.8 molar, preferably at least about 2 molar, for example about 2 molar to about 7 molar, most preferably about 3 molar to about 5 molar, for example about 3.3 molar to about 4 molar, and the amount of the inhibitor employed during treatment is at least 0.1 moles, for example at least about 0.3 moles, preferably about 1 mole to about 5 moles, most preferably about 2 moles to about 4 moles of inhibitor per 100 lbs of whole grains or berries or whole grain flour.

In an aspect of the invention, the bran and germ may be treated during tempering of the whole grains or berries with the aqueous solution of the lipase inhibitor being employed as the tempering medium to inhibit or inactivate the lipase. In embodiments of the invention, the treated whole grains may be milled to obtain a stabilized whole grain flour without conducting any further stabilization such as heating or steaming, or optionally a second stage of stabilization may be employed. In embodiments of the invention, the inhibitor treated, tempered, whole grains obtained in the first stabilizing stage may be: a) subjected to a second stabilization stage by heating or steaming, or b) milled to obtain an inhibitor stabilized bran and germ fraction, and the bran and germ fraction may be subjected to a second stabilization stage by heating or steaming.

In another aspect of the invention, the bran and germ may be treated with the lipase inhibitor after milling of the whole grains. A stabilized flour or a bran and germ fraction or component may be produced by milling tempered or untempered whole grains or berries to obtain a bran and germ fraction, and the bran and germ fraction may be treated or hydrated with an aqueous solution of a lipase inhibitor to inhibit or inactivate lipase to obtain a stabilized whole grain flour or stabilized bran and germ fraction having a free fatty acid content of less than about 4200 ppm, preferably less than about 3,500 ppm, most preferably less than about 3,000 ppm, for example 2,000 ppm to about 2800 ppm, when stored at 100° F. for 30 days. Unexpectedly superior results are obtained when the concentration of the lipase inhibitor in the aqueous solution during treatment or hydration is at least about 0.8 molar, preferably at least about 2 molar, for example about 2 molar to about 7 molar, most preferably about 3 molar to about 5 molar, for example about 3.3 molar to about 4 molar, and the amount of the inhibitor employed during treatment or hydration is at least 0.1 moles, for example at least about 0.3 moles, preferably about 1 mole to about 5 moles, most preferably about 2 moles to about 4 moles of inhibitor per 100 lbs of whole grains or berries or whole grain flour. In embodiments of the invention, the treated bran and germ fraction or component may be combined with an endosperm fraction to obtain a stabilized whole grain flour, or used without conducting any further stabilization such as heating or steaming, or optionally a second stage of stabilization may be employed. In embodiments of the invention, the inhibitor treated, tempered, bran and germ fraction obtained in the first stabilizing stage may be optionally subjected to a second stabilization stage by heating or steaming.

In embodiments of the invention the treatment with the aqueous solution of lipase inhibitor to inhibit or inactivate the lipase may be conducted at a temperature of less than about 50° C., preferably less than about 38° C., for example from about 24° C. to about 30° C. In such embodiments, the treatment may be conducted without the application of heat, or with the optional heat stabilization stage. In embodiments where the optional heat stabilization stage is employed, a low temperature heat stabilization, without the application of steam, may be conducted so that lipase is inhibited or inactivated at a temperature of less than about 98° C., for example low heat stabilization may be conducted at a temperature of about 80° C. to about 98° C. In other embodiments of the invention, a high temperature heat stabilization, with or without steam, may be conducted at a temperature of from about 100° C. to about 140° C., to inhibit or inactivate lipase after treatment with the aqueous solution of lipase inhibitor.

In another aspect of the invention, a stabilized whole grain flour or bran and germ fraction or component is provided with a pH of less than 6, preferably less than or equal to 5.8, for example from 4.4 to 5.8, a free fatty acid content of less than about 4200 ppm, preferably less than about 3,500 ppm, most preferably less than about 3,000 ppm, for example 2,000 ppm to about 2800 ppm, when stored at 100° F. for 30 days, a lactic acid solvent retention capacity (SRC lactic acid) of greater than or equal to 65%, preferably greater than 70%, and a ratio of lactic acid SRC to sodium carbonate-water solvent retention capacity (SRC sodium carbonate) of greater than 1, preferably greater than 1.1. In embodiments of the invention, the stabilized whole grain flour having bran germ and endosperm may have a fine particle size distribution of 0% by weight on a No. 35 (500 micron) U.S. Standard Sieve, and less than or equal to about 10% by weight on a No. 70 (210 micron) U.S. Standard Sieve: In embodiments of the invention, the stabilized whole grain flour may have a particle size distribution of at least about 85% by weight, for example from about 90% by weight to about 98% by weight through a No. 100 (149 micron) U.S. Standard Sieve. In aspects of the invention, the stabilized bran and germ fraction or bran component may have a fine particle size distribution of 0% by weight on a No. 35 (500 micron) U.S. Standard Sieve, and less than or equal to about 20% by weight on a No. 70 (210 micron) U.S. Standard Sieve.

U.S. Patent Application Publication No. 20070292583, and International Patent Application Publication No. WO/2007/149320 each to Haynes et al, the disclosures of which are each herein incorporated by reference in their entireties, disclose the production of stabilized whole grain flour by comminuting whole cereal grains to obtain ground whole cereal grains.

Copending U.S. Provisional Application No. 61/457,315, filed Feb. 24, 2011, and in the name of Derwin G. Hawley et al for "Process And Apparatus For Mass Production of Stabilized Whole Grain Flour," and its International Application No. PCT/US12/26490, filed Feb. 24, 2012, in the name of Hawley et al, the disclosures of which are herein incorporated by reference in their entireties, disclose that the production of stabilized whole grain flours having a fine particle size and which exhibit good baking functionality may be produced with high throughput using two bran and germ fractions and an endosperm fraction.

According to Copending U.S. Provisional Application No. 61/457,315, filed Feb. 24, 2011, in the name of Derwin G. Hawley et al, International Application No. PCT/US12/26490, filed Feb. 24, 2012, in the name of Derwin G. Hawley et al, and U.S. Patent Application Publication No. 20070292583, and International Patent Application Publication No. WO/2007/149320 each to Haynes et al, at least one, or all, of the retained or recovered ground bran and germ fractions may be stabilized or enzymatically inactivated using an edible stabilizing agent, such as treatment with sodium metabisulfite, organic acids, such as sorbic acid, sulfur dioxide, cysteine, thioglycolic acid, glutathione, hydrogen sulfide, or other edible reducing agents alone, or in combination with thermal treatment.

An inventive aspect provides methods for the production of a stabilized flour, a stabilized bran and germ fraction or stabilized bran component, such as a stabilized wheat component highly enriched in bran, and a stabilized whole grain flour containing the stabilized bran component or stabilized bran and germ fraction, such as a stabilized whole grain wheat flour containing the stabilized wheat bran component, without substantially damaging starch or adversely affecting baking functionality by the use of a lipase inhibitor. Such methods may be employed with or without tempering, and with or without heat stabilization. Treatment with the lipase inhibitor may reversibly or irreversibly inhibit at least a portion of the lipase present in the whole grains. The methods may be employed to extend the shelf life of flours and bran and germ fractions or bran components which may be coarsely ground or very finely ground by providing unexpectedly low free fatty acid production, and unexpectedly low starch gelatinization and protein denaturization. The stabilization conditions do not adversely affect dough machinability or baking functionality of the stabilized whole grain flour even when fine whole grain flour particle sizes are obtained. The stabilized bran component has low starch damage and starch gelatinization, and high protein functionality even when fine bran component particle sizes are obtained. The whole grain wheat flour, which contains natural proportions of endosperm, bran and germ as in the intact grain, has unexpectedly high starch and protein functionality, with low starch damage, low protein denaturization, and a low degree of gelatinization, and an unexpectedly long shelf life. The concentration of the lipase inhibitor in the aqueous solution during tempering or post-hydration and the amount of the inhibitor employed during tempering or post-hydration provide an unexpectedly superior reduction in free fatty acid production while achieving unexpectedly superior starch and protein functionality and baking characteristics as evidenced by lactic acid solvent retention capacity (SRC), the ratio of lactic acid SRC to water SRC, and the ratio of lactic acid SRC to sodium carbonate SRC.

The lipase inhibitor may be any edible, non-toxic lipase inhibitor which may be absorbed by and retained in the flour or bran and germ fraction or bran component without substantially adversely affecting taste or flavor, odor, or mouthfeel of the product. The lipase inhibitor employed in embodiments of the invention may be a reversible inhibitor, an irreversible inhibitor, and combinations or mixtures thereof. Reversible inhibitors may bind to enzymes with non-covalent interactions such as hydrogen bonds, hydrophobic interactions and ionic bonds. Multiple weak bonds between the inhibitor and the active site may combine to produce strong and specific binding. In contrast to substrates and irreversible inhibitors, reversible inhibitors generally do not undergo chemical reactions when bound to the enzyme and can be easily removed by dilution or dialysis. The reversible inhibitors which may be employed include the four kinds of reversible enzyme inhibitors, which are classified according to the effect of varying the concentration of the enzyme's substrate on the inhibitor, namely, competitive inhibitors, uncompetitive inhibitors, mixed inhibitors, and non-competitive inhibitors. Irreversible inhibitors usually covalently modify an enzyme, and inhibition cannot therefore be reversed. Irreversible inhibitors often contain reactive functional groups such as nitrogen mustards, aldehydes, haloalkanes, alkenes, Michael acceptors, phenyl sulfonates, or fluorophosphonates. These electrophilic groups react with amino acid side chains to form covalent adducts. The residues modified are those with side chains containing nucleophiles such as hydroxyl or sulfhydryl groups; these include the amino acids serine (as in DFP, right), cysteine, threonine or tyrosine.

Exemplary lipase inhibitors which may be employed are alkali bisulfates, bisulfites, metabisulfites, and metabisulfates, such as sodium metabisulfite, organic acids, inorganic acids, green tea or green tea extract, rosemary extract, sulfur dioxide, cysteine, thioglycolic acid, glutathione, hydrogen sulfide, other edible reducing agents, and mixtures thereof. Preferred lipase inhibitors which may be employed are acidic components, such as at least one organic acid, for example lactic acid, citric acid, ascorbic acid, sorbic acid, tartaric acid, malic acid, fumaric acid, acetic acid, and oxalic acid, and at least one inorganic acid, such as hydrochloric acid, phosphoric acid, and sulfuric acid, and green tea or green tea extract, and mixtures thereof. In certain embodiments, lactic acid, hydrochloric acid, and phosphoric acid are preferred for use as the lipase inhibitor.

In embodiments where an acidic component is employed as a lipase inhibitor, the treatment with the lipase inhibitor may reduce the pH of the whole grain flour, bran and germ fraction or component to a pH of less than 6, preferably less than or equal to 5.8, for example from 4.4 to 5.8.

The lipase inhibitor may be dissolved in water and applied at about room temperature for absorption into the bran and germ by: 1) soaking whole grains, or a bran and germ fraction or bran component in the lipase inhibitor solution, or 2) by spraying the lipase inhibitor solution onto the whole grains, or bran and germ fraction or bran component. In preferred embodiments, the aqueous solution of lipase inhibitor is employed as a tempering medium for tempering whole grains. In other preferred embodiments, the aqueous solution of lipase inhibitor is applied by spraying the solution onto a bran and germ fraction or bran component with stirring to hydrate the fraction or component in hydrator.

In another embodiment, the concentration of the lipase inhibitor in the aqueous solution during tempering or post-hydration is at least about 0.8 molar, preferably at least about 2 molar, for example about 2 molar to about 7 molar, most preferably about 3 molar to about 5 molar, for example about 3.3 molar to about 4 molar. In another embodiment, the amount of the inhibitor employed during tempering or post-hydration is at least 0.1 moles, for example at least about 0.3 moles, preferably about 1 mole to about 5 moles, most preferably about 2 moles to about 4 moles of inhibitor per 100 lbs of whole grains or berries or whole grain flour. The amount of lipase inhibitor employed depends upon its molecular weight, and so the amounts are expressed in moles. For example, when hydrochloric acid is employed as the lipase inhibitor it may be used in an amount of at least about 300 ppm, based upon the weight of the whole grains, and lactic acid may be employed in an amount of at least about 3000 ppm, based upon the weight of the whole grains.

In embodiments of the invention, the steps of tempering and post-hydration with the aqueous solution of lipase inhibitor may be conducted to obtain a final moisture content in the whole grains of about 10% by weight to about 14% by weight, based upon the weight of the whole grains or berries.

Whole cereal grains with moisture contents of from about 8% to about 15% by weight may be employed, with moisture contents of about 10% by weight to about 14.5% by weight being preferred for milling or grinding purposes, and moisture contents of about 12.5% by weight to about 13.5% by weight being particularly preferred. If there is too little moisture in the grains, the grains may undesirably shatter and create damaged starch. Too high an amount of moisture may render the grains susceptible to excessive starch gelatinization and may also cause the grains to be difficult to mill or grind. For these reasons, grain moisture contents of from about 10% by weight to about 14.5% by weight are preferred just prior to milling. If the moisture content of the grains is too low, moisture may be added to the dry grains prior to milling to increase the moisture content to an acceptable level for milling. Moisture addition may be achieved by tempering the grains in an aqueous solution of the lipase inhibitor or spraying their surfaces with the aqueous solution of the lipase inhibitor and permitting them to soak for sufficient amount of time to allow absorption and distribution of the lipase inhibitor throughout the bran and germ.

Whole grains contain primarily the endosperm, bran, and germ, in diminishing proportions, respectively. In whole wheat grains, for example, at field moisture of about 13% by weight, the endosperm or starch is about 83% by weight, the bran is about 14.5% by weight, and the germ is about 2.5% by weight, based upon the weight of the intact grain. The endosperm contains the starch, and is lower in protein content than the germ and the bran. It is also low in crude fat and ash constituents. The bran (pericarp or hull) is the mature ovary wall which is beneath the cuticle, and comprises all the outer cell layers down to the seed coat. It is high in non-starch-polysaccharides, such as cellulose and pentosans. The bran or pericarp tends to be very tough due to its high fiber content and imparts a dry, gritty mouthfeel, particularly when present in large particle sizes. It also contains most of the lipase and lipoxygenase of the grain and needs to be stabilized. As the extent of the grinding or milling increases, the bran particle size approaches the particle size of the starch, making the bran and starch harder to separate. Also, starch damage tends to increase due to more mechanical energy input, and abrasiveness of the bran compared to the endosperm, and rupturing of the starch granules. Also, mechanically damaged starch tends to be more susceptible to gelatinization. The germ is characterized by its high fatty oil content. It is also rich in crude proteins, sugars, and ash constituents.

In embodiments of the invention, the moisture content of the bran fraction may be controlled by tempering the whole grains such that exterior portions of the berries or grains are moistened without substantially moistening interior portions thereof. Such treatment avoids or substantially reduces the need to dry the fine fraction obtained from the interior or endosperm of the berry or grain, while moistening the exterior or bran and germ portions of the berry for stabilization treatment. Tempering methods which can be used to accomplish a surface or bran moistening include soaking the whole grains for limited time periods in a bath or vat, for example. In other embodiments, the whole grains may be surface sprayed with water and permitted to temper. Tempering times of from about 10 minutes to about 24 hours may be employed according to some embodiments of the invention. Soaking the grains for a longer time period is not desirable because it may result in deep penetration of water into the grain, moistening the interior portion of the grain, and resulting in excessive starch gelatinization.

In other embodiments, one or more bran and germ fractions, or a bran component, rather than or in addition to the whole grain may be moistened so as to achieve a desired moisture content in the bran and germ fraction or bran component. In embodiments of the invention, the bran and germ fraction or bran component may be hydrated to such an extent with an aqueous solution of the lipase inhibitor so that the hydrated bran and germ fraction or bran component has a moisture content of about 10% by weight to about 20% by weight, based upon the weight of the hydrated bran and germ fraction or bran component prior to stabilization.

In embodiments of the invention, the treatment of the bran and germ of the whole grains or berries with an aqueous solution of a lipase inhibitor to substantially inhibit or inactivate lipase with or without heat stabilization provides a stabilized flour having a free fatty acid content of less than about 4200 ppm, preferably less than about 3,500 ppm, most preferably less than about 3,000 ppm, for example 2,000 ppm to about 2800 ppm, when stored at 100° F. for 30 days, when the lipase inhibitor is employed in a concentration of at least about 0.8 molar, preferably at least about 2 molar, for example about 2 molar to about 7 molar, most preferably about 3 molar to about 5 molar, for example about 3.3 molar to about 4 molar. Also, use of the lipase inhibitor combined with heat stabilization provides an unexpectedly superior reduction in free fatty acid production, compared to the use of heat stabilization alone or the use of lipase inhibitor alone. The enhanced stabilization benefit of acid treatment combined with heat treatment enables lower lipase activity and lower free fatty acids formed during storage that cannot be achieved by either acid treatment or heat treatment alone. An unexpected synergistic effect has been found to be obtained with the use of the lipase inhibitor and heat stabilization for reduction of free fatty acid formation compared to free fatty acid reduction with heat treatment alone or reduction with lipase inhibitor treatment alone.

It is believed that use of the lipase inhibitor to substantially inhibit, or reversibly inhibit or reversibly inactivate lipase unexpectedly makes the lipase more susceptible to killing or denaturing or permanently inactivating the lipase with heat. The increased susceptibility of lipase to heat is believed to be due to opening up or unfolding of the lipase molecules by action of the inhibitor. Employing the lipase inhibitor with heat stabilization provides unexpectedly lower amounts of live or active lipase or extractable lipase activity, or production of free fatty acids. Substantial reduction in the production of free fatty acids is achieved with reduced gelatinization of starch and denaturing or altering of protein with milder stabilization temperatures, less water, or shorter stabilization times even when very fine grinding is employed.

In embodiments of the invention the treatment with the aqueous solution of lipase inhibitor to inhibit or inactivate the lipase may be conducted at a temperature of less than about 50° C., preferably less than about 38° C., for example from about 24° C. to about 30° C. In such embodiments, the treatment may be conducted without the application of heat, or with the optional heat stabilization stage. In embodiments where the optional heat stabilization stage is employed, a low temperature heat stabilization, without the application of steam, may be conducted so that lipase is inhibited or inactivated at a temperature of less than about 98° C., for example low heat stabilization may be conducted at a temperature of about 80° C. to about 98° C. In other embodiments of the invention, a high temperature heat stabilization, with or without steam, may be conducted at a temperature of from about 100° C. to about 140° C., preferably from about 115° C. to about 125° C., to inhibit or inactivate lipase after treatment with the aqueous solution of lipase inhibitor. In embodiments of the invention, the heat treatment time may be from about 0.25 minutes to about 12 minutes, preferably from about 1 minute to about 7 minutes, generally with the longer treatment times being employed with the lower temperatures and lower moisture contents.

In embodiments of the invention, the stabilization temperature and stabilization time, and moisture contents may be controlled so that starch gelatinization resulting from the stabilization in the stabilized ground or milled coarse fraction or bran component may be less than about 25%, preferably less than about 10%, most preferably less than about 5%, as measured by differential scanning calorimetry (DSC). The low degree of starch gelatinization and low degree of starch damage achieved in the present invention are exemplified by a starch melting enthalpy of greater than about 4 J/g, preferably greater than about 5 J/g, based upon the weight of starch in the stabilized bran component or ground coarse fraction, as measured by differential scanning calorimetry (DSC), at a peak temperature of from about 65° C. to about 70° C. In embodiments the stabilized bran component may have a starch melting enthalpy of greater than about 2 J/g, based upon the weight of the stabilized ground coarse fraction, as measured by differential scanning calorimetry (DSC), at a peak temperature of from about 60° C. to about 65° C. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for interaction with the starch. The lower the amount of available water, generally, the higher the gelatinization temperature. Gelatinization may be defined as the collapse (disruption) of molecular orders within the starch granule, manifested in irreversible changes in properties such as granular swelling, native crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second-stage phenomenon following the first stage of gelatinization in the dissolution of starch. It involves increased granular swelling, exudation of molecular components (i.e. amylose, followed by amylopectin) from the granule, and eventually, total disruption of the granules. See Atwell et al., "The Terminology And Methodology Associated With Basic Starch Phenomena," Cereal Foods World, Vol. 33, No. 3, pgs. 306-311 (March 1988).

The stabilized whole grain flour having bran germ and endosperm obtained with the methods of the present invention exhibit superior baking functionality and protein functionality as exhibited by a lactic acid solvent retention capacity (SRC lactic acid) of greater than or equal to 65%, preferably greater than 70%, and a ratio of lactic acid SRC to sodium carbonate-water solvent retention capacity (SRC sodium carbonate) of greater than 1, preferably greater than 1.1.

In embodiments of the invention, the stabilized whole grain flour may have a particle size distribution of 0% by weight on a No. 35 (500 micron) U.S. Standard Sieve, and less than or equal to about 20% by weight, preferably less than or equal to about 10 or 5% by weight on a No. 70 (210 micron) U.S. Standard Sieve. In a further embodiment of the invention, the stabilized whole grain flour may have a particle size distribution of up to about 100% by weight through a No. 70 (210 micron) U.S. Standard Sieve. Also, the stabilized whole grain flour may also have a particle size distribution of at least 75% by weight, preferably at least 85% by weight, for example from about 90% by weight to about 98% by weight, less than or equal to 149 microns and less than or equal to 5% by weight greater than 250 microns. In aspects of the invention, the stabilized bran and germ fraction or bran component may have a fine particle size distribution of 0% by weight on a No. 35 (500 micron) U.S. Standard Sieve, and less than or equal to about 20% by weight on a No. 70 (210 micron) U.S. Standard Sieve.

As shown schematically in FIG. 1, in embodiments of the invention a stabilized whole grain flour may be produced by treatment of whole grains, such as wheat kernels 1 with a lipase inhibitor 3, such as a mixture of lactic acid and green tea extract, during a tempering step 5. The lipase inhibitor 3 may be premixed with water 7 to form an aqueous solution 10 of the lipase inhibitor 3. The aqueous solution 10 of the lipase inhibitor 3 may be admixed with the wheat kernels 1 in a vat for tempering of the wheat kernels 3 in the tempering step 5. During the tempering step 5, the lipase inhibitor 3 is absorbed into the bran and germ of the still intact kernels 1, preferably without penetration into the endosperm of the intact kernels 1, to inhibit or inactivate at least a portion of the lipase in the bran and germ to reduce free fatty acid production. The tempered whole grains 12 may be milled in flour milling operation 15 to obtain an endosperm fraction 18 or stream 20, and a bran and germ fraction or bran component 22 or stream 25. The bran and germ fraction or bran component 22 may be optionally heat stabilized in an optional heat stabilizer operation 30 or second stage stabilization to obtain a stabilized bran and germ fraction or stabilized bran component 32. The heat stabilization or second stage stabilization 30 may be employed to reversibly or irreversibly inhibit or inactivate additional amounts of lipase and/or to irreversibly inhibit or inactivate lipase which was reversibly inhibited or reversibly inactivated by the lipase inhibitor 3 in the first stage stabilization or tempering step 5. The stabilized bran and germ fraction or stabilized bran component 32 may be combined with the endosperm fraction 20 using conventional mixing and conveying equipment, such as a screw conveyer, to obtain a stabilized whole grain flour 40.

Figure 2:
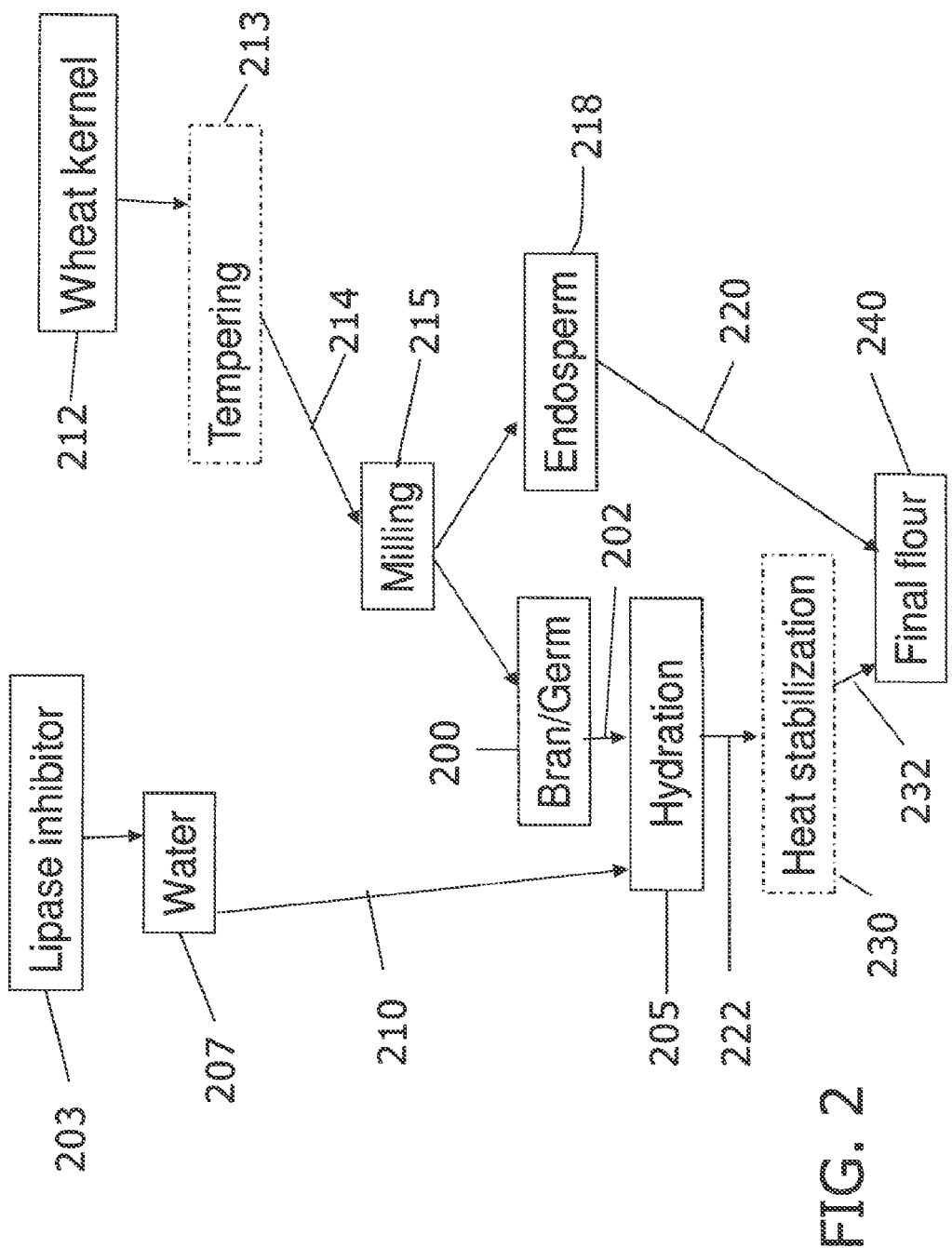
FIG. 2 shows a block flow process schematic diagram for the production of stabilized whole grain flour where a bran and germ fraction or component is treated with a lipase inhibitor in accordance with methods of the present invention.

As shown schematically in FIG. 2, in other embodiments of the invention a stabilized whole grain flour may be produced by treatment of a bran and germ fraction or bran component 200 or stream 202 with a lipase inhibitor 203, such as a mixture of lactic acid and green tea extract, during a hydration step 205 or first stabilization stage or as a separate step. Notably, the lipase inhibitor may be delivered via any solution or through any other compatible delivery mechanism. In one embodiment, the lipase inhibitor 203 may be premixed with water 207 to form an aqueous solution 210 of the lipase inhibitor 203. In other embodiments, other solvents may be employed with or without water to form a solution for delivering the lipase inhibitor during tempering or hydration or in a separate lipase treatment step. The bran and germ fraction or bran component 200 may be obtained by optionally tempering whole grains 212 in an optional tempering step 213 where the kernels may be optionally tempered in water in conventional manner without any lipase inhibitor. The optionally tempered, whole grains 214 may be milled in flour milling operation 215 to obtain an endosperm fraction 218 or stream 220, and the bran and germ fraction or bran component 200 or stream 202. The aqueous solution 210 of the lipase inhibitor 203 may be admixed with or sprayed onto the bran and germ fraction or bran component 200 in a hydrator for hydration or soaking of the bran and germ fraction or component 200 in the hydration step 205 or first stabilization stage. During the hydration step 205, the lipase inhibitor 203 is absorbed into the bran and germ fraction or bran component 200, to inhibit or inactivate at least a portion of the lipase in the bran and germ to reduce free fatty acid production. The hydrated, stabilized bran and germ fraction or bran component 222 from the first stabilization stage 205 may be optionally heat stabilized in an optional heat stabilizer operation 230 or second stage stabilization to obtain a stabilized bran and germ fraction or stabilized bran component 232. The heat stabilization or second stage stabilization 230 may be employed to reversibly or irreversibly inhibit or inactivate additional amounts of lipase and/or to irreversibly inhibit or inactivate lipase which was reversibly inhibited or reversibly inactivated by the lipase inhibitor 203 in the first stage stabilization or hydration step 205. The stabilized bran and germ fraction or stabilized bran component 232 may be combined with the endosperm fraction 220 using conventional mixing and conveying equipment, such as a screw conveyer, to obtain a stabilized whole grain flour 240.

The milling of the whole grains may be conducted using known flour milling and/or grinding operations for obtaining a bran and germ fraction or bran component and an endosperm fraction, and for obtaining flours and fractions and components having particle size distributions such as disclosed in U.S. Patent Application Publication No. US 2005/0136173 A1 to Korolchuk, U.S. Patent Application Publication No. US 2006/0073258 A1, to Korolchuk, U.S. Patent Application Publication No. 20070292583, and International Patent Application Publication No. WO/2007/149320 each to Haynes et al, U.S. Patent Application Publication No. 2007/0269579 to Dreese et al and U.S. Pat. No. 7,258,888 to Dreese et al, the disclosures of which are each herein incorporated by reference in their entireties. In preferred embodiments, the flour milling and/or grinding operations for obtaining a bran and germ fraction or bran component and an endosperm fraction, and for obtaining flours and fractions and components having particle size distributions as disclosed in U.S. Patent Application Publication No. 20070292583, and International Patent Application Publication No. WO/2007/149320 each to Haynes et al, and copending U.S. Provisional Application No. 61/457,315, filed Feb. 24, 2011, and International Application No. PCT/US12/26490, filed Feb. 24, 2012, each in the name of Derwin G. Hawley et al, all the disclosures of which are each herein incorporated by reference in their entireties, can be employed. In embodiments of the invention, stabilization by treatment with a lipase inhibitor as disclosed herein may be employed with heat or steam stabilization methods such as disclosed in said applications, publications, and patents to enhance the stability or shelf life of flours, and fractions and components produced by the methods disclosed therein.

For example, in embodiments of the invention, the milling and grinding operations as disclosed in said copending U.S. Provisional Application No. 61/457,315, filed Feb. 24, 2011, and International Application No. PCT/US12/26490, filed Feb. 24, 2012 each in the name of Derwin G. Hawley et al, may be employed to produce a stabilized whole grain flour having a particle size distribution of 0% by weight on a No. 35 (500 micron) U.S. Standard Sieve, and less than or equal to about 20% by weight, preferably less than or equal to about 10% by weight on a No. 70 (210 micron) U.S. Standard Sieve, or a stabilized whole grain flour having a particle size distribution of up to about 100%/o by weight through a No. 70 (210 micron) U.S. Standard Sieve, or a stabilized whole grain flour having a particle size distribution of at least 75% by weight, preferably at least 85% by weight less than or equal to 149 microns and less than or equal to 5% by weight greater than 250 microns.

In other embodiments of the invention, the milling and grinding operations as disclosed in said U.S. Patent Application Publication No. 20070292583, and International Patent Application Publication No. WO/2007/149320 each to Haynes et al may be employed to produce a stabilized whole grain flour having a particle size distribution of less than about 10% by weight, preferably less than about 5% by weight on a No. 35 (500 micron) U.S. Standard Sieve, about 20% by weight to about 40% by weight on a No. 60 (250 micron) U.S. Standard Sieve, about 10% by weight to about 60% by weight, preferably from about 20% by weight to about 40% by weight on a No. 100 (149 micron) U.S. Standard Sieve, and less than about 70% by weight, for example from about 15% by weight to about 55% by weight, through a No. 100 (149 micron) U.S. Standard Sieve.

Stabilization may performed on a batch, semi-batch or continuous basis, with the latter being preferred. Known heating vessels, such as batch cookers, mixers, rotating drums, continuous mixers, and extruders may be employed for heating the coarse fraction to stabilize it. The heating apparatus may be jacketed vessels equipped with heating or cooling jackets for external control of the stabilization temperature and/or steam injection nozzles for direct injection of moisture and heat into the coarse fraction. In other embodiments, infrared (IR) radiation or energy may be employed to heat the coarse bran fraction to stabilize it. In a preferred embodiment, a stabilizer manufactured by Bepex, or a Lauhoff bran cooker, may be employed for stabilization of a fraction on a continuous basis. In embodiments where grinding or milling is performed simultaneously with heat stabilization, heated rollers may be employed. In such embodiments, the temperature and moisture content may be adjusted upward to shorten the stabilization time to conform to a desired grinding time for achieving a targeted particle size distribution.

In embodiments of the invention, the heat-treated fraction may be permitted to cool in ambient air. In other embodiments, cooling of a ground or milled bran and germ fraction or bran component after heat treatment may optionally be controlled to further minimize undesired gelatinization of starch. Generally, no further significant gelatinization occurs in the stabilized bran component at temperatures lower than about 60° C. Then the heat-treated coarse fraction may be cooled to room temperature, or about 25° C. In embodiments of the invention, the average cooling rate used to achieve a surface temperature of about 25° C. may be a temperature decrease of from about 1° C./min to about 3° C./min.

The cooling rate should preferably be selected to minimize further gelatinization of starch in the coarse fraction after heat-treatment, but should not be so fast as to prevent further inactivation of lipase and LPO, if needed. If no further inactivation of lipase or LPO is desired, cooling may be conducted to quickly reduce the temperature of the heat-treated coarse fraction to less than about 60° C.

In embodiments of the invention, coolers which may be used for the processes of the invention include cooling tubes or cooling tunnels through which the heat-treated coarse fraction passes under the force of gravity or on a conveyor device. While the heat-treated coarse fraction passes through the device, cooled air may be passed over and through the coarse fraction or bran component. The spent cooling air may then be collected or suctioned off, for example, by a hood, and further treated in a cyclone separator. A preferred cooler supplies cooling air to various regions along the length of a cooling tube or tunnel. Preferably, the cooling air is passed through a chilling device prior to contacting the heat-treated coarse fraction to achieve a temperature which is lower than that of ambient air.

After cooling, the moisture content of the heat-treated coarse fraction may optionally be further reduced by drying. Drying temperatures of less than about 60° C. are preferred so that no further gelatinization of starch occurs during the drying process. In an embodiment, drying temperatures may range from about 0° C. to about 60° C. However, drying at ambient temperature is less expensive than drying at a cooler temperature and will prevent further gelatinization of the starch in the heat-treated coarse fraction during drying. Drying is preferably conducted in an atmosphere having a low relative humidity, and may preferably be conducted in a reduced pressure atmosphere. If the heat treatment, hydration, and optional cooling achieve moisture contents within a desired range, no drying step is deemed necessary.

Production of the Stabilized Whole Grain Flour

In embodiments of the invention, whole grains stabilized with a lipase inhibitor may be ground to obtain a stabilized whole grain flour. In other embodiments of the invention, a stabilized bran component or stabilized bran and germ fraction may be combined with the endosperm fraction to obtain a stabilized whole grain flour, such as a stabilized whole grain wheat flour, of the present invention. The stabilized whole grain flour, such as stabilized whole grain wheat flour, includes bran, germ and endosperm. In embodiments of the invention, only a portion of the endosperm, may have been subjected to lipase inhibitor stabilization and/or heat stabilization but at least a substantial portion of the bran and germ have been subjected to stabilization by lipase inhibitor and/or heating. The stabilized bran component or stabilized bran and germ fraction are preferably derived from the same whole grains from which the endosperm fraction is derived. However, in other embodiments, the stabilized bran component or stabilized bran and germ fraction may be combined or blended with an endosperm fraction which is derived or obtained from a different source of grains. In each embodiment however, the stabilized bran component and the endosperm fraction are combined or blended so as to provide a stabilized whole grain flour which contains endosperm, bran and germ in the same or substantially the same relative proportions as they exist in the intact grain. In other embodiments, stabilized flours other than stabilized whole grain flours, such as a stabilized white flour which contains predominantly endosperm may be produced using the lipase inhibitor treatment in accordance with embodiments of the invention.

The stabilized bran fraction which comprises a ground or milled, heat-treated coarse fraction comprising bran, germ and starch may be blended, combined, or admixed with the endosperm fraction using conventional metering and blending apparatus known in the art to obtain an at least substantially homogeneous stabilized whole grain flour. Exemplary of mixing or blending devices which may be employed include batch mixers, rotating drums, continuous mixers, and extruders.

The moisture content of the stabilized whole grain flour, such as stabilized whole grain wheat flour, may range from about 10% by weight to about 14.5% by weight, based upon the weight of the stabilized whole grain flour, and the water activity may be less than about 0.7. In embodiments, the stabilized whole grain wheat flour may have a protein content of from about 10% by weight to about 14% by weight, for example about 12% by weight, a fat content of from about 1% by weight to about 3% by weight, for example about 2% by weight, and an ash content of from about 1.2% by weight to about 1.7% by weight, for example about 1.5% by weight, each of the percentages being based upon the weight of the stabilized whole grain flour.

The stabilized whole grain wheat flour exhibits excellent baking functionality where an oven spread or cookie spread may be at least about 130% of the original prebaked dough diameter, as measured according to the AACC 10-53 benchtop method.

The embodiments disclosed are applicable to any and all types of wheat. Although not limited thereto, the wheat berries may be selected from soft/soft and soft/hard wheat berries. They may comprise white or red wheat berries, hard wheat berries, soft wheat berries, winter wheat berries, spring wheat berries, durum wheat berries, or combinations thereof. Examples of other whole grains that may be processed in accordance with various or certain embodiments or aspects of this invention include, for example, oats, corn, rice, wild rice, rye, barley, buckwheat, bulgar, millet, sorghum, and the like, and mixtures of whole grains.

Embodiments of the invention provide an improved raw material stability and greater than one month shelf life, for example 2 months or more, under accelerated storage conditions, for a stabilized bran component or ingredient and for a stabilized whole grain flour, such as stabilized whole grain wheat flour. A more stable food product can be stored under similar conditions for a longer period of time than a less stable food product before going rancid. The presence of rancidity can be monitored and measured in a multiplicity of different manners, including sensory testing (e.g., taste and/or odor analysis), lipoxygenase or lipase activity level measurements, free fatty acid level measurements, and/or hexanal level measurements.

In other embodiments of the invention, the stabilized bran component or the stabilized whole grain flour, such as stabilized whole grain wheat flour, may be combined, admixed, or blended with refined wheat flour to obtain a fortified flour, product or ingredient, such as fortified wheat flour. The fortified wheat flour product may contain the stabilized bran component or the stabilized whole grain flour, such as stabilized whole grain wheat flour, in an amount of from about 14% by weight to about 40% by weight, for example from about 20% by weight to about 30% by weight, based upon the total weight of the fortified flour product, such as fortified wheat flour product.

The stabilized whole grain flour, such as stabilized whole grain wheat flour, may be employed to partially or completely replace refined wheat flour, or other flours, in a variety of food products. For example, in embodiments of the invention, at least about 10% by weight, at most 100% by weight, for example from about 30% by weight to about 50% by weight of the refined wheat flour, may be replaced by the stabilized whole grain wheat flour to increase nutritional values of refined wheat flour products with little, if any detriment to product appearance, texture, aroma, or taste.

The stabilized bran components and stabilized whole grain products, such as stabilized whole grain wheat products, obtained in an embodiment of the invention can be packaged, stably stored, and subsequently or immediately further used in food production. The stabilized bran products and flour products are ready for further processing into the finished food products by adding water and other applicable food ingredients, mixing, shaping, and baking or frying, etc. Doughs containing the stabilized bran and whole grain flours, such as whole grain wheat flour, may be continuously produced and machined, for example sheeted, laminated, molded, extruded, or coextruded, and cut, on a mass production basis. The finished whole grain products (e.g., biscuits, cookies, crackers, snack bars, etc.) have a pleasant texture with the characteristics of a whole grain taste.

The stabilized bran components and stabilized whole-grain flours products, such as stabilized whole-grain wheat flour products, of the present invention may be used in a wide variety of food products. The food products include farinaceous food products, and biscuit type products in particular, pasta products, ready-to-eat cereals, and confections. In one embodiment, the food products may be bakery products or snack foods. The bakery products may include cookies, crackers, pizza crusts, pie crusts, breads, bagels, pretzels, brownies, muffins, waffles, pastries, cakes, quickbreads, sweet rolls, donuts, fruit and grain bars, tortillas, and par-baked bakery products. The snack products may include snack chips and extruded, puffed snacks. The food product particularly may be selected from cookies, crackers, and cereal crunch bars. The cookies may be bar-type products, extruded, coextruded, sheeted and cut, rotary molded, wire cut, or sandwich cookies. Exemplary of cookies which may be produced include sugar wafers, fruit filled cookies, chocolate chip cookies, sugar cookies, and the like. The crackers may be fermented or non-fermented type crackers, and graham crackers. The baked goods produced may be crackers or cookies having a full fat content or they may be a reduced fat, low-fat, or no-fat product.

In addition to water, cookie, cracker, and snack ingredients which may be admixed with the stabilized whole grain flour, such as stabilized whole grain wheat flour, include enriched wheat flour, vegetable shortening, sugar, salt, high fructose corn syrup, leavening agents, flavoring agents and coloring agents. Enriched wheat flours which may be used include wheat flours enriched with niacin, reduced iron, thiamine mononitrate and riboflavin. Vegetable shortenings which may be used include those made of partially hydrogenated soybean oil. Leavening agents which may be used include calcium phosphate and baking soda. Coloring agents which may be used include vegetable coloring agents such as annatto extract and turmeric oleoresin.

In some embodiments, the dough made includes dough comprising various combinations of the aforementioned cookie, cracker, and snack ingredients. According to some embodiments, all of the foregoing ingredients are homogeneously admixed and the amount of water is controlled to form a dough of desired consistency. The dough may then be formed into pieces and baked or fried to produce products having excellent moisture, geometry, appearance, and texture attributes.

In embodiments of the invention, the total amount of the flour component, such as the stabilized whole grain flour and optional other flours which may be used in the baked good compositions, such as cookies, biscuits and crackers, of the present invention may range, for example, from about 20% by weight to about 80% by weight, preferably from about 45% by weight to about 75% by weight, based upon the weight of the dough, not including the weight of inclusions. Unless otherwise indicated, all weight percentages are based upon the total weight of all ingredients forming the doughs or formulations, except for inclusions such as confectionary or flavor chips or chunks, nuts, raisins, and the like. Thus, "the weight of the dough" does not include the weight of inclusions, but "the total weight of the dough" does include the weight of inclusions.

Process-compatible ingredients, which can be used to modify the texture of the products produced, include sugars such as sucrose, fructose, lactose, dextrose, galactose, maltodextrins, corn syrup solids, hydrogenated starch hydrolysates, protein hydrolysates, glucose syrup, mixtures thereof, and the like. Reducing sugars, such as fructose, maltose, lactose, and dextrose, or mixtures of reducing sugars may be used to promote browning. Exemplary sources of fructose include invert syrup, high fructose corn syrup, molasses, brown sugar, maple syrup, mixtures thereof, and the like.

The texturizing ingredient, such as sugar, may be admixed with the other ingredients in either solid or crystalline form, such as crystalline or granulated sucrose, granulated brown sugar, or crystalline fructose, or in liquid form, such as sucrose syrup or high fructose corn syrup. In embodiments of the invention, humectant sugars, such as high fructose corn syrup, maltose, sorbose, galactose, corn syrup, glucose syrup, invert syrup, honey, molasses, fructose, lactose, dextrose, and mixtures thereof may be used to promote chewiness in the baked product.

In addition to the humectant sugars, other humectants, or aqueous solutions of humectants which are not sugars or possess a low degree of sweetness relative to sucrose, may also be employed in the dough or batter. For example, glycerol, sugar alcohols such as mannitol, maltitol, xylitol and sorbitol, and other polyols, may be used as humectants. Additional examples of humectant polyols (i.e. polyhydric alcohols) include glycols, for example propylene glycol, and hydrogenated glucose syrups. Other humectants include sugar esters, dextrins, hydrogenated starch hydrolysates, and other starch hydrolysis products.

In embodiments, the total sugar solids content, or the texturizing ingredient content, such as of the doughs produced, may range from zero up to about 50% by weight, based upon the weight of the dough, not including the weight of inclusions.

The sugar solids may be replaced in whole or in part by a conventional sugar substitute or conventional bulking agent such as polydextrose, hollocellulose, microcrystalline cellulose, mixtures thereof, and the like. Polydextrose is a preferred sugar substitute or bulking agent for making reduced calorie baked goods. Exemplary replacement amounts may be at least about 25% by weight, for example at least about 40% by weight, preferably from about 50% by weight to about 75% by weight, of the original sugar solids content.

In embodiments, the amount of the conventional sugar substitute, conventional bulking agent, or conventional flour substitute, such as polydextrose, may be from about 10% by weight to about 35% by weight, for example from about 15% by weight to about 25% by weight, based upon the weight of the dough, not including the weight of the inclusions.

The moisture contents of the doughs should be sufficient to provide the desired consistency to enable proper forming, machining, and cutting of the dough. The total moisture content of the doughs will include any water included as a separately added ingredient, as well as the moisture provided by flour (which usually contains about 12% to about 14% by weight moisture), the moisture content of any bulking agent or flour substitute such as a resistant starch type 11 ingredient, and the moisture content of other dough additives included in the formulation, such as high fructose corn syrup, invert syrups, or other liquid humectants.

Taking into account all sources of moisture in the dough or batter, including separately added water, the total moisture content of the doughs or batters which may be used is generally less than about 50% by weight, preferably less than about 35% by weight, based upon the weight of the dough or batter, not including the weight of the inclusions. For example, cookie doughs employed may have a moisture content of less than about 30% by weight, generally from about 10% by weight to about 20% by weight, based upon the weight of the dough, not including the weight of inclusions.

Oleaginous compositions which may be used to obtain the doughs and baked goods of the present invention may include any known shortening or fat blends or compositions, useful for baking applications, such as butter, and they may include conventional food-grade emulsifiers. Vegetable oils, lard, marine oils, and mixtures thereof, which are fractionated, partially hydrogenated, and/or interesterified, are exemplary of the shortenings or fats which may be used in the present invention. Edible reduced- or low-calorie, partially digestible or non-digestible fats, fat-substitutes, or synthetic fats, such as sucrose polyesters or triacyl glycerides, which are process-compatible may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from vegetable sources such as soybean oil, palm kernel oil, palm oil, rapeseed oil, safflower oil, sesame oil, sunflower seed oil, and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions comprise soybean oil. In embodiments, the dough may include up to about 30% by weight, for example from about 5% by weight to about 25% by weight of at least one oil or fat, based upon the weight of the dough.

Baked goods which may be produced in accordance with embodiments of the invention include reduced calorie baked goods which are also reduced fat, low fat or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers used as snacks and for cookies, the reference amount is 30 grams. Thus, the fat content of a low-fat cracker or cookie would therefore be less than or equal to 3 grams of fat per 50 grams or less than or equal to about 6% fat, based upon the total weight of the final product. A no-fat accompaniment cracker would have a fat content of less than 0.5 grams per 15 grams or less than about 3.33%, based upon the weight of the final product.

In addition to the foregoing, the doughs may include other additives conventionally employed in crackers and cookies. Such additives may include, for example, milk by-products, egg or egg by-products, cocoa, vanilla or other flavorings, in conventional amounts.

A source of protein, which is suitable for inclusion in baked goods, may be included in the doughs employed to promote Maillard browning. The source of protein may include non-fat dry milk solids, dried or powdered eggs, mixtures thereof, and the like. The amount of the proteinaceous source may, for example, range up to about 5% by weight, based upon the weight of the dough, not including the weight of inclusions.

The dough compositions may contain up to about 5% by weight of a leavening system, based upon the weight of the dough, not including inclusions. Exemplary of chemical leavening agents or pH-adjusting agents which may be used include alkaline materials and acidic materials such as sodium bicarbonate, ammonium bicarbonate, calcium acid phosphate, sodium acid pyrophosphate, diammonium phosphate, tartaric acid, mixtures thereof, and the like. Yeast may be used alone or in combination with chemical leavening agents.

The doughs employed may include antimycotics or preservatives, such as calcium propionate, potassium sorbate, sorbic acid, and the like. Exemplary amounts, to assure microbial shelf-stability, may range up to about 1% by weight of the dough, not including the weight of inclusions.

Emulsifiers may be included in effective, emulsifying amounts in the doughs. Exemplary emulsifiers which may be used include, mono- and di-glycerides, polyoxyethylene sorbitan fatty acid esters, lecithin, stearoyl lactylates, and mixtures thereof. Exemplary of the polyoxyethylene sorbitan fatty acid esters which may be used are water-soluble polysorbates such as polyoxyethylene (20) sorbitan monostearate (polysorbate 60), polyoxyethylene (20) sorbitan monooleate (polysorbate 80), and mixtures thereof. Examples of natural lecithins which may be used include those derived from plants such as soybean, rapeseed, sunflower, or corn, and those derived from animal sources such as egg yolk. Soybean-oil-derived lecithins are preferred. Exemplary of the stearoyl lactylates are alkali and alkaline-earth stearoyl lactylates such as sodium stearoyl lactylate, calcium stearoyl lactylate, and mixtures thereof. Exemplary amounts of the emulsifier which may be used range up to about 3% by weight of the dough, not including the weight of inclusions.

Production of the doughs may be performed using conventional dough mixing techniques and equipment used in the production of cookie and cracker doughs.

While baking times and temperatures will vary for different dough or batter formulations, oven types, etc., in general, commercial cookie, brownie and cake-baking times may range from about 2.5 minutes to about 15 minutes, and baking temperatures may range from about 250° F. (121° C.) to about 600° F. (315° C.).

The baked products may have a relative vapor pressure ("water activity") of less than about 0.7, preferably less than about 0.6, for preservative free microbial shelf-stability. Cookie, brownie and cake products generally have a moisture content of less than about 20% by weight, for example, from about 2% by weight to about 9% by weight for cookies, based upon the weight of the baked product, exclusive of inclusions.

For example, in embodiments of the invention, a dough for producing a shelf-stable cracker or cookie, such as a graham cracker may include from about 40% by weight to about 65% by weight of stabilized whole grain wheat flour, from about 15% by weight to about 25% by weight of at least one sugar such as sucrose, from about 5% by weight to about 25% by weight of at least one oil or fat such as vegetable oil or shortening, from about 0% by weight to about 10% by weight of at least one humectant sugar such as high fructose corn syrup and honey, from about 0% by weight to about 1% by weight of a protein source such as non-fat dry milk solids, from about 0% by weight to about 1% by weight of a flavoring, such as salt, from about 0.5% by weight to about 1.5% by weight of leavening agents, such as ammonium bicarbonate and sodium bicarbonate, and from about 8% by weight to about 20% by weight of added water, where each weight percentage is based upon the weight of the dough, and the weight percentages add up to 100% by weight.

In embodiments of the invention, the stabilized whole grain flour and the baked goods containing the stabilized whole grain flour may contain the same or substantially the same amount of lipase inhibitor, such as lactic acid, as used to produce the stabilized whole grain flour. For example, the stabilized whole grain flour and the baked goods containing it may contain at least 0.1 moles, for example at least about 0.3 moles, preferably about 1 mole to about 5 moles, most preferably about 2 moles to about 4 moles of inhibitor per 100 lbs of whole grain flour.

Flour Attributes

The use of a lipase inhibitor, such as lactic acid, in amounts of at least about 0.1 moles per 100 lbs of whole grains or whole grain flour, for example at least about 3000 ppm of lactic acid, based upon the weight of the whole grains, during treatment or hydration in the production of stabilized whole grain flour provides stabilized whole grain flours with:

a) extended superior freshness as measured by free fatty acids (FFA) and/or hexanal formed in the flour during storage, b) superior sensory attributes, such as reduced raw flour odor formed in the flour during storage, and c) superior microbial stability as measured by spore counts, each compared to whole grain flours produced without stabilization treatment or using heat stabilization alone, without the use of a lipase inhibitor.

In embodiments, the stabilized whole grain wheat flours may exhibit an unexpectedly low hexanal content of less than about 200 ppm, preferably less than about 100 ppm, most preferably less than about 10 ppm after 1 month accelerated storage at 95° C., based upon the weight of the stabilized whole grain flour.

Also, in embodiments, raw flour odor formed in the flour during storage, for example during 58 days storage under accelerated storage conditions at 92° F., may be reduced compared to a control produced without stabilization treatment or using heat stabilization alone, by at least 3%, for example by at least 5%, preferably at least 7%, most preferably at least 10%, based upon sensory evaluation by an expert taste panel using a score or scale of 1 to 100 where a rating of 1 has the lowest intensity, and a rating of 100 has the highest intensity of flour aroma, reminiscent of a bag of white flour that has been opened. The percentage reduction or score may depend upon the treatment conditions such as bran hydration level and the level of the lipase inhibitor. For example, in embodiments of the invention, the stabilized whole grain flours may have a score of less than or equal to 9, based upon a scale of 1 to 100, depending on treatment conditions such as the bran hydration level and the level of the lipase inhibitor, such as lactic acid, compared to a control score of greater than 9.5.

Additionally, in embodiments, use of the lipase inhibitor, such as an organic acid in the production of a stabilized whole grain flour may reduce heat resistant spores by at least about 50%, preferably at least about 75%, most preferably at least about 90% compared to whole grain flours produced without stabilization treatment or produced using heat stabilization alone. For example, in embodiments, lipase inhibitor stabilized whole grain flour may have an Aerobic Plate Count (APC) of less than about 150 CFU/g, preferably less than about 100 CFU/g, most preferably less than about 75 CFU/g, and a heat resistant spore count of less than about 75 CFU/g, preferably less than about 50 CFU/g, most preferably less than about 10 CFU/g.

Baked Good Sensory Attributes

Moreover, baked goods, such as cookies, produced using the aged, lipase inhibited, stabilized whole grain flour exhibit extended superior flavor retention and other sensory attributes, such as after taste and after affect compared to those of baked goods or control samples containing the same composition but made with whole grain flour produced without stabilization treatment or produced using heat stabilization alone, without the use of a lipase inhibitor.

For example, in embodiments, baked good sensory attributes, such as positive sensory attributes of sweet flavor, cinnamon flavor, baked toasted after taste, vanilla aftertaste, and honey aftertaste for a graham cracker may be increased, and negative sensory attributes of stickiness to teeth after effect and amount of particles after effect may be decreased, compared to a control produced without stabilization treatment or using heat stabilization alone, by at least 3%, for example at least 5%, preferably at least 7%, most preferably at least 10%, based upon sensory evaluation by an expert taste panel using a scale of 1 to 100 where a rating of 1 has the lowest intensity, and a rating of 100 has the highest intensity of the attribute such as sweet flavor, cinnamon flavor, etc. The percentage increase or percentage reduction, or score may depend upon the treatment conditions such as bran hydration level and the level of the lipase inhibitor.

Also, in embodiments, baked goods, such as cookies, produced with the stabilized whole grain flours may have a score of greater than 31 for the positive attribute of sweet flavor, based upon a scale of 1 to 100, depending on treatment conditions such as the bran hydration level and the level of the lipase inhibitor, such as lactic acid, compared to a control score of less than 30 for a control sample made with whole grain flour produced without stabilization treatment or produced using heat stabilization alone, without the use of a lipase inhibitor. Also, based upon a scale of 1 to 100, the baked good may have a score for the positive sensory attributes of cinnamon flavor of greater than 10, baked toasted after taste of greater than 31.5, vanilla after taste of greater than 17.5, and honey after taste of greater than 23.6, and a score for the negative sensory attributes of stickiness to teeth after effect of less than 52, and amount of particles after effect of less than 36.

Exemplary sensory attributes which may be evaluated to show similar improvements include categories such as aroma, appearance, hand touch, texture/mouthfeel, flavor, and aftertaste/afteraffect. Exemplary of specific sensory attributes within these categories which may be evaluated are:

a) Aroma: sweet, vanilla, molasses, maple, honey, baked/toasted, flour, cinnamon, wheat, bran, and cardboard attributes;
b) Appearance: Brown color, uneven color, visible particles, and opposite contrast attributes;
c) Hand Touch: Surface roughness (top), bumpy surface (top), bumpy surface (bottom), powdery coating, difficult to break, snap, clean break, crumbs, amount of layers, and density attributes;
d) Texture/Mouthfeel: Initial bite hardness, initial bite crunch, crispy, crumbly, dry, amount of particles, size of particles, congealed, dissolve rate, sticks to teeth, mouth coating, and mouth drying attributes;
e) Flavor: Baked/toasted, wheat, bran, sweet, bitter, salt, vanilla, flour, cinnamon, honey, molasses, maple, and cardboard attributes; and
f) Aftertaste/Aftereffect: Baked/toasted, wheat, bran, sweet, bitter, vanilla, cinnamon, honey, molasses, sticks to teeth, amount of particulates, mouth drying, mouth coating, salivating, metallic, and linger attributes.

The present invention is illustrated by the following non-limiting examples wherein all parts, percentages, and ratios are by weight, all temperatures are in ° C., and all temperatures are atmospheric, unless indicated to the contrary:

Example 1

Part A. Acidification of Whole Kernel Wheat

The objective of this example is describe how soft red wheat kernels are tempered with water containing acid in order to produce a non-bleached whole grain flour with a reduced pH. Initial wheat moisture of 13.05%, is increased to final kernel moisture of 14.0%, by adding water to the wheat at ambient temperature, and holding the wheat for 8 hour. The amount of water added is calculated according table 1.

TABLE 1

| Amount of wheat (g) | kernel moisture | Dry weight (g) | total moisture needed @14% | Added moisture (g) | Final moisture target |
|---|---|---|---|---|---|
| 800 | 12.00% | 704.0 | 114.60 | 18.60 | 14.00% |
| 800 | 13.05% | 695.6 | 113.24 | 8.84 | 14.00% |
| 800 | 13.50% | 692.0 | 112.65 | 4.65 | 14.00% |

Procedure

Cleaned wheat sample (800 g) is weighed in an air tight plastic jar mixed with corresponding amount of tempering water containing a specific amount of acid as shown in Table 2. Wheat is tempered for 8 hours at ambient temperature. For example, in order to attain 850 ppm lactic acid concentration in 800 g wheat, 0.80 g of 85% lactic acid solution is added into 7.88 g of tap water. Once tempering water with acid is added into the wheat, the jar was sealed, shaken by hand for 1 min every 10 min for 6 times, then allowed to stand overnight.

Table 2 shows the three different types of acids, lactic, phosphoric and hydrochloric tested in this example. The table shows (1) weight of wheat (2) initial wheat moisture (3) dry weight wheat (4) amount of each acid solution added (5) acid amount expressed on a dry weight basis (dwb) (6) amount of temper water (7) total water (temper water+water from acid solution) added to condition the wheat kernel (8) amount of acid (dwb) added to wheat expressed in parts per million (ppm) (9) tempered kernel moisture.

TABLE 2

Wheat Tempering With Different Amounts and Types of Acid

| Acid dosage | Wheat kernel (g) | kernel moisture | Dry weight (g) | 85% Lactic acid (g) | 85% Phosphoric acid (g) | 37% Hydrochloric Acid (g) | Acid Added (g) (dwb) | Water added (g) | total water (g) | Amount Acid (dry wgt acid/initial kernel wgt) ppm | [Acid Conc] M | Acid (moles/ 100 lb kernels) | Tempered Kernel moisture |
|---|---|---|---|---|---|---|---|---|---|---|---|---|---|
| Control | 800.00 | 13.05% | 695.60 | 0.00 | 0.00 | 0.00 | 0.00 | 8.00 | 8.00 | 0.00 | 0.00 | 0.00 | 13.91% |
| 0.8 g 85% Lactic acid | 800.00 | 13.05% | 695.60 | 0.80 | 0.00 | 0.00 | 0.68 | 7.88 | 8.00 | 850 | 0.94 | 0.4289 | 13.91% |
| 4 g 85% Lactic acid | 800.00 | 13.05% | 695.60 | 4.00 | 0.00 | 0.00 | 3.40 | 7.40 | 8.00 | 4,250 | 4.72 | 2.1446 | 13.91% |
| 8 g 85% Lactic acid | 800.00 | 13.05% | 695.60 | 8.00 | 0.00 | 0.00 | 6.80 | 6.80 | 8.00 | 8,500 | 9.44 | 4.2891 | 13.91% |
| 5.65 g 85% Lactic acid | 800.00 | 13.05% | 695.60 | 5.68 | 0.00 | 0.00 | 4.83 | 7.15 | 8.00 | 6,038 | 6.66 | 3.0465 | 13.91% |

TABLE 2-continued

Wheat Tempering With Different Amounts and Types of Acid

| Acid dosage | Wheat kernel (g) | kernel moisture | Dry weight (g) | 85% Lactic acid (g) | 85% Phosphoric acid (g) | 37% Hydrochloric Acid (g) | Acid Added (g) (dwb) | Water added (g) | total water (g) | Amount Acid (dry wgt acid/initial kernel wgt) ppm | [Acid Conc] M | Acid (moles/ 100 lb kernels) | Tempered Kernel moisture |
|---|---|---|---|---|---|---|---|---|---|---|---|---|---|
| 9.41 g 85% Lactic acid | 800.00 | 13.05% | 695.60 | 9.41 | 0.00 | 0.00 | 8.00 | 6.59 | 8.00 | 10,000 | 11.10 | 5.0460 | 13.91% |
| 0.8 g 85% phosphoric acid | 800.00 | 13.05% | 695.60 | 0.00 | 0.80 | 0.00 | 0.68 | 7.88 | 8.00 | 850 | 0.87 | 0.3942 | 13.91% |
| 2.32 g 85% phosphoric acid | 800.00 | 13.05% | 695.60 | 0.00 | 2.32 | 0.00 | 1.97 | 7.65 | 8.00 | 2,463 | 2.52 | 1.1422 | 13.91% |
| 6.5 g 85% phosphoric acid | 800.00 | 13.05% | 695.60 | 0.00 | 6.50 | 0.00 | 5.53 | 7.03 | 8.00 | 6,913 | 7.05 | 3.2062 | 13.91% |
| 0.8 g 37% HCl | 800.00 | 13.05% | 695.60 | 0.00 | 0.00 | 0.80 | 0.30 | 7.46 | 7.96 | 375 | 1.03 | 0.3129 | 13.91% |
| 4 g 37% HCl | 800 | 13.05% | 695.6 | 0 | 0 | 4 | 1.48 | 5.32 | 7.84 | 1850 | 5.18 | 1.5435 | 13.89% |
| 6.5 g 37% HCL | 800 | 13.05% | 695.6 | 0 | 0 | 6.5 | 2.41 | 3.645 | 7.74 | 3006 | 8.54 | 2.5080 | 13.88% |

Acid in water is added to 800 g batch of wheat kernels:

[Lactic acid, dry wt (ppm or (μg/g wheat)]*800=total dry weight acid;

Total dry weight acid/lactic acid molecular weight=moles acid;

% water*800 g wheat=total water (g)/volume equivalent (1 ml);

water (ml)/1000=total water (L);

[acid conc.]=moles acid/liter water=molar concentration (M);

[[acid added (dwb), g per million g kernel]/molecular weight of the acid, g)]=moles acid per g kernel;

moles acid per g kernel/0.0022 lb/g="Acid (moles per lb)*100="Acid (moles per 100 lb)

Part B. Wheat Milling

The objective of this procedure was to produce whole grain flour from wheat kernels tempered as described in part A.

Procedure

The tempered wheat samples were milled with a Chopin Laboratory Mill CD1 (Chopin, France) which consisted of two units. The first unit was a roller mill consisting of two break rolls and the second unit was a smooth mill roll for reduction. Three main fractions are obtained from the first unit break rolls: coarse flour semolina in the right-hand collecting-pan; break flour in the left-hand collecting-pan and coarse bran. The semolina is processed through the reduction roll from which is obtained two fractions; reduction over-tails; and reduction flour.

Table 3 shows the flour extraction yield. Yield was calculated on the basis of wheat milled. The flour yield was calculated as Yield=100×[(Coarse and fine bran wt+over-tails wt)/wheat wt], in this study:

TABLE 3

Flour Extraction Yield

| Acid dosage | Amount Acid (dry weight acid/initial kernel weight) | Tempered Kernel moisture | Total Break Flour Extraction (%) |
|---|---|---|---|
| Control | 0 ppm | 13.91% | 67.16 |
| 0.8 g 85% Lactic acid | 850 ppm | 13.91% | 67.47 |
| 4 g 85% Lactic acid | 4250 ppm | 13.91% | 68.01 |
| 8 g 85% Lactic acid | 8500 ppm | 13.91% | 63.72 |
| 5.65 g 85% Lactic acid | 6000 ppm | 13.91% | 68.39 |
| 9.41 g 85% Lactic acid | 10000 ppm | 13.91% | 67.11 |
| 0.8 g 85% phosphoric acid | 850 ppm | 13.91% | 67.42 |
| 2.32 g 85% phosphoric acid | 2465 ppm | 13.91% | 67.37 |
| 6.5 g 85% phosphoric acid | 6906 ppm | 13.91% | 67.98 |
| 0.8 g 37% Hydrochloric acid | 370 ppm | 13.91% | 67.16 |
| 4 g 37% Hydrochloric acid | 1850 ppm | 13.89% | 68.13 |
| 6.5 g 37% Hydrochloric acid | 3006 ppm | 13.88% | 67.99 |

Summary

Wheat kernels were tempered with water containing different types and amounts of acid. Added moisture was adjusted according to the initial wheat kernel moisture so that the final kernel moisture, after tempering, was 14% which is considered to be a preferred moisture range for milling wheat. The amount of acid added to the temper water was adjusted so that ranges of 370 ppm to 10,000 ppm (dry weight acid per initial weight of wheat) were tested. Normal milling behavior was observed for all types and amounts of acid treatments. Flour extraction yield was typically around 67% to 68% and all mill fractions were recombined to form whole grain flour with natural proportions of bran, germ and endosperm.

Example 2

Production of Coarse Ground Bran from Acid Treated Kernels and Recombination to Whole Grain Flour The objective of this procedure was to reduce the particle size of the coarse bran fraction and reduction over-tails obtained from the milling of the acid treated wheat. The coarse bran from first break roll and the coarse over-tails from the reduction roll, were frozen with liquid nitrogen in the sealed jar, then ground by Perten Laboratory Mill 3100 (Perten, Sweden), hammer rotation speed set to 16,800 rpm, the sieve opening is 0.5 mm. After grinding, the coarse ground material was recombined with remaining flour fractions (break flour+reduction flour) to form whole grain flour. Whole grain flour particle size distribution was determined by Roto Tap. The method is applicable to a wide variety of products and ingredients which uses a uniform mechanical action to assure accurate, dependable results. The shaker reproduces the circular and tapping motion used in hand sieving. The method was adapted from the ASTA 10.0 RoTap Shaker method with the following modifications and adaptations:

Apparatus

The apparatus employed was:
1. Tyler RoTap electric testing sieve shaker (Fisher Scientific), with automatic timer.
2. U.S. Standard Sieves, #20, #35, #40, #50, #60, #80, #100, bottom separator pan, and cover.
3. Weigh balance, accurate to 0.1 g.
4. Brushes for cleaning screens.
5. Silicon powder flow aid (Syloid #244, W.R. Grace & Co.).

Procedure

The procedure employed was:
1. Use clean, thoroughly dried, tared sieves.
2. Accurately weigh the designated size of sample (to nearest 0.1 g) into a 250 ml or 400 ml beaker.
3. Tare the appropriate sieves and bottom pan individually.
4. Stack the sieves on the shaker with the coarsest opening at the top and increase in fineness until the finest opening is at the bottom. Place a bottom pan underneath.
5. Transfer the sample quantitatively from the beaker to the top sieve.
6. Place the sieve cover on top, then the shaker plate, circular frame and lower the tap arm.
7. Set the timer for 5 minutes.
8. After completion of shaking, remove sieves from RoTap and carefully weigh each sieve and the pan separately.

Calculations

The calculations employed were:
1. Using one sieve
   a.
   $$\% \text{ on} = \frac{(\text{wt. of sieve} + \text{material}) - \text{wt. of sieve}}{\text{wt. of sample}} \times 100$$
   b. % thru=100−% on
2. Using three sieves or more
   Sieve A ($S_a$), coarse, top
   Sieve B ($S_b$), medium, middle
   Sieve C ($S_c$), fine, bottom
   Etc.
   a.
   $$\% \text{ on}_a = \frac{(\text{wt. of } S_a + \text{material}) - \text{wt. of } S_a}{\text{wt. of sample}} \times 100$$
   b.
   $$\% \text{ on}_b = \frac{(\text{wt. of } S_b + \text{material}) - \text{wt. of } S_b}{\text{wt. of sample}} \times 100$$
   c.
   $$\% \text{ on}_c = \frac{(\text{wt. of } S_c + \text{material}) - \text{wt. of } S_c}{\text{wt. of sample}} \times 100$$
3. The amount of silicon powder flow aid added to the sample should be subtracted from the weight in pan before doing the above calculation.
4. The sum of the percentages on all the screens (plus pan) should be equal to or closely approximate 100%

Whole grain flour pH was measured in a 10% slurry (one part flour to 9 part water) using a Corning pH meter 360i equipped with an A-58905-66 High-performance combination pH electrode. Ash is determined according to AOAC official method 923.03 for measuring ash in flour. Flour moisture was determined according to AACC Method 44-15A.

Table 4 shows the whole grain flour characteristics of (1) moisture (2) pH (3) ash content and (4) particle size distribution.

TABLE 4

Characterization of Whole Grain Flour

| Acid dosage | Amount Acid (dry weight acid/initial kernel weight) | Whole Grain Flour pH | Whole Grain Flour Moisture | Ash (14% moisture basis) | Particle size distribution | | | | | | | | |
|---|---|---|---|---|---|---|---|---|---|---|---|---|---|
| | | | | | #20 mesh | #35 mesh | #40 mesh | #50 mesh | #60 mesh | #80 mesh | #100 mesh | through100 | Total |
| Control | 0 ppm | 6.65 | 13.95 | 1.45 | 0.4 | 1 | 1.9 | 5.9 | 8.2 | 13.9 | 17.2 | 51.1 | 99.6 |
| 0.8 g 85% Lactic acid | 850 ppm | 6.3 | 13.75 | 1.44 | 0.2 | 1 | 2.1 | 5.6 | 7.6 | 17.9 | 16.7 | 48.8 | 99.9 |
| 4 g 85% Lactic acid | 4250 ppm | 5.24 | 13.7 | 1.44 | 0.1 | 1.1 | 1.9 | 5.5 | 6.4 | 16.2 | 16.1 | 51.7 | 99 |
| 8 g 85% Lactic acid | 8500 ppm | 4.65 | 13.85 | 1.44 | 0.3 | 0.5 | 1 | 5.1 | 8.9 | 12.8 | 18 | 53 | 99.6 |
| 5.65 g 85% Lactic acid | 6000 ppm | 4.95 | 13.75 | 1.46 | 0.2 | 1 | 1.8 | 5.8 | 6.8 | 10.4 | 17.7 | 55.6 | 99.3 |
| 9.41 g 85% Lactic acid | 10000 ppm | 4.54 | 13.55 | 1.42 | 0.3 | 1.4 | 2.1 | 5.6 | 7.3 | 13.7 | 16.4 | 53 | 99.8 |

TABLE 4-continued

Characterization of Whole Grain Flour

| Acid dosage | Amount Acid (dry weight acid/initial kernel weight) | Whole Grain Flour pH | Whole Grain Flour Moisture | Ash (14% moisture basis) | Particle size distribution | | | | | | | | |
|---|---|---|---|---|---|---|---|---|---|---|---|---|---|
| | | | | | #20 mesh | #35 mesh | #40 mesh | #50 mesh | #60 mesh | #80 mesh | #100 mesh | through100 | Total |
| 0.8 g 85% phosphoric acid | 850 ppm | 6.16 | 13.9 | 1.51 | 0.2 | 0.4 | 0.8 | 4.6 | 9 | 18.6 | 18.4 | 47.9 | 99.9 |
| 2.32 g 85% phosphoric acid | 2465 ppm | 5.67 | 13.75 | 1.6 | 0.1 | 0.5 | 1.6 | 5.5 | 7.9 | 13.6 | 17.2 | 52.3 | 98.7 |
| 6.5 g 85% phosphoric acid | 6906 ppm | 4.64 | 13.85 | 1.92 | 0.2 | 0.6 | 1.2 | 4.8 | 7.7 | 9.9 | 17.1 | 58.2 | 99.7 |
| 0.8 g 37% Hydrochloric acid | 370 ppm | 6.18 | 13.45 | 1.47 | 0.1 | 1.1 | 1.9 | 5.6 | 7.3 | 15.6 | 16.7 | 51.1 | 99.9 |
| 4 g 37% Hydrochloric acid | 1850 ppmn | 5.07 | 13.85 | 1.43 | 0.3 | 0.4 | 0.9 | 4.7 | 11.4 | 13.7 | 17.7 | 49.9 | 99 |
| 6.5 g 37% Hydrochloric acid | 3006 ppm | 4.48 | 13.7 | 1.43 | 0.1 | 0.7 | 1.4 | 5.5 | 7 | 14 | 15.4 | 54.3 | 98.4 |

Extractable lipase activity was determined for each flour. The method used to determine lipase activity is as follows.

A. Apparatus
1. TD-700 Fluorometer (Turner Design) with filters of Em 442 and Ex 300 nm
2. Analytical balance (±0.0001)
3. Pipetman, 10 µl, 50 µl and 5000 µl and tips for each
4. 20 ml glass scintillation vials with caps (VWR #66022-060)
5. 50 ml centrifuge tubes (VWR #20170-170)
6. Refrigerated centrifuge (Beckman Allegra X15SR)
7. 25 and 1000 ml volumetric flask with stopper
8. 1500 ml beaker
9. Stir bars
10. Vortex mixer
11. Disposable cuvettes, 4.5 ml (VWR #58017-875)
12. Caps for disposable cuvettes (VWR #24775-083)
13. Insulated ice pan (VWR #35751-046)
14. Shaker/rocker (VWR #14003-580)
15. Timer B. Reagents
1. Deionized water
2. 4-Methylumbelliferyl heptanoate (4-MUH) (Sigma #M2514)
3. 2-Methoxyethanol (Fluka #64719)
4. Trizma Hydrochloride (Sigma #T-5941)
5. 1 N Sodium Hydroxide (Fisher #SS266)
6. Ice C. Solutions
1. Assay Buffer (0.2 M Tris HCl, pH 7.4)
   Weigh 31.52 g trizma hydrochloride (B-5) into a 1500 ml beaker (A-8)
   Add about 900 ml deionized water, add stir bar, dissolve
   Adjust pH to 7.4 with 1 N sodium hydroxide
   Transfer to 1000 ml volumetric flask (A-7) and bring to volume with deionized water
2. Substrate Stock Solution (0.5% 4-MUH in 2-methoxyethanol, W/V)
   Weigh 0.0720 to 0.0725 g 4-methylumbelliferyl heptanoate (B-2) into a 20 ml vial (A-4)
   Add 15 ml 2-methoxyethanol (B-3) to vial
   Vortex to dissolve powder
   Store at room temperature and discard after one week
3. Substrate Working Solution (0.03% 4-MUH (W/V) in 6% 2-methoxyethanol (V/V) aqueous solution)
   Remove a 1.5 ml aliquot from Substrate Stock Solution (C-2) and pipette into a 25 ml volumetric flask (A-7)
   Dilute to volume with DI water
   Mix thoroughly.
   Make fresh Substrate Working Solution from Substrate Stock (C-2) for every test.
4. Ice/Water Mixture (Ice Bath)
   Place Ice in insulated pan (A-13) and add about half volume of cold water
5. Flour Sample Solutions
   Pre-cool Assay Buffer (C-1) in Ice Bath (C-4)
   Weigh 0.1 g sample (as close as to 0.1000 g) into a 50 ml centrifuge tube (A-5)
   Add 20 ml chilled Assay Buffer (C-1)
   Vortex to dissolve
   Place the tube horizontally in Ice Bath and slow rock on shaker (A-14) (#2 speed setting, 16 stroke/min) for 30 min
   Centrifuge samples at 4750 rpm (A-6), 5° C. for 10 minutes
   Use supernatant for assay D. Calibration of Fluorometer (Reference to TD-700 Operating Manual for Calibration, Multi-Optional, Raw Fluorescence Procedure)
   Turn on fluorometer (wait until Home Screen appears)
   Press <ENT> from "HOME" screen for Setup&Cal
   Choose #2 for Calibration
   Place cuvette containing 3000 µl Assay Buffer (C-1, room-temperature) into sample chamber
   Press <ENT>
   Press #1 for OK for Set Sample=100 (default setting of 100, wait until Sensitivity Factor is established, the reading should be around 100)
   Press <ENT>
   Press #9 for No Subtract Blank (returning to Home screen)

E. Sample Testing
   Pre-label cuvettes (A-11) with appropriate sample ID
   Add 10 µl Substrate Working Solution (C-3) to the cuvette previously used to calibrate instrument (D-3) as Blank Cap (A-12) and invert 5 times to mix
   Place the cuvette in sample compartment in fluorometer (A-1)

Start timer immediately after closing the lid on the fluorometer and record fluorescence intensity (FI) reading at the following intervals of 0.5, 1, 2, 3, 4, and 5 min Remove cuvette from sample compartment in fluorometer Pipette 2950 µl Assay Buffer (C-1, room-temperature) into first pre-labeled sample cuvette (E-1)

Pipette 50 µl supernatant solution of first extracted flour sample (C-5)

Add 10 µl Substrate Working Solution (C-3)

Repeat Step E-3 through E-6 for all subsequent samples immediately

F. Calculations

Plot FI values vs. incubation time for each sample as reaction curve

Determine slope (ΔFI/min) using least regression in Excel spreadsheet on the reaction curve Normalize ΔFI/min with sample weight to 0.1000 g as following:

Normalized ΔFI/min=Slope×(0.1000 g/sample weight g)

Report lipase activity as ΔFI/min/0.1 g

Figure 3:
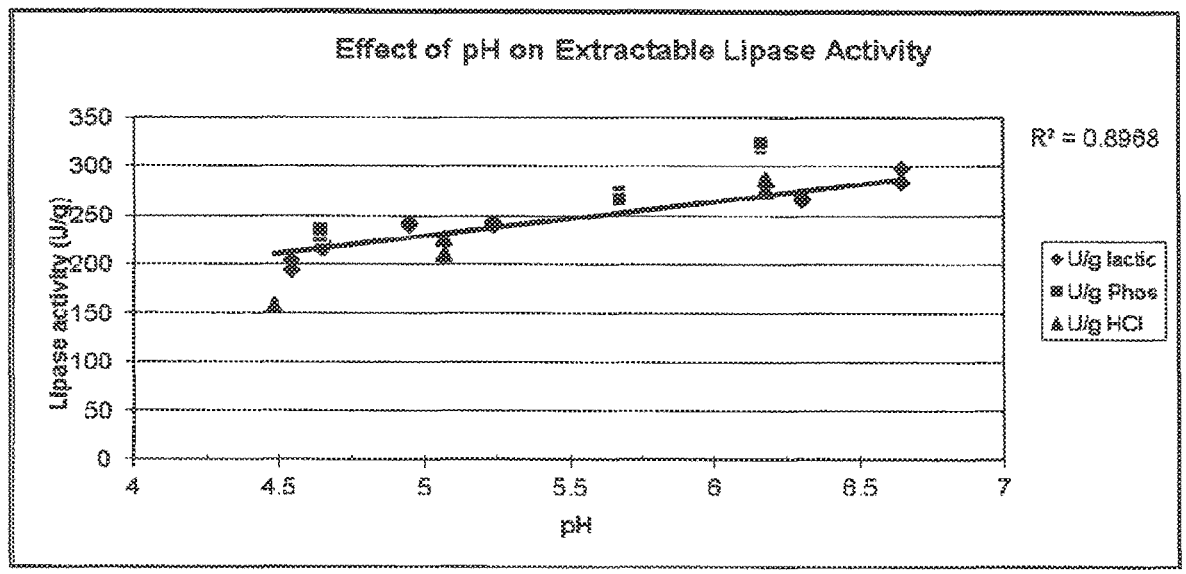
FIG. 3 is a plot showing the effect of pH on extractable lipase activity for whole grain flours of Example 2.

The extractable lipase activity for the various whole grain flours are shown in FIG. 3.

Summary and Conclusion

Tempering wheat kernels with water containing acid, followed by milling and recombination to whole grain wheat flour, produced whole grain flour with lower pH than untreated control. All wheat demonstrated normal milling performance. The coarse fraction was ground prior to recombining to whole grain flour. The particle size distribution of the final flour was similar among the test variables, with about 15% of the flour weight >250 um and about 50% to 60%<150 um. Ash content is indicative of the amount of bran material. Use of ash measurement in flour milling is based upon the greater concentration of ash (minerals) in the bran, aleurone and germ than in the endosperm. Ash content is a widely used index of refined flour purity and provides a means to measure mechanical separation of the kernel components during the milling process. In this case, ash is used as an indicator of complete, reproducible recombination of the coarse ground fraction with the flour endosperm to make whole grain flour with natural proportion of bran, germ and endosperm. The pH of the final flour depended upon the amount and type of acid used to temper the whole kernel. The extractable lipase activity in the whole grain flour decreased as a function of pH over the range studied (pH=6.6 (untreated control) down to pH=4.5).

Example 3

Effect of Acid Tempering on Whole Grain Flour Stability

The objective of this example was to test the effect of acid tempering on the stability of whole grain flour during storage. The amount of free fatty acid formed was measured after flour storage in a sealed glass jar for 30 days under accelerated storage conditions of 92° F. Whole grain flour was prepared according to process described in Examples 1 and 2. The flours tested were: (1) soft red flour untreated (control); (2) soft red flour treated with lactic acid to pH 6.30; (3) soft red flour treated with lactic acid to pH 5.24; (4) soft red flour treated with lactic acid to pH 4.95; (5) soft red flour treated with lactic acid to pH 4.65; (6) soft red flour treated with lactic acid to pH 4.54; (7) soft red flour treated with phosphoric acid to pH 6.16; (8) soft red flour treated with phosphoric acid to pH 5.67; (9) soft red flour treated with phosphoric acid to pH 4.64; (10) soft red flour treated with hydrochloric acid to pH 6.18; (11) soft red flour treated with hydrochloric acid to pH 5.07; (12) soft red flour treated with hydrochloric acid to pH 4.48. Results were compared to the amount of free fatty acids formed in untreated control flour. Whole grain flours were made with natural proportion of bran component and endosperm obtained from the flour mill. Whole grain flour ash content was used to confirm composition.

Free fatty acid content of whole grain flour (fresh flour and 30 days aged flour) was determined according to the following method:

Free fatty acid content of the flours was adapted from the method set forth in "Jong, C.; Badings, H. T.; *Journal of High Resolution Chromatography;* 1990; Determination of Free Fatty Acids in Milk and Cheese Procedures for Extraction, Clean up, and Capillary Gas Chromatography Analysis". Lipid extracts, containing free fatty acids, are obtained from foods by extraction with acidified organic solvents. The anhydrous lipid extracts are passed through a weak anion exchange SPE cartridge to isolate the free fatty acids from the coextracted material, particularly neutral glycerides.

The procedure is as follows:

Apparatus a. Gas chromatograph (GC) fitted for capillary on-column injection into 0.53 mm internal diameter columns with electronic pressure control (EPC) and flame ionization detector (FID), [example: HP5890 Series II]

b. Autosampler compatible with the GC, [example: HP7673]

c. Software system capable of collecting chromatographic data, calculating statistics and tabulating results d. Analytical balance with 0.0001 g resolution, 150 g capacity e. Centrifuge capable of 3000 rpm (2050 rcf), with temperature control, (optional)

f. Polytron able to homogenize samples at 25000 rpm [example: Brinkmann Instruments, Polytron Kinematica AG Model PT 1300 D]

g. Vortex Mixer h. Solvent Dispensers with inert plastic components [example: Brinkmann—two 1-5 mL capacity Cat #2222010-1 and one 5-25 mL capacity Cat #2222030-6]

i. Crimper for autosampler vials

Supplies

1. Column: StabilwaxDA 0.25 u, 0.53 mm×15 m [Restek Corp. #11022]

2. SPE cartridges: Bond elute NH2, 3 cc, 500 mg, with stainless steel frits [Varian Part #1212-4038]

3. Glass centrifuge test tubes with teflon lined screw caps, size: 16×125 mm

4. Corex glass centrifuge tubes with teflon lined screw caps, 45 mL [example: COREX II No. 8422-A]

5. Whatman Filter paper #1, 125 mm Diameter

6. Pyrex brand filtering funnel, short stem

7. Disposable Culture Tubes, borosilicate glass 16×150 mm [example: VWR Cat #47729-580]

8. Glass vials with teflon lined screw caps, 4 mL. [example: Kimble Cat #60940A 4]

9. Autosampler vials, borosilicate glass, crimp-top with teflon lined caps

10. Amber borosilicate bottles with teflon lined screw cap, 100 mL

11. Clear borosilicate bottle with teflon lined screw cap, 250 mL

12. Graduated cylinders: 250 mL, 100 mL
13. Volumetric flasks: 250 mL, 100 mL
14. Glass volumetric pipettes class A 5, 2, 1 mL and graduated 10, 5 mL
15. Disposable Pasteur pipettes: 5¾ and 9 inch
16. Microspatula, spatula, and polypropylene sample transfer tubes Reagents/Solutions
Reagents and Standards
1. Ethanol—200 proof, anhydrous, 99.5%+, stored in amber glass [Aldrich #45,983-6 or equivalent]
2. Hexanes—GC grade [B&J #216-4 or equivalent]
3. iso-Propanol—GC grade [B&J #323-4 or equivalent]
4. Methyl-tert-butylether (MTBE)—GC grade [B&J #242-4 or equivalent]
5. Methylene chloride—GC grade [B&J #299-4 or equivalent]
6. Acetic acid—purity to be monitored for propionic acid level [Aldrich #32,009-9 or equivalent]
7. Sulfuric acid—ACS reagent, 95.0-98.0% [Fisher Reagent ACS #A800-500 or equivalent]
8. Water Type 1 [Fisher HPLC #W5-4 or equivalent]
9. Diatomaceous Earth [Leco part #502-327 or equivalent]
10. Standards >99.0% purity 3:0; 4:0; 6:0; 8:0; 9:0; 10:0; 11:0, 12:0; 13:0; 14:0; 16:0; 18:0 [examples: 3:0 Aldrich #24,035-4; 4:0 Aldrich #B 10,350-0; 6:0 Aldrich #15,374-5; 8:0 Aldrich #0-390-7; 9:0 Sigma #N-5502; 10:0 Aldrich #15,376-1; 11:0 Sigma #U-5503; 12:0 Aldrich #15,378-8; 13:0 Sigma #T-0502; 14:0 Aldrich #15-379-6; 16:0 Nu-Check-Prep, Inc. >99%; 18:0 Nu-Check-Prep, Inc. >99%]

Solutions to be Prepared
1. 2.5 M Sulfuric: Dilute 7 mL of concentrated acid with Type 1 water to 50 mL volumetrically.
2. 1:1 (v/v) MTBE: Hexanes
3. 2:1 (v/v) Methylene chloride: 2-Propanol
4. 2% Acetic acid in MTBE: Dilute 5 mL of concentrated acid with MTBE to 250 mL volumetrically.
5. 1:1 (v/v) Hexanes: 2-Propanol, rinse solvent for syringe between runs
6. Standards (Standard Preparation See Appendix 13.1)
   a. Internal Standard: 11:0; Surrogates: 9:0 and 13:0
   b. Matrix Spike (MS) standard working solution in ethanol: MS @-50 µg/mL. This level may be appropriate for low to mid-level determinations. Generally the FFA levels vary tremendously within a given matrix. Consequently a spike solution of varying amounts per individual FFA may be necessary per matrix.
   c. Calibration Standards in hexanes establish linear range: On-Column range 1-200 µg/g (ppm), Free fatty acid standards: 3:0, 4:0, 6:0, 8:0, 9:0 surrogate standard, 10:0, 11:0 internal standard, 12:0, 13:0 surrogate standard, 14:0, 16:0, and 18:0. Comment: 18:1 and 18:2 calculations are based on 18:0 response factor.
   d. Continuing calibration standards are prepared in 2% Acetic acid in MTBE, the final eluting solution: Calibration standard #3 @-50 µg/mL prepared in 2% Acetic acid/MTBE is currently used to bracket samples.

Cheek Samples, Blanks, Duplicates, and Matrix Spikes
Prior to using a new lot of SPE cartridges, the appropriate elution fraction must be determined with a mid-level standard. A blank is prepared with each batch of samples. Within the batch each study will contain one duplicate. A matrix spike will be performed for all new matrices and in cases where homogeneity is an issue. An Initial Calibration Verification (ICV) should be prepared to verify correct preparation of calibration standards. Currently, there are no appropriate check samples for this analysis.

Sample Preparation and Storage
a. Initial Sample Storage: frozen, refrigerated, or room temperature as specified per individual sample.
b. Samples with active lipases may require special handling, such as enzyme inactivation.
c. Sampling: room temperature, well mixed—homogeneous
d. Sample extracts: solutions stored in tightly sealed, screw capped Teflon lined vials either in a well-ventilated hood or explosion proof refrigerator.
e. Sample isolates: The final eluate is a mixture of acid and organic solvent. These isolates should be stored in approved flammable storage area away from any bases.

Sample Clean-Up
Procedure for Sample Extraction: Solid and Liquid Matrix
Into 45 mL glass centrifuge test tube add in the following order:

| | | |
|---|---|---|
| Sample | 1.0-1.05 g | Record weight to ±0.0001 g |
| Working Internal Std Solution | 1.0 mL | Pipette |
| Ethanol | 1.0 mL | Pipette |
| 2.5M $H_2SO_4$ | 0.3 mL | Pipette |
| Vortex to form a homogeneous mixture. | | |
| Add: Diatomaceous earth[1] | 4.5 ± 0.1 g | |
| Vortex thoroughly | | |
| Equilibrate at least 10 minutes[2] | | |
| Add 1:1 (v/v) MTBE:Hexanes | 15.0 mL | Solvent dispenser |

[1] In cases of very low moisture samples (example - flour) diatomaceous earth absorbs too much of the solvents. Only in such cases, 3.5 g is advised.
[2] Minimum time for sample and diatomaceous earth interaction is 5 minutes. Diatomaceous earth absorbs water. Presence of sample moisture may result in non-reproducible results. 3:0 and 4:0 readily partition into the water layer. Ten minutes has been set as the minimum. This provides a safety margin to allow the interaction to finish.

Extraction Process:
Polytron: setting 24,000 rpm; time: 25-45 seconds depending on solidness of matrix Precaution: Wear gloves. Rinse Polytron tip with warm water, towel dry followed by 2-propanol rinse and towel dry the tip again. Kimwipes or disposable paper towels can be used. Polytron probe may require additional rinses. Some potential carryover issues include high fat content, high FFA content and active lipases. The final rinse prior to samples must be 2-propanol see 11.4 Notes. Next, vortex the sample, filter entire contents of centrifuge tube through Whatman #1 paper. Collect filtrate in 16×125 mm glass screw cap test tubes. Alternate option: To maximize supernatant volume, centrifuge @3000 rpm for 30 minutes. If this option is chosen, precautions regarding solvent volatility must be taken into consideration. Transfer supernatant into 16×125 mm glass screw cap test tubes.

Free Fatty Acid Isolation
Condition SPE cartridge with 3 mL hexanes. A solvent dispenser is appropriate in this case. Additional solvent can be added at this step without any adverse effect, especially if sample extracts are not ready for transfer at this point. The additional hexanes will prevent the cartridge from drying out. Fill the barrel of the SPE cartridge with the sample extract. A Pasteur pipette will suffice in this transfer. The volume of extract loaded onto the SPE is approximately 3 mL. Allow to drain totally without drying. Wash twice with 2 mL methylene chloride: 2-propanol solution to remove the neutral glycerides. A solvent dispenser is recommended. Allow to drain totally. Pipette 2.5 mL 2% Acetic Acid—MTBE. Discard eluate. Transfer the SPE cartridge to sample collection vials. Pipette a second 2.5 mL 2% Acetic Acid—MTBE. Collect the eluate containing FFAs in 4 mL vial directly. Mix thoroughly.

The elution volumes for free fatty acids must be verified for each new lot of SPE cartridges. Apply one mL of a mid-level working standard, Cal #3, in hexanes to a conditioned cartridge, then elute as follows:

| Fraction 1 | 2 × 2 mL | Methylene chloride: 2-Propanol | Discard |
| Fraction 2 | 1.5 mL | 2% Acetic in MTBE | Discard |
| Fraction 3 | 1.0 mL | 2% Acetic in MTBE | Collect |
| Fraction 4 | 1.5 mL | 2% Acetic in MTBE | Collect |
| Fraction 5 | 1.0 mL | 2% Acetic in MTBE | Collect |
| Fraction 6 | 1.0 mL | 2% Acetic in MTBE | Collect |

Analyze fractions 3 thru 6 to determine the optimum volume of solution needed to elute all the free fatty acids.

Once the appropriate fraction is determined, a screen process can be used to validate the next new lot of SPE cartridges. A blank extract can be split between old and new lot cartridges. If GC analysis of the isolates correlate, then no further action is required. Otherwise, the correct fraction must be optimized by following the aforementioned steps.

Instrument Set-Up

Instrument: GC capable of on-column injection, 0.53 mm column, EPC, autosampler

Column: StabilwaxDA: 0.25 micron, 0.53 mm×15 m

Carrier Gas: Hydrogen Constant flow at 10.0 mL/min or set EPC to 2.0 psi @60° C.

Temperature program: 60° C. hold 0.5 min, @50°/min to 100° C., @10°/min to 250° C., hold 1 min Injection Temp: Oven track mode differential 3° C.

Injection volume: 1 μL

Detector: Flame Ionization Detector @ 260° C., Range 0

Analysis

Initial Analysis:

First, an instrument blank analysis, 2% Acetic Acid in MTBE, must demonstrate a contaminant free system. Second, a standard solution, 1 ppm, should show acceptable detection for each compound. Third, a five point calibration, 5 to 200 ppm, should prepared to establish the acceptable operating range for quantitation.

Calculation may be based on average response factor or linear regression. If response factor calculation is chosen, then the relative standard deviation (RSD) must be within 20% of the average for each compound. Alternatively, with linear regression coefficient ($R^2$) method, a value of 0.999 is required for each compound of interest. This calibration should be verified with an ICV prepared from a secondary source of standards. All compounds in the ICV should be within ±5% of the current calibration.

Continuing Analysis:

At each start-up, an instrument blank and a mid-level standard shall be analysed prior to any sample. The blank must demonstrate lack of contaminant presence. The mid-level standard must be within 10% of expected values based on current calibration. Every fifteen samples must be bracketed with a mid-level standard. If a mid-level standard exceeds the 10% limit, corrective action must be taken and all samples prior to that standard must be re-analysed. 18:0 peak shape can be used to monitor status of the inlet. Stearic acid peak shape degradation—tailing is indicative of build-up on the front end of the column. Actual loss of stearic acid is indicative of injection port leak or contamination. Corrective action is discussed in Attachment 13.2.

Evaluation, Calculation and Expression of Results

Evaluation & Calculation

All chromatograms are evaluated for peak shape. Poor peak shape represents a problem with the operating setup. This problem must be address prior to further analysis. See Attachment 13.2 for GC inlet and column guidelines. Standards are additionally evaluated for retention times. The acceptable retention time window for individual FFAs is ±0.02 minutes of current calibration standards. Furthermore, sample FFA levels must be within established calibration limits. If any component exceeds the upper calibration amount, that sample must be diluted appropriately and reanalysed.

This method is based on internal standard quantitation. The five point calibration curve ranges from 5 to 200 ppm. The five response factors are averaged. Then the average response factor is used to calculate unknown FFAs. Each compound has its own response factor.

Response Factor Calculation:

Response Factor (RF): $RF_x = (A_x C_{is})/(A_{is} C_x)$

Average Response Factor ($RF_{avg}$): $RF_{Xavg} = (RF_{X1} + RF_{X2} + RF_{X3} + RF_{X4} + RF_{X5})/5$ Where: $RF_x$=Response factor of compound X; $A_x$=Peak area of compound X; $C_{is}$=Total (μg) of internal standard added; $A_{is}$=Peak area of internal standard; $C_x$=Total (μg) of compound X; $RF_{Xavg}$=average response factor for compound X derived from a five point calibration Unknown Concentration Calculation:

Unknown Sample Concentration (μg/g)=$(A_x * C_{is})/(A_{is} * RF_{Xavg} * W)$

Where: W=Weight of sample in (g)

Expression of Results

Results are reported in ppm, μg/g or mg/Kg, rounded to the nearest whole number. Prior to sample data generation, the laboratory must establish detection and practical quantitation limits. Any results below lowest calibration point are reported as less than that value, <5 ppm.

The FFAs retained on an amine phase are eluted with 2% acetic acid in methyl-tert-butylether (MTBE). The extract is chromatographed on a capillary column, Stabilwax. Compounds are detected by flame ionization (FID). Amounts of even numbered fatty acids, 4:0 to 18:0, including 3:0, are determined using internal standard quantitation, 11:0. 18:1 and 18:2 calculations are based on 18:0 standard. The amount of tetradecanoic (14:0), hexadecanoic (16:0), octadecanoic (18:0), octadecenoic (18:1) and octadecadienoic (18:2) found in the flours were added together to make up the total free fatty acid content of the flour shown in table 1.

Table 5 contains the results of the total free fatty acids formed in whole grain flour after storage for 30 days at 92 F. Shown are: (1) acid type (2) amount of acid (3) Molar acid concentration in temper water (4) moles acid per 100 weight kernels (5) initial pH (6) final pH (7) free fatty acid concentration in flour (8) % reduction in amount of free fatty acid compared to control flour.

TABLE 5 pH and FFA content of aged whole grain flour

| Acid dosage | Amount Acid (dry weight acid/initial kernel weight) ppm | [acid conc] (M) | Acid (moles/100 lb kernels) | Initial pH | pH after 56 days, 92 F. | pH drop | FFA concentration 30 day (ppm) | % Inhibition |
|---|---|---|---|---|---|---|---|---|
| Control | 0 | 0 | 0 | 6.65 | 5.99 | 0.66 | 3757 | — |
| 0.8 g 85% Lactic acid | 850 | 0.94 | 0.4289 | 6.3 | 5.91 | 0.39 | 3385 | 9.9 |
| 4 g 85% Lactic acid | 4250 | 4.72 | 2.1446 | 5.24 | 5.16 | 0.08 | 2406 | 35.96 |
| 8 g 85% Lactic acid | 8500 | 9.44 | 4.2891 | 4.65 | 4.59 | 0.06 | 1655 | 55.95 |
| 5.65 g 85% Lactic acid | 6000 | 6.7 | 3.0276 | 4.95 | 4.87 | 0.08 | 2112 | 43.78 |
| 9.41 g 85% Lactic acid | 10000 | 11.1 | 5.0460 | 4.54 | 4.45 | 0.09 | 1382 | 63.22 |
| 0.8 g 85% phosphoric acid | 850 | 0.87 | 0.3942 | 6.16 | 5.82 | 0.34 | 3062 | 18.5 |
| 2.32 g 85% phosphoric acid | 2465 | 2.52 | 1.1433 | 5.67 | 5.39 | 0.28 | 2386 | 36.49 |
| 6.5 g 85% phosphoric acid | 6906 | 7.05 | 3.2032 | 4.64 | 4.66 | −0.02 | 1592 | 57.63 |
| 0.8 g 37% Hydrochloric acid | 370 | 1.03 | 0.3087 | 6.18 | 5.77 | 0.41 | 2593 | 30.98 |
| 4 g 37% Hydrochloric acid | 1850 | 5.18 | 1.5435 | 5.07 | 4.93 | 0.14 | 1147 | 69.47 |
| 6.5 g 37% Hydrochloric acid | 3006 | 8.54 | 2.5080 | 4.48 | 4.42 | 0.06 | 746 | 80.14 |

Figure 4:
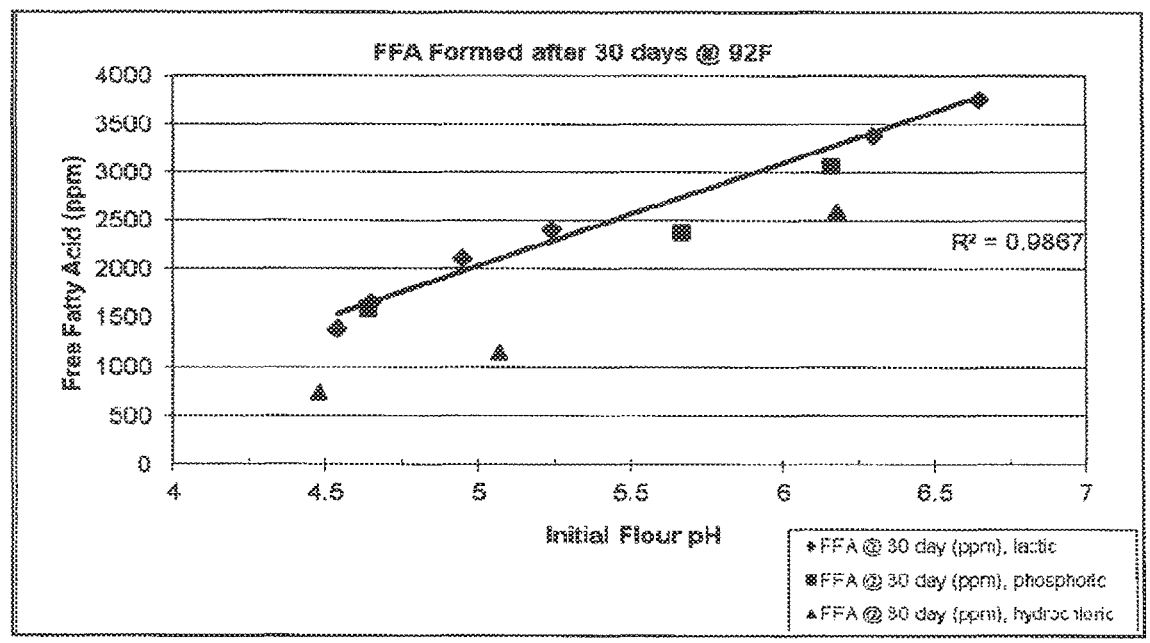
FIG. 4 is a plot of the total free fatty acids formed after 30 days at 92° F. as a function of the initial pH of the whole grain flour of Example 3.
Figure 5:
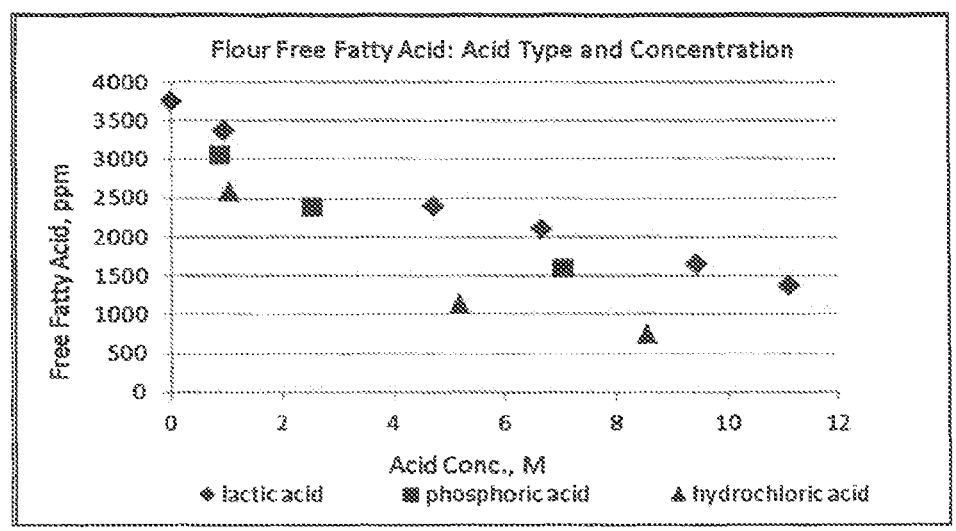
FIG. 5 is a plot showing the effect of acid concentration and acid type on the suppression of free fatty acid formed in whole grain flour of Example 3.

FIG. 4 shows a plot of the total free fatty acids formed after 30 days at 92° F. as a function of the initial pH of the flour. In addition to pH, the effect of acid concentration on the suppression of free fatty acid formed in flour is shown in FIG. 5.

Summary

Stabilization through acidification reduced the amount of free fatty acids formed in the whole grain flour. Free fatty acid level after 30 days was 3757 ppm in the untreated control. Flour fatty acid formation at about pH=4.5 was reduced to 1382 ppm for lactic acid treatment, 1592 ppm for phosphoric acid treatment and 746 ppm for hydrochloric acid treatment. Acid concentration is also related to reduction of free fatty acids formed in the flour.

A slight downward drift in flour pH over a 56 day storage period was observed. The change was accentuated in untreated control flour probably due to higher amounts of acidic fatty acids formed in the flour. Overall reduction in free fatty acids formed ranged from 10% reduction up to 80% reduction depending on pH. It is believed that this reduction in free fatty acids, a critical substrate of the lipoxygenase enzyme, substantially reduces the amount of oxidized fat in the flour below the aroma/flavor threshold of about 3,000 ppm (or 10% of total lipid content) and thus extends shelf-life substantially.

Example 4

Baking function of whole grain flour Stabilized with Lactic Acid

In this example the baking function of whole grain flour stabilized with acid according to the present invention was compared to baking function of untreated whole grain flour. Whole grain flours made with natural proportion of bran and germ and endosperm are listed in table 6 along with the test formulas used in baking. Particle size distributions of the whole grain flours were measured using the RoTap method described in example 2. Flour moisture, ash, water holding capacity, carbonate water holding capacity and lipase activity were also measured according to methods described in previous examples. The cookie test baking method used to evaluate the baking functionality of the whole grain flours was the AACC 10-53 Cookie Test Baking Solvent Retention Capacity (SRC) serves as a practical test to monitor the function of specific flour components, such as the amount of damaged starch. The SRC assay method used was adapted and modified from AACC method 56-10, according to the following procedure:

Materials:

50 ml centrifuge tubes+caps

5% weight sodium carbonate solvent

Centrifuge (IEC, Centra GP8, 269 rotor, 2130 rpm)

Procedure:

1. Weigh 50 ml centrifuge tubes+caps (for special tubes weight O-ring seals)
2. Weigh and add 5.00 g of bran-germ mixture to each tube (determine moisture content of mixture)
3. Add 25 g of solvent (pre-weighed solvent aliquots) to each tube
4. Allow it to hydrate for 20 min, shaking every 5 min (5, 10, 15, 20)
5. Centrifuge for 15 min at 1000×g 6. Decant supernatant and drain 5 min at 45° angle and 5 min at 90° angle.
7. Put cap back and weigh pellet
8. Calculate:

$$SRC\% = \left\{\left(\left(\frac{tube, stopper, gel\ wt - tube, stopper}{Flour\ wt}\right) - 1\right)\left(\frac{86}{100 - flour\ moist}\right) \times 100\right\}$$

Method:
AACC 10-53 Cookie Test Baking Method was designed at Nabisco Biscuit Company for evaluation of ingredient functionality and predictive correlation between sensory and mechanical texture analysis (mechanical texture analysis by TAXT2 Texture analyzer 3-point bend or puncture test). The test is an improvement over AACC 10-52 Sugar-Snap Cookie Test Baking Method as confirmed by USDA Soft Wheat Quality Lab (Wooster Ohio). The AACC 10-53 test was adopted as the official method of the American Association of Cereal Chemists after collaborative testing by the Soft Wheat Quality Committee in 1992. The equipment, cookie dough composition, mixing procedure, baking procedure, measurement procedure, etc. used in the test are:

Equipment
The equipment employed is:
Moisture Analyzer, disposable sample pans for determination of flour moisture.
Digital Thermometer (Omega model 872A) with thermocouple
C-100 Hobart Mixer with 3-quart mixing bowl and paddle.
National Test Baking Oven.
Aluminum cookie sheet-26 cm width×30 cm length with 2 gauge bars 12 mm width×30 cm length×7 mm height.
Cookie cutter (60 mm internal diameter).
Rolling pin with sleeve (sleeve lines run along length of pin).
Spatulas, brown absorbent paper, aluminum foil, plastic beakers
TA-XT2 Texture Analyzer Optional test for dough rheology—special pan dimensions with 10 cm, length 10.5 cm, height 3.2 cm
The Standard Formulation AACC 10-53 Single Batch to Make 4 Test Cookies is:

| Stage-1 | |
| --- | --- |
| Nonfat dry milk powder | 2.25 g |
| Salt | 2.81 g |
| Sodium bicarbonate | 2.25 g |
| Vegetable shortening (Sans Trans 39, Cargill) | 90.00 g |
| Stage-2 | |
| Ammonium bicarbonate | 1.13 g |
| High fructose corn syrup; 42% fructose, 71% solids | 3.38 g |
| Water* | 49.50 g |
| Stage-3 | |
| Flour (at 13% moisture) | 225.00 g |

Measure flour moisture content on each day of baking; adjust levels of flour and water to compensate for deviations from 13% moisture content
Record flour moisture content and insert as FM into equation to calculate actual flour weight per batch $$\text{Actual flour weight (g)} = \frac{87}{(100 - FM)} * 225\ g$$

Record actual flour weight per batch and insert as AFW in equation to calculate actual weight of added water per batch Actual added water (g)=49.5g+225−AFW*225 g General Mixing Procedure
The general mixing procedure used is:
Stage-1: blend dry ingredients (nonfat dry milk, salt, bicarbonate, sugar)
Add fat
Mix in Hobart mixer 3 minutes at low speed; scrape paddle and sides of bowl after each minute of mixing
Stage-2: dissolve ammonium bicarbonate in water; add high fructose corn syrup
Add total solution to stage-1;
Mix 1 min at low speed, scraping bowl and paddle after each 30 sec.
Mix 2 min at medium speed, scraping bowl and paddle after each 30 sec.
Stage-3: Add flour, fold into liquid mixture 3 times; Mix 2 minutes at low speed scraping paddle and bowl after each 30 seconds.

Baketime Determination
The bake determination used is:
The baketime is defined as the time required to produce a weight loss of 13.85% during baking of the formulation at 400 F.

To Measure Baketime:
Bake formulation at 400 F for 10, 11, 12, 13 min and for some whole grain flours up to 16 minutes, weighing the bake sheet+cookies after each minute interval.
Plot % weight loss during baking vs. bake time in minutes
Interpolate baketime required to achieve 13.58% weight loss Baking Specifications:
The baking specifications used are:
Preheat oven to 400 F (202 C)
Record weight of cold cookie sheet
Place cookie sheet in oven for standard baketime; record weight of hot sheet Procedure for Preparation of 4 Dough Blanks for Cookie Test Baking:
Portion four 60 g pieces of dough with minimum deformation and place on cookie sheet. Lay rolling pin across gauge bars of cookie sheet allowing weight of pin to compress the dough pieces without additional compressive force. Pick up rolling pin and place on gauge bars at end of cookie sheet, and roll only once away from you. Cut cookies with 60 mm cutter, and carefully lift scrap dough with small spatula. Lift cutter straight up to avoid horizontal distortion.
Record weight of dough blanks and cookie sheet.
Place dough blanks and cookie sheet in the oven in the direction of sheeting Bake cookies at 400 F for predetermined bake-time.
Weigh cookie sheet with cookies on it immediately upon removal from oven. Carefully remove cookies from sheet with flat spatula and place flat on brown paper in the same direction in which they were sheeted and baked.

Geometry Measurements (Taken when Cookies are Cooled, at Least 30 Minutes)

Width-diameter perpendicular to direction of sheeting. Lay 4 cookies in a row with rolling-pin-sleeve lines parallel to length of meter stick. Record measurement in cm.

Length-diameter parallel to sheeting. Rotate cookies 90 so rolling-pin-sleeve lines are perpendicular to meter stick. Record measurement in cm Stack Height-stack 4 cookies and place stack on side between flat guides. Record height.

In Table 6, are shown the SRC and baking results for control and lactic acid treated flour (duplicates). Included in the table is (1) acid treatment conditions (2) ash (3) solvent retention capacity of the flour for water, sucrose, sodium carbonate and lactic acid solvents (6) flour pH (7) cookie width, cookie length and stack height are shown.

TABLE 6

SRC and AACC 10-53 Cookie Baking Results

| Lipase inhibitor type | Amount acid (dry weight/initial kernel weight) | FFA (ppm) 3 week at 28 C. | Flour pH | Cookie dough pH | % Wt loss baking | Width (cm) 4 | Length (cm) 4 | Stack height (cm) | Water | sucrose | Sodium carbonate | Lactic acid |
|---|---|---|---|---|---|---|---|---|---|---|---|---|
| Control | 0 ppm | 4576 | 6.56 | 8.00 | 13.45 | 30.30 | 30.10 | 4.37 | 65.91 | 99.38 | 82.80 | 71.47 |
| Lactic acid | 3000 ppm | 2628 | 5.54 | 7.65 | 13.84 | 31.20 | 31.30 | 4.10 | 59.53 | 95.77 | 76.58 | 69.11 |
| Lactic acid | 3000 ppm | 2364 | 5.56 | 7.52 | 13.63 | 31.00 | 30.70 | 4.15 | 60.35 | 94.23 | 78.67 | 69.40 |
| Green tea extract | 7000 ppm | 3718 | 6.54 | 7.89 | 13.95 | 31.40 | 31.00 | 4.15 | 62.45 | 90.29 | 76.85 | 70.02 |

The cookies, when tasted by a trained panel were described as more baked/toasted, sweeter and more caramelized compared to control. The cookie texture was harder.

Summary

Lactic acid stabilized whole grain flour demonstrates baking qualities similar to untreated whole grain flour. Some advantages in flavor, more caramelized, sweet and toasted were noted.

Example 5

Part A. Acidification of Whole Kernel Wheat

The objective of this example is understand the relationship of the variables of water level, acid concentration and temper time on soft red wheat kernel moisture and mill performance. Table 7 shows the added water, acid concentration, temper hold time and moles of acid per 100 weight wheat.

TABLE 7

Effect of Water Level, Acid Concentration and Temper Time

| Run | Type | Amount of lactic Acid (dry wgt acid/initial kernel wgt) ppm | Tempering Time (min) | Temper Water Level (%) | [acid conc] (M) | Water (g) | 88.50% Lactic (g) | Acid added (g, dwb) | Acid (moles/100 lb kernels) |
|---|---|---|---|---|---|---|---|---|---|
| 1 | | 0 | 480 | 1 | 0 | 8 | 0 | 0.00 | 0.0000 |
| 2 | Center | 6000 | 240 | 3 | 2.22 | 23.38 | 5.42 | 4.80 | 3.0276 |
| 3 | Unknown | 3000 | 20 | 5 | 0.67 | 39.69 | 2.71 | 2.40 | 1.5138 |
| 4 | Axial | 3000 | 240 | 3 | 1.11 | 23.69 | 2.71 | 2.40 | 1.5138 |
| 5 | Factorial | 3000 | 480 | 1 | 3.33 | 7.69 | 2.71 | 2.40 | 1.5138 |
| 6 | Axial | 6000 | 20 | 3 | 2.22 | 23.38 | 5.42 | 4.80 | 3.0276 |
| 7 | Factorial | 9000 | 480 | 1 | 9.99 | 7.06 | 8.14 | 7.20 | 4.5414 |
| 8 | Center | 6000 | 240 | 3 | 2.22 | 23.38 | 5.42 | 4.80 | 3.0276 |
| 9 | Factorial | 9000 | 480 | 5 | 2 | 39.06 | 8.14 | 7.20 | 4.5414 |

TABLE 7-continued

Effect of Water Level, Acid Concentration and Temper Time

| Run | Type | Amount of lactic Acid (dry wgt acid/initial kernel wgt) ppm | Tempering Time (min) | Temper Water Level (%) | [acid conc] (M) | Water (g) | 88.50% Lactic (g) | Acid added (g, dwb) | Acid (moles/100 lb kernels) |
|---|---|---|---|---|---|---|---|---|---|
| 10 | Axial | 6000 | 240 | 1 | 6.66 | 7.38 | 5.42 | 4.80 | 3.0276 |
| 11 | Unknown | 9000 | 20 | 1 | 9.99 | 7.06 | 8.14 | 7.20 | 4.5414 |
| 12 | Axial | 6000 | 240 | 5 | 1.33 | 39.38 | 5.42 | 4.80 | 3.0276 |
| 13 | Factorial | 3000 | 480 | 5 | 0.67 | 39.69 | 2.71 | 2.40 | 1.5138 |
| 14 | Center | 6000 | 240 | 3 | 2.22 | 23.38 | 5.42 | 4.80 | 3.0276 |
| 15 | Axial | 6000 | 480 | 3 | 2.22 | 23.38 | 5.42 | 4.80 | 3.0276 |
| 16 | Unknown | 3000 | 20 | 1 | 3.33 | 7.69 | 2.71 | 2.40 | 1.5138 |
| 17 | Unknown | 9000 | 20 | 5 | 2 | 39.06 | 8.14 | 7.20 | 4.5414 |
| 18 | Axial | 9000 | 240 | 3 | 3.33 | 23.06 | 8.14 | 7.20 | 4.5414 |
| 19 | Center | 6000 | 240 | 3 | 2.22 | 23.38 | 5.42 | 4.80 | 3.0276 |
| 20 | | 0 | 480 | 1 | 0 | 8 | 0 | 0.00 | 0.0000 |

Procedure

Cleaned wheat sample (800 g) is weighed in an air tight plastic jar mixed with corresponding amount of tempering water containing a specific amount of acid as shown in Table 7. Wheat is tempered for 20 min, 4 hour, or 8 hour intervals at ambient temperature. For example, in order to attain 3000 ppm lactic acid concentration in 800 g wheat, 2.71 g of 88.5% lactic acid solution is added into 7.69 g of tap water for 1% moisture increase. Once tempering water with acid is added into the wheat, the jar was sealed, shaken by hand for 1 min every 10 min for 6 times, then allowed to stand overnight.

Table 8 shows the (1) weight of wheat (2) initial wheat moisture (3)) amount of acid (dwb) added to wheat expressed in parts per million (ppm) (4) temper time (5) % temper water (wt/wt) (7) total water (temper water+water from acid solution) added to moisturize the wheat kernel (8) amount of 88.5% lactic acid solution added (9) water added (10) tempered kernel moisture.

Part B. Wheat Milling

The objective of this procedure was to produce whole grain flour from wheat kernels tempered as described in part A.

Procedure

The tempered wheat samples were milled with a Chopin Laboratory Mill CD1 (Chopin, France) as described previously in example 1. Table 9 shows the flour extraction yield. Yield was calculated on the basis of wheat milled. The flour yield was calculated as Yield=100×[(Coarse and fine bran wt+over-tails wt)/wheat wt], in this study.

TABLE 8

Wheat tempering with different amounts and concentration of acid

| Wheat kernel (g) | Kernel moisture (%) | Amount of lactic Acid/(dry WT acid/initial kernel weight) ppm | Tempering Time (min) | Temperature Water Level (%) | [acid conc] (M) | Water added (g) | 88.5% Lactic acid (g) | Total water (g) | Tempered kernel moisture (%) |
|---|---|---|---|---|---|---|---|---|---|
| 800 | 11.48 | 0 | 480 | 1 | 0.00 | 8.00 | 0.00 | 8 | 12.893 |
| 800 | 11.48 | 6000 | 240 | 3 | 2.22 | 23.38 | 5.42 | 24 | 14.506 |
| 800 | 11.48 | 3000 | 20 | 5 | 0.67 | 39.69 | 2.71 | 40 | 15.452 |
| 800 | 11.48 | 3000 | 240 | 3 | 1.11 | 23.69 | 2.71 | 24 | 14.748 |
| 800 | 11.48 | 3000 | 480 | 1 | 3.33 | 7.69 | 2.71 | 8 | 13.236 |
| 800 | 11.48 | 6000 | 20 | 3 | 2.22 | 23.38 | 5.42 | 24 | 14.052 |
| 800 | 11.48 | 9000 | 480 | 1 | 9.99 | 7.06 | 8.14 | 8 | 13.22 |
| 800 | 11.48 | 6000 | 240 | 3 | 2.22 | 23.38 | 5.42 | 24 | 14.125 |
| 800 | 11.48 | 9000 | 480 | 5 | 2.00 | 39.06 | 8.14 | 40 | 15.721 |
| 800 | 11.48 | 6000 | 240 | 1 | 6.66 | 7.38 | 5.42 | 8 | 13.184 |
| 800 | 11.48 | 9000 | 20 | 1 | 9.99 | 7.06 | 8.14 | 8 | 13.844 |
| 800 | 11.48 | 6000 | 240 | 5 | 1.33 | 39.38 | 5.42 | 40 | 15.563 |
| 800 | 11.48 | 3000 | 480 | 5 | 0.67 | 39.69 | 2.71 | 40 | 15.258 |
| 800 | 11.48 | 6000 | 240 | 3 | 2.22 | 23.38 | 5.42 | 24 | 14.227 |
| 800 | 11.48 | 6000 | 480 | 3 | 2.22 | 23.38 | 5.42 | 24 | 14.814 |
| 800 | 11.48 | 3000 | 20 | 1 | 3.33 | 7.69 | 2.71 | 8 | 13.282 |
| 800 | 11.48 | 9000 | 20 | 5 | 2.00 | 39.06 | 8.14 | 40 | 15.157 |
| 800 | 11.48 | 9000 | 240 | 3 | 3.33 | 23.06 | 8.14 | 24 | 14.691 |
| 800 | 11.48 | 6000 | 240 | 3 | 2.22 | 23.38 | 5.42 | 24 | 14.603 |
| 800 | 11.48 | 0 | 480 | 1 | 0.00 | 8.00 | 0.00 | 8 | 12.955 |

TABLE 9

Flour Extraction Yield

| Amount of lactic Acid (dry WT acid/initial kernel weight) ppm | Tempered kernel moisture (%) | Extraction yield (%) |
|---|---|---|
| 0 | 12.893 | |
| 6000 | 14.506 | 69.85 |
| 3000 | 15.452 | 65.30 |
| 3000 | 14.748 | 69.00 |
| 3000 | 13.236 | |
| 6000 | 14.052 | 66.96 |
| 9000 | 13.22 | |
| 6000 | 14.125 | 68.53 |
| 9000 | 15.721 | |
| 6000 | 13.184 | 66.04 |
| 9000 | 13.844 | 65.56 |
| 6000 | 15.563 | 67.14 |
| 3000 | 15.258 | |
| 6000 | 14.227 | 68.12 |
| 6000 | 14.814 | |
| 3000 | 13.282 | |
| 9000 | 15.157 | 67.39 |
| 9000 | 14.691 | 66.93 |
| 6000 | 14.603 | 67.31 |
| 0 | 12.955 | |

Summary

Wheat kernels were tempered with water containing different amounts of acid. Added moisture was adjusted according to the initial wheat kernel moisture so that the final kernel moisture, after tempering, was increased to 1, 3, and 5%. The amount of acid added to the temper water was adjusted so that ranges of 0 ppm to 9,000 ppm (dry weight acid per initial weight of wheat) were tested. Normal milling behavior was observed for all types and amounts of acid treatments. Flour extraction yield was typically around 65% to 70% and all mill fractions were recombined to form whole grain flour with natural proportions of bran, germ and endosperm.

Example 6

Production of Coarse Ground Bran from Acid Treated Kernels and Recombination to Whole Grain Flour The objective of this procedure was to reduce the particle size of the coarse bran fraction and reduction over-tails obtained from the milling of the acid treated wheat. The coarse bran from first break roll and the coarse over-tails from the reduction roll, were frozen, ground, and recombined to whole grain flour as described in example 2. Whole grain flour particle size distribution was determined by Roto Tap method previously described.

Whole grain flour pH was measured in a 10% slurry (one part flour to 9 part water) using a Corning pH meter 360i equipped with model #A-58905-66 High-performance combination pH electrode. Ash is determined according to AOAC official method 923.03 for measuring ash in flour. Flour moisture was determined according to AACC Method 44-15A.

Table 10 shows the whole grain flour characteristics of (1) amount of acid (2) pH (3) moisture of flour (4) ash content and (5) particle size distribution.

TABLE 10

Characterization of Whole Grain Flour

| Amount of lactic Acid (dry WT acid/initial kernel weight) ppm | pH | moisture | MBAsh | Rotap +35 | Rotap +50 | Rotap +60 | Rotap +80 | Rotap +100 | Rotap through 100 | Rotap +70 | Total |
|---|---|---|---|---|---|---|---|---|---|---|---|
| 0 | 6.5 | 12.893 | 1.40 | 0.80 | 7.40 | 4.60 | 4.40 | 20.20 | 61.80 | 1.60 | 100.8 |
| 6000 | 4.87 | 14.506 | 1.41 | 0.80 | 8.00 | 3.20 | 4.60 | 6.80 | 75.00 | 2.20 | 100.6 |
| 3000 | 5.52 | 15.452 | 1.45 | 0.80 | 7.40 | 5.00 | 4.20 | 19.60 | 60.60 | 2.20 | 99.8 |
| 3000 | 5.52 | 14.748 | 1.42 | 0.20 | 5.40 | 3.20 | 4.60 | 21.00 | 62.80 | 2.60 | 99.8 |
| 3000 | 5.47 | 13.236 | 1.39 | 0.80 | 7.20 | 3.80 | 4.00 | 14.60 | 67.60 | 2.00 | 100 |
| 6000 | 4.91 | 14.052 | 1.43 | 0.60 | 7.20 | 3.80 | 4.00 | 13.60 | 68.20 | 2.20 | 99.6 |
| 9000 | 4.49 | 13.22 | 1.41 | 6.00 | 7.40 | 3.00 | 4.20 | 7.00 | 74.60 | 2.60 | 104.8 |
| 6000 | 4.9 | 14.125 | 1.41 | 1.20 | 8.40 | 3.60 | 4.40 | 15.60 | 64.20 | 2.40 | 99.8 |
| 9000 | 4.53 | 15.721 | 1.42 | 0.40 | 6.80 | 3.20 | 4.60 | 7.40 | 75.00 | 2.60 | 100 |
| 6000 | 4.85 | 13.184 | 1.41 | 0.20 | 4.80 | 4.80 | 6.00 | 25.20 | 55.80 | 3.20 | 100 |
| 9000 | 4.52 | 13.844 | 1.43 | 0.40 | 5.00 | 3.40 | 3.40 | 12.20 | 72.80 | 2.80 | 100 |
| 6000 | 4.92 | 15.563 | 1.44 | 1.00 | 8.20 | 4.20 | 4.40 | 15.00 | 64.60 | 2.60 | 100 |
| 3000 | 5.51 | 15.258 | 1.46 | 0.20 | 5.60 | 4.40 | 4.60 | 17.40 | 64.40 | 3.40 | 100 |
| 6000 | 4.93 | 14.227 | 1.43 | 0.20 | 4.80 | 3.80 | 5.80 | 18.80 | 63.20 | 3.20 | 99.8 |
| 6000 | 4.93 | 14.814 | 1.45 | 0.20 | 4.40 | 3.60 | 5.80 | 20.00 | 61.40 | 3.80 | 99.2 |
| 3000 | 5.51 | 13.282 | 1.39 | 0.20 | 6.80 | 3.60 | 5.00 | 12.60 | 68.00 | 3.20 | 99.4 |
| 9000 | 4.59 | 15.157 | 1.43 | 1.20 | 8.00 | 4.40 | 5.20 | 10.20 | 67.40 | 3.60 | 100 |
| 9000 | 4.53 | 14.691 | 1.41 | 0.40 | 6.20 | 4.40 | 6.00 | 14.60 | 64.20 | 4.20 | 100 |
| 6000 | 4.88 | 14.603 | 1.43 | 0.40 | 7.80 | 3.80 | 6.00 | 13.20 | 64.00 | 3.80 | 99 |
| 0 | 6.61 | 12.955 | 1.41 | 0.20 | 6.40 | 4.00 | 6.20 | 12.60 | 66.00 | 4.20 | 99.6 |

Extractable lipase activity was determined for each flour. The method used to determine lipase activity is as described in Example 2.

The extractable lipase activity for the various whole grain flours are shown in Table 11:

TABLE 11

Extractable Lipase Activity as a function of flour pH

| pH | Lipase Activity (units/g) |
|---|---|
| 6.5 | 337.2 |
| 4.87 | 296.92 |
| 5.52 | 318.39 |
| 5.52 | 352.87 |
| 5.47 | 325.72 |
| 4.91 | 294.43 |
| 4.49 | 284.27 |
| 4.9 | 283.72 |
| 4.53 | 269.12 |
| 4.85 | 292.14 |
| 4.52 | 330.65 |
| 4.92 | 294 |
| 5.51 | 349.35 |
| 4.93 | 327.11 |
| 4.93 | 306 |
| 5.51 | 350.02 |
| 4.59 | 270.84 |
| 4.53 | 265.78 |
| 4.88 | 284.69 |
| 6.61 | 351.31 |

Summary and Conclusion

The particle size distribution of the final flour was similar among the test variables of final moisture, temper time and pH, with about 10% to 15% of the flour weight >250 um and about 60% to 75%<150 um. Use of ash measurement in flour milling is based upon the greater concentration of ash (minerals) in the bran, aleurone and germ than in the endosperm. Ash content is a widely used index of refined flour purity and provides a means to measure mechanical separation of the kernel components during the milling process. In this case, ash is used as an indicator of complete, reproducible recombination of the coarse ground fraction with the flour endosperm to make whole grain flour with natural proportion of bran, germ and endosperm. The pH of the final flour depended upon the amount acid used to temper the whole kernel. The extractable lipase activity in the whole grain flour decreased slightly at lower pH.

Example 7

Effect of Acid Tempering on Whole Grain Flour Stability and Function

The objective of this example was to measure the amount of free fatty acid formed in whole grain flour, prepared in examples 5 and 6, stored in a sealed glass jar for 28 days at 92 F. Whole grain flour function was tested by Solvent Retention Capacity test described in Example 4.

A. Effect of Variable of Added Acid, Added Temper Water, and Temper Time on Free Fatty Acid Formation in Whole Grain Flour Free fatty acid content of whole grain flour (fresh flour and 28 days aged flour) prepared in examples 5 and 6 were determined according to the method disclosed in Example 4.

Table 12 shows (1) weight of lactic acid added (2) Total % water added to wheat (wt/wt), all sources except naturally occurring in wheat kernel (3) Temper time (4) Acid concentration (5) flour pH (6) initial free fatty acid content (7) free fatty acid content of flour stored for 28 days at 92 F (8) % reduction in free fatty acid compared to untreated control Acid concentration is calculated for 800 g batch of wheat kernels:

[Lactic acid, dry wt (ppm or (μg/g wheat)]*800=total dry weight acid

Total dry weight acid/lactic acid molecular weight=moles acid

% water*800 g wheat=total water (g)/volume equivalent (1 ml); water (ml)/1000=total water (L)

[acid conc.]=moles acid/liter water=molar concentration (M)

The results are shown in Table 12:

TABLE 12 pH and FFA content of aged whole grain flour

| Amount of lactic Acid (dry WT acid/initial kernel weight, ppm) | % Total Water Level (wt/wt) | Temper Time (min) | [acid conc] (M) | pH | FFA concentration, Day 0 (ppm) | FFA concentration 28 day(ppm) | % Inhibition |
|---|---|---|---|---|---|---|---|
| 0 | 1 | 480 | 0.00 | 6.5 | 510 | 2826 | 5.93 |
| 6000 | 3 | 240 | 2.22 | 4.87 | 466 | 1762 | 41.34 |
| 3000 | 5 | 20 | 0.67 | 5.52 | 485 | 2973 | 1.03 |
| 3000 | 3 | 240 | 1.11 | 5.52 | 505 | 2524 | 15.98 |
| 3000 | 1 | 480 | 3.33 | 5.47 | 508 | 2183 | 27.33 |
| 6000 | 3 | 20 | 2.22 | 4.91 | 501 | 1626 | 45.87 |
| 9000 | 1 | 480 | 9.99 | 4.49 | 474 | 1425 | 52.56 |
| 6000 | 3 | 240 | 2.22 | 4.9 | 468 | 1383 | 53.96 |
| 9000 | 5 | 480 | 2.00 | 4.53 | 475 | 2222 | 26.03 |
| 6000 | 1 | 240 | 6.66 | 4.85 | 468 | 1809 | 39.78 |
| 9000 | 1 | 20 | 9.99 | 4.52 | 441 | 1524 | 49.27 |
| 6000 | 5 | 240 | 1.33 | 4.92 | 469 | 3248 | −8.12 |
| 3000 | 5 | 480 | 0.67 | 5.51 | 487 | 3241 | −7.89 |
| 6000 | 3 | 240 | 2.22 | 4.93 | 477 | 1893 | 36.98 |
| 6000 | 3 | 480 | 2.22 | 4.93 | 467 | 2043 | 31.99 |
| 3000 | 1 | 20 | 3.33 | 5.51 | 493 | 1298 | 23.50 |
| 9000 | 5 | 20 | 2.00 | 4.59 | 451 | 1881 | 37.38 |
| 9000 | 3 | 240 | 3.33 | 4.53 | 461 | 1533 | 48.97 |

TABLE 12-continued pH and FFA content of aged whole grain flour

| Amount of lactic Acid (dry WT acid/initial kernel weight, ppm) | % Total Water Level (wt/wt) | Temper Time (min) | [acid conc] (M) | pH | FFA concentration, Day 0 (ppm) | FFA concentration 28 day(ppm) | % Inhibition |
|---|---|---|---|---|---|---|---|
| 6000 | 3 | 240 | 2.22 | 4.88 | 467 | 1716 | 42.88 |
| 0 | 1 | 480 | 0.00 | 6.61 | 500 | 3182 | −5.93 |

Statistical analysis by using Design Expert® software (Stat-Ease, Inc.) confirmed a significant effect of the amount of lactic acid added and the amount of added water used to temper the grain from which the flour was made.

Figure 6:
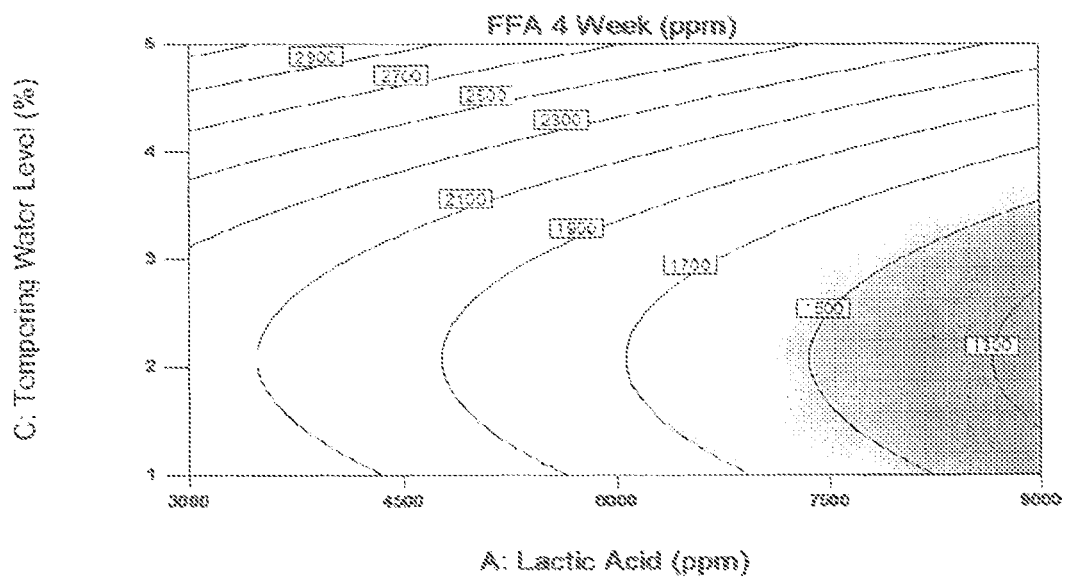
FIG. 6. is a two variable analysis plot showing the effect of lactic acid and the tempering water level on free fatty acid content of whole grain flour of Example 7 after 28 days at 92° F.

FIG. 6 shows a two variable analysis plot for the total free fatty acids formed after 28 days at 92° F. The effect of lactic acid and the tempering water on free fatty acid content of whole grain flour after 28 days at 92° F. is shown in FIG. 6. Variable A is lactic acid concentration added to the flour and Variable C is tempering water level of the wheat kernel. The optimum tempering condition is represented in the lower right corner of the plot; higher amount of added lactic acid and lower amount of added water produced the whole grain flour with the lowest formation of free fatty acids over shelf-life.

B. Effect of Acid Tempering on Whole Grain Flour Function as Measured by SRC

Using the SRC method described example 4, changes to whole grain flour functional characteristics were measured Table 13 shows the flour process variables (1) added lactic acid (2) added temper water (3) concentration of acid in water (4) temper time and the (5) solvent retention capacity values for the four solvents; water, sucrose, sodium carbonate, lactic acid and (6) lactic acid SRC divided by the water SRC.

Figure 7:
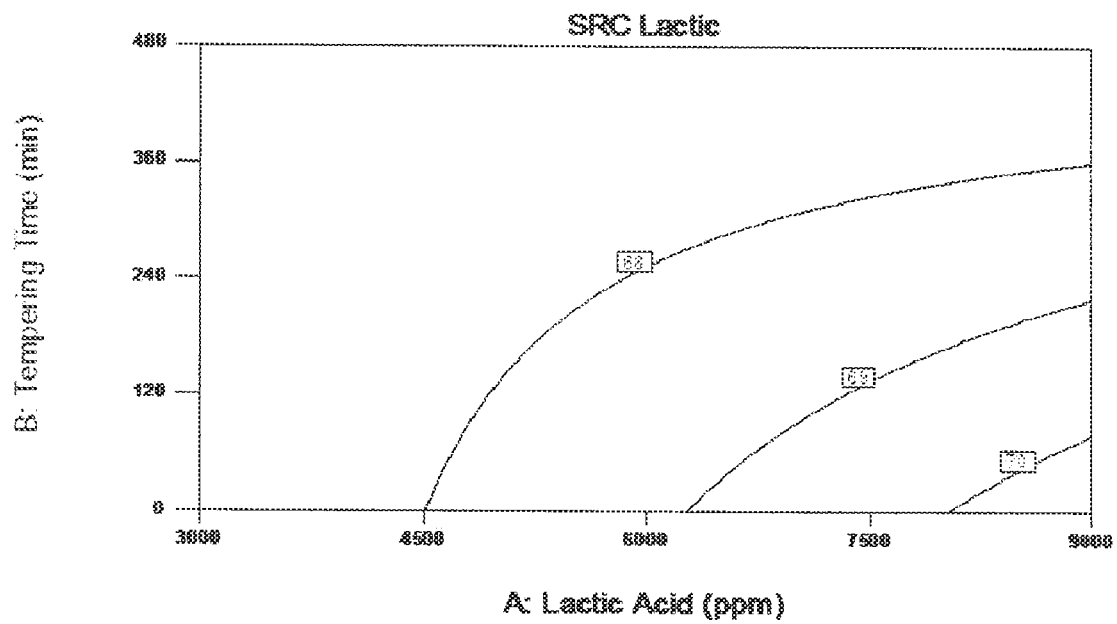
FIG. 7 is a plot showing the effect of temper time and the amount of lactic acid added on flour strength as measured by lactic acid SRC value for the whole grain flours of Example 7.

Statistical analysis by using Design Expert® software showed that temper time and the amount of lactic acid added did not decrease flour strength as measured by lactic acid SRC value as shown in FIG. 7 which is a plot of SRC (68, 69, 70) of whole grain flour as a function of tempering time and the amount lactic acid (ppm). Furthermore, general flour absorption, measured by water SRC value, desired to be low for a soft wheat flour, showed no changes as a function of acid treatment and the ratio lactic acid SRC divided by water SRC did not change as a function of treatment (e.g. high ratio shows stronger flour and low adsorption).

Milling of the tempered wheat produces four fractions of the wheat kernel which are combined to make to whole flour. The fractions are, moving from the external layers of the wheat kernel to the internal layer; coarse bran, fine bran, reduction flour and the break flour. Table 14 shows the measurement of moisture and pH of each of these milled fractions before recombining to whole flour.

In Table 14 is shown the: (1) distribution of moisture and pH in the break flour (2) distribution of moisture and pH in the coarse bran (3) distribution of moisture and pH in the reduction flour (4) distribution of moisture and pH in the fine bran (5) respective weights of each fraction.

TABLE 13

SRC Results

| Amount of lactic Acid (dry WT acid/initial kernel weight) ppm | % Total Water Level (wt/wt) | Temper Time (min) | [acid conc] (M) | Water SRC % | Sucrose SRC % | Na2Co3 SRC % | Lactic SRC % | LA SRC/Water SRC |
|---|---|---|---|---|---|---|---|---|
| 0 | 1 | 480 | 0.00 | 63.98 | 70.67 | 79.53 | 69.12 | 1.08 |
| 6000 | 3 | 240 | 2.22 | 61.67 | 72.18 | 77.81 | 67.53 | 1.09 |
| 3000 | 5 | 20 | 0.67 | 59.14 | 71.59 | 77.77 | 66.87 | 1.13 |
| 3000 | 3 | 240 | 1.11 | 57.78 | 69.10 | 76.06 | 66.29 | 1.15 |
| 3000 | 1 | 480 | 3.33 | 59.97 | 70.35 | 77.76 | 68.09 | 1.14 |
| 6000 | 3 | 20 | 2.22 | 60.52 | 73.54 | 77.96 | 68.34 | 1.13 |
| 9000 | 1 | 480 | 9.99 | 62.27 | 70.39 | 77.53 | 67.21 | 1.08 |
| 6000 | 3 | 240 | 2.22 | 61.72 | 70.11 | 77.82 | 68.06 | 1.10 |
| 9000 | 5 | 480 | 2.00 | 60.89 | 69.95 | 76.60 | 66.81 | 1.10 |
| 6000 | 1 | 240 | 6.66 | 62.28 | 70.06 | 76.47 | 67.67 | 1.09 |
| 9000 | 1 | 20 | 9.99 | 62.79 | 71.46 | 77.34 | 68.79 | 1.10 |
| 6000 | 5 | 240 | 1.33 | 61.78 | 70.65 | 77.93 | 67.28 | 1.09 |
| 3000 | 5 | 480 | 0.67 | 59.13 | 67.38 | 78.23 | 67.14 | 1.14 |
| 6000 | 3 | 240 | 2.22 | 60.91 | 68.98 | 76.75 | 66.33 | 1.09 |
| 6000 | 3 | 480 | 2.22 | 60.01 | 69.17 | 76.64 | 66.94 | 1.12 |
| 3000 | 1 | 20 | 3.33 | 60.40 | 67.18 | 76.35 | 68.13 | 1.13 |
| 9000 | 5 | 20 | 2.00 | 64.12 | 76.73 | 81.35 | 71.81 | 1.12 |
| 9000 | 3 | 240 | 3.33 | 61.55 | 72.14 | 75.84 | 69.68 | 1.13 |
| 6000 | 3 | 240 | 2.22 | 62.18 | 71.92 | 78.04 | 71.44 | 1.15 |
| 0 | 1 | 480 | 0.00 | 66.92 | 71.33 | 82.80 | 67.13 | 1.00 |

TABLE 14 pH and Moisture Results for Flour Fractions

| Lactic Acid (ppm) | % Total Water Level (wt/wt) | Temper Time (min) | [acid conc. in total water] (M) | pH Final Flour | FFA 28 day (ppm) | Break flour moisture | break flour pH | break flour wt (g) | coarse bran moisture |
|---|---|---|---|---|---|---|---|---|---|
| 0 | 1 | 480 | 0.00 | 6.5 | 2826 | 13.90 | 5.78 | 397.06 | 13.59 |
| 6000 | 3 | 240 | 2.22 | 4.87 | 1762 | 15.03 | 5.26 | 445.26 | 14.58 |
| 3000 | 5 | 20 | 0.67 | 5.52 | 2973 | 15.88 | 5.22 | 403.66 | 15.80 |
| 3000 | 3 | 240 | 1.11 | 5.52 | 2524 | 15.03 | 5.57 | 434.76 | 14.62 |
| 3000 | 1 | 480 | 3.33 | 5.47 | 2183 | 13.74 | 5.49 | 392.96 | 13.70 |
| 6000 | 3 | 20 | 2.22 | 4.91 | 1626 | 14.45 | 5.00 | 378.38 | 14.49 |
| 9000 | 1 | 480 | 9.99 | 4.49 | 1425 | 13.81 | 4.95 | 389.89 | 13.71 |
| 6000 | 3 | 240 | 2.22 | 4.9 | 1383 | 14.85 | 5.30 | 434.16 | 14.49 |
| 9000 | 5 | 480 | 2.00 | 4.53 | 2222 | 16.35 | 4.73 | 446.06 | 15.85 |
| 6000 | 1 | 240 | 6.66 | 4.85 | 1809 | 13.89 | 5.23 | 445.26 | 13.45 |
| 9000 | 1 | 20 | 9.99 | 4.52 | 1524 | 13.55 | 4.73 | 360.56 | 13.24 |
| 6000 | 5 | 240 | 1.33 | 4.92 | 3248 | 15.93 | 5.28 | 441.86 | 15.59 |
| 3000 | 5 | 480 | 0.67 | 5.51 | 3241 | 16.45 | 5.29 | 462.56 | 15.91 |
| 6000 | 3 | 240 | 2.22 | 4.93 | 1893 | 14.76 | 5.22 | 432.36 | 14.49 |
| 6000 | 3 | 480 | 2.22 | 4.93 | 2043 | 15.20 | 5.13 | 432.46 | 14.97 |
| 3000 | 1 | 20 | 3.33 | 5.51 | 2298 | 13.54 | 5.38 | 375.15 | 13.47 |
| 9000 | 5 | 20 | 2.00 | 4.59 | 1881 | 15.88 | 4.28 | 401.66 | 15.80 |
| 9000 | 3 | 240 | 3.33 | 4.53 | 1533 | 14.94 | 4.88 | 422.36 | 14.81 |
| 6000 | 3 | 240 | 2.22 | 4.88 | 1716 | 14.88 | 5.20 | 429.66 | 14.77 |
| 0 | 1 | 480 | 0.00 | 6.61 | 3182 | 13.80 | 5.66 | 394.83 | 13.71 |

| Lactic Acid (ppm) | coarse bran pH | coarse bran wt (g) | fine bran moisture | fine bran pH | fine bran wt (g) | reduction moisture | reduction pH | reduction wt (g) |
|---|---|---|---|---|---|---|---|---|
| 0 | 5.67 | 181.97 | 13.38 | 6.41 | 76.08 | 13.55 | 6.52 | 151.84 |
| 6000 | 4.79 | 179.87 | 14.27 | 4.72 | 82.39 | 15.62 | 4.43 | 119.15 |
| 3000 | 4.84 | 112.78 | 15.96 | 5.33 | 136.96 | 17.51 | 5.48 | 159.54 |
| 3000 | 5.37 | 184.88 | 14.48 | 5.37 | 69.58 | 15.58 | 4.86 | 120.26 |
| 3000 | 5.45 | 182.09 | 12.92 | 5.26 | 71.26 | 13.43 | 4.84 | 153.44 |
| 6000 | 4.46 | 164.14 | 14.50 | 4.63 | 98.27 | 16.07 | 4.61 | 176.64 |
| 9000 | 4.58 | 182.19 | 13.18 | 4.17 | 96.72 | 13.37 | 4.05 | 135.04 |
| 6000 | 5.00 | 182.06 | 14.23 | 4.74 | 75.54 | 15.28 | 4.41 | 121.44 |
| 9000 | 4.22 | 176.52 | 16.57 | 4.32 | 89.67 | 17.21 | 4.21 | 104.96 |
| 6000 | 5.03 | 179.87 | 12.42 | 4.52 | 82.39 | 13.5 | 4.28 | 162.24 |
| 9000 | 4.44 | 173.73 | 12.72 | 4.17 | 84.66 | 13.41 | 4.20 | 187.74 |
| 6000 | 4.73 | 180.20 | 15.77 | 4.75 | 80.71 | 17.37 | 4.50 | 113.81 |
| 3000 | 5.04 | 189.38 | 16.33 | 5.25 | 79.48 | 17.25 | 4.90 | 93.54 |
| 6000 | 4.89 | 185.49 | 14.05 | 4.64 | 71.90 | 15.56 | 4.45 | 136.02 |
| 6000 | 4.82 | 188.01 | 14.84 | 4.65 | 87.52 | 15.34 | 4.40 | 110.01 |
| 3000 | 5.23 | 175.79 | 12.72 | 5.18 | 68.81 | 13.39 | 4.76 | 172.34 |
| 9000 | 3.94 | 100.29 | 16.03 | 4.38 | 147.28 | 16.81 | 4.65 | 168.44 |
| 9000 | 4.46 | 180.05 | 14.79 | 4.22 | 86.53 | 15.58 | 4.26 | 129.56 |
| 6000 | 4.76 | 182.27 | 14.90 | 4.68 | 96.20 | 15.45 | 4.46 | 105.95 |
| 0 | 5.57 | 185.36 | 13.37 | 6.27 | 72.30 | 13.41 | 6.40 | 156.84 |

Figure 8:
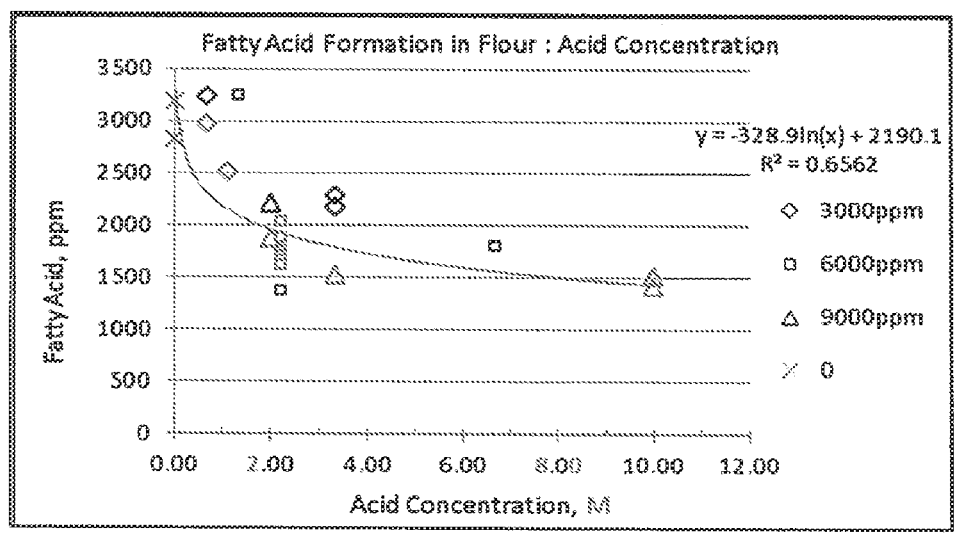
FIG. 8: is a plot showing free fatty acid (FFA) formation in the final whole grain flour of Example 7 as a function of acid concentration and amount applied to the wheat.

The FFA formed in the whole grain flour during storage is correlated with amount and concentration of acid applied as shown in FIG. 8. FIG. 8 shows free fatty acid (FFA) formation in the final flour as a function of acid concentration and amount applied to the wheat. The greatest reduction is seen at greater than 0.67 M and increasing the amount of acid added also reduces free fatty acid formation.

Figure 9:
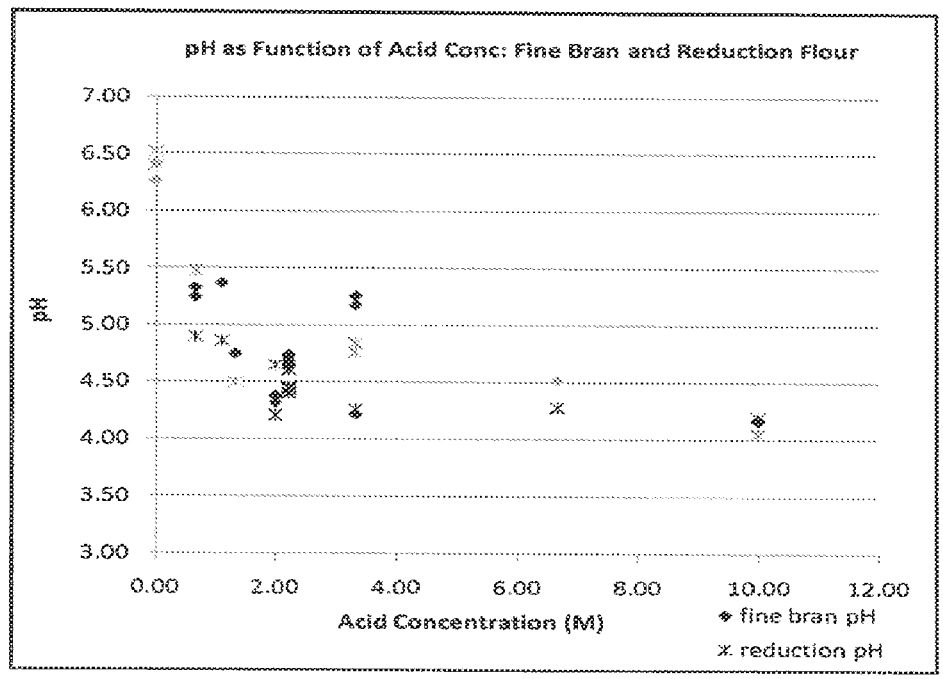
FIG. 9: is a plot showing pH as a function of acid concentration for fine bran and reduction flour of Example 7.

FIG. 9 shows pH as a function of acid concentration for fine bran and reduction flour. As shown in FIG. 9, the fine bran fraction, where most of the lipase activity resides and the reduction flour fractions (portion of flour closest to bran) demonstrate a significant drop in pH as the concentration of acid applied to the wheat is increased.

Figure 10:
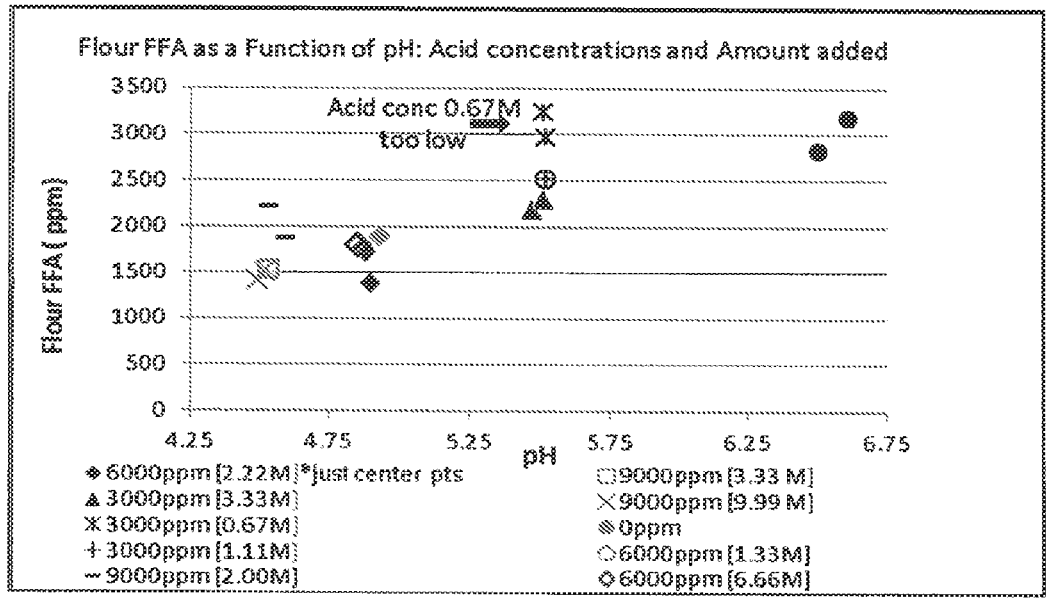
FIG. 10 is a graph showing free fatty acids (FFA) formed in the whole grain flour of Example 7 as a function of pH and acid concentration applied to the wheat.

As shown in FIG. 10, free fatty acids (FFA) formed in the flour decreases as pH decreases, and acid concentration applied to the wheat also influences free fatty acid formation. The free fatty acids formed in the final whole grain flour are reduced as the pH of the whole grain flour decreases as shown in FIG. 10. Acid concentration applied to the wheat must be above a minimum level to see a preferred effect on reducing free fatty acid formation.

Figure 11:
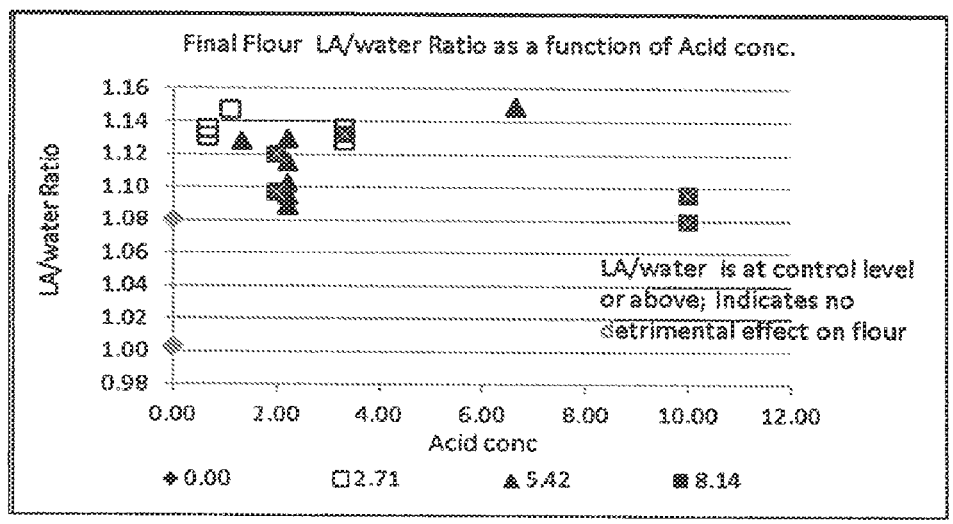
FIG. 11 is plot showing the effect of lactic acid concentration in the tempering water on lactic acid SRC/water SRC ratio of whole grain flour of Example 7 after 28 days at 92° F.
Figure 12:
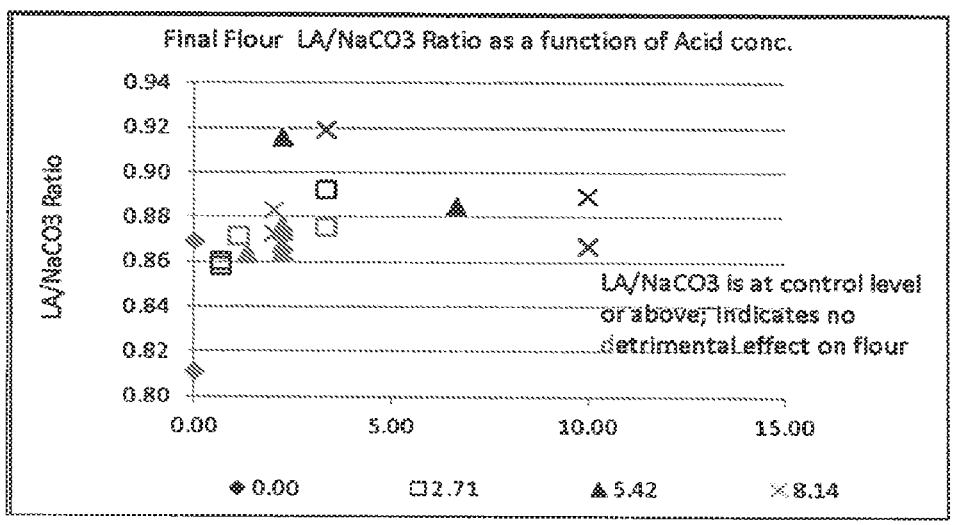
FIG. 12 is a plot showing the effect of lactic acid concentration in the tempering water on the lactic acid SRC/water SRC ratio of whole grain flour of Example 7 after 28 days at 92° F.

FIG. 11 and FIG. 12 show the effect of lactic acid concentration in the tempering water on the Lactic Acid SRC/Water SRC Ratio of whole grain flour after 28 days at 92° F. The effect of acid concentration on flour absorption and gluten strength is shown, expressed as the ratio of lactic acid SRC divided by the water SRC in FIG. 11, and lactic acid SRC divided by the sodium carbonate SRC in FIG. FIG. 12. In all cases, the ratios remain at least as high as the untreated control flour indicating that there is no detrimental effect to the flour function.

Summary

Stabilization through acidification reduced the amount of free fatty acids formed in the whole grain flour. Free fatty acid level after 28 days was 3004 ppm in the untreated control. Flour fatty acid formation at about 9000 ppm lactic acid concentration and 4.5 pH was reduced to 1425 ppm.

Tempering time (20 min to 8 hour) had a slight effect on the WG flour shelf life as measured by fatty acid formation.

In general, free fatty acid formation decreased with increasing amount of acid added and increasing acid concentration.

Overall reduction in free fatty acids formed ranged from 16% reduction up to 54% reduction. A smaller reduction was seen with the 5% tempering water condition which reduced the concentration of acid and was not as effective. It is believed that this reduction in free fatty acids, which are a critical substrate of the lipoxygenase enzyme, substantially reduces the amount of oxidized fat in the flour below the aroma/flavor threshold of about 3,000 ppm (or 10% of total lipid content) and thus extends shelf-life substantially.

Lactic acid stabilized whole grain flour demonstrates SRC similar to untreated whole grain flour. No trends were seen with any of the other solvents and the ratio of lactic acid SRC divided by sodium carbonate SRC was not different from control flour indicating same low flour absorption and sufficiently strong gluten expected of good quality biscuit flour.

Example 8

Effect of Acid on Lipase Activity Inhibition

The objective of this example was to test the effect of acid type and concentration on the lipase activity after pre-incubation of the enzyme for 40 minutes in acid solution. The following acids and levels were tested; (1) 5 ml lactic acid (8 g/1000 ml pH 2.57), add 20 µl lipase and 980 µl water inhibition 40 min; (2) 5 ml lactic acid (2 g/1000 ml pH 2.85), add 20 µl lipase and 980 µl water inhibition 40 min; (3) 5 ml lactic acid (16 g/1000 ml pH 2.48), add 20 µl lipase and 980 µl water inhibition 40 min; (4) 5 ml acetic acid (1 g/1000 ml pH 2.80), add 20 µl lipase and 980 µl water inhibition 40 min; (5) 5 ml HCL (4 g/1000 ml, pH 1.5), add 20 µl lipase and 980 µl water inhibition 40 min; (6) 5 ml green tea extract (8 g/1000 ml), add 20 µl lipase and 980 µl water inhibition 40 min.

Results were compared to lipase enzyme activity in the control (20 µl 20 u/µl Novozyme lipase from *Aspergillus oryzae*, control pH 4.14, add 0.29 ml 0.1N KOH to adjust pH to 7.84, then 20 µl lipase and 980 µl water, start the timer and titration).

Lipase (3.1.1.3) activity was adapted from the method set forth in "Worthington, Von.; The Worthington Manual; 1993 from Worthington Biochemical Corporation, 730 Vassar Avenue, Lakewood, New Jersey 08701".

The procedure is as follows:
Lipase I.U.B.: 3.1.1.3 Triacylglycerol Acylhydrolase Pancreatic lipase (PL), one of the exocrine enzymes of pancreatic juice, catalyzes the hydrolysis of emulsified esters of glycerol and long chain fatty acids. The substrate is not a single molecule but a nonaqueous phase of aggregated lipid (Brockerhoff and Jensen 1974). The operative substrate characteristic is aggregates of ester molecules, micelles or monomolecular film, interfacing an aqueous medium. Enzyme activity is directly related to the concentration of substrate molecules on the interface (Esposito et al 1973; Lagocki et al 1973. PL attacks the primary ester groups most readily. Monoglycerides are poor substrates (it is the 2-monoglycerides that are absorbed through the intestinal wall and reformed into lymph chlyomicrons). Pancreatic lipases have been thoroughly reviewed by Brockerhoff and Jensen (1974), and Desnuell (1972). Liberman and Ollis (1975) have reported on lipase immobilized on stainless steel and polyacrylamide beads. Using a fluidized bed recycle reactor it is indicated that enzyme-substrate affinity is not altered.

Characteristics of Lipase from Porcine Pancreas:

Two lipases are present. Lipase A is more acidic than Lipase B; otherwise, the two isoenzymes are nearly the same (Verger et al 1969). Normally, a cofactor is bound to the enzymes (Maylie et al 1971). Two co-lipases were purified by Erlanson et al (1973). They were quite similar polypeptide chains with a molecular weight of 11,000. See also Borgstrom et al (1974). Borgstrom and Earlanson (1973) indicated that co-lipase might be classified as a co-enzyme for lipase in that they interact in a stoichiometrical relationship.

Enzymatic Reaction
Molecular Weight:
 45,000-50,000 (Verger et al 1969)
Composition:
 The amino acid composition, which is almost identical except for isoleucine, is shown in Brockerhoff and Jensen (1974)-(Table IV-3, pg. 43). Both contain a carbohydrate moiety (Garner and Smith 1972). Histidine is involved in the active site (Semeriva et al 1971). See Hultin (1992). Modification of the free carboxyl group by amide formation inactivates the enzyme (Semeriva et al 1972). According to Desnuelle (1972) the carboxyl in lipase stabilizes the active enzyme, i.e., the enzyme conformation resulting from adsorption at a hydrophobic interface. Although PL contains two disulfide groups, they are not involved in enzymatic activity (Verger et al 1971). Diisopropylphosphofluoridate (DFP) binds to a tyrosine residue but it is not inhibitory (Maylie et al 1969). See also Rovery et al. (1973)

Extinction Coefficient:
 $E_{280}^{196}$=13.3 (Desnuelle 1972)
Isoelectric Point:
 Lipase A=4.9 (Brockerhoff and Jensen 1974) and Lipase B=5.0
Activity:
 See Desnuelle (1972) on "Catalytic Properties" (page 586). Momsen and Brockman (1976a and b) report the effects of taurodeoxycholate and co-lipase. At low concentrations, up to 0.3 mM, the bile salt increases the stability of the lipase to 5 fold. At higher levels (0.3-0.8 mM), but below the critical micelle concentration, it interferes with enzyme adsorption on the substrate interface, thus inhibiting lipolysis. Co-lipase counters this inhibitory effect by providing high affinity binding sites at the surface of the lipase-bile salt complex. See also Borgstrom and Elanson (1973), Borgstrom et al (1974), and Kaimal and Saroja (1989). Co-lipase without bile-salts only mildly stimulates activity. Brockman et al (1973) report on PL activity toward soluble triglycerides such as tripropionin. It is stimulated in the presence of hydrophobic surfaces. Santhanam and Wagle (1971) indicate that protein kinase, $Mg^{2+}$, ATP and cAMP stimulate PL activity.

Specificity:
 PL has a broad spectrum of side chain specificity (Lagocki et al 1973). See also Savary (1972) and Brockerhoff (1969a)
Activators:
 $Ca^{2+}$ is required for activity [$Sr^2$ and $Mg^{2+}$ are less effective activators (Sarda et al 1957)].
Inhibitors:
 Versene, $Zn^{2+}$, $Cu^{2+}$, $Hg^{2+}$, iodine, PCMB (Willis 1960). DFP does not inhibit.
Stabilizers:
 DFP may be used to stabilize impure preparations containing proteinases in solutions.
Stability:
 Highly purified, homogeneous preparations of hog pancreas lipase are extremely labile.

Enzymatic Assay of LIPASE (EC 3.1.1.3)

Principle:

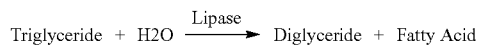

Triglyceride + H2O $\xrightarrow{\text{Lipase}}$ Diglyceride + Fatty Acid

Conditions:
T=25° C., pH=8.0

Method:
Titrimetric

Reagents:
A. Olive Oil Substrate (Olive Oil) (Use Sigma Lipase Substrate, Sigma Stock No. 800-1)
B. 3000 mM Sodium Chloride Solution (NaCl) (Prepare 100 ml in deionized water using Sodium Chloride, Sigma Prod. No. S-9625.)
C. 0.5% Albumin. Prepare fresh daily.
D. 75 mM Calcium Chloride Solution (CaCl$_2$)) (Prepare 25 ml in deionized water using Calcium Chloride, Dihydrate, Sigma Prod. No. C-3881.)
E. 10 mM Sodium Hydroxide Solution-Standardized (NaOH) (Prepare 50 ml in cold deionized water using Sodium Hydroxide, Anhydrous, Sigma Stock No. 505-8. Standardize according to the ACS Reagent Procedure.)
F. 5 mM Calcium Chloride Solution (Prepare 25 ml in deionized water using Calcium Chloride, Dihydrate, Sigma Prod. No. C-3881.)
G. Lipase Enzyme Solution (Immediately before use, prepare a suspension containing 20,000-30,000 units/ml of Lipase in cold Reagent F.)
H. Olive oil-gum Arabic emulsion: Prepare by dissolving 16.5 grams of gum Arabic in 130 ml of reagent grade water. Once the material is in solution, dilute to a final volume of 165 ml with reagent grade water. Add 20 ml of reagent grade olive oil and 15 grams crushed ice. Blend the mixture in a Waring blender at low speed for 3 min and filter the emulsion through glass wool. Prepare fresh daily.

Enzyme:
Dissolve enzyme at a concentration of 1 mg/ml in reagent grade water. Further dilution is made in 5 mM Calcium Chloride.

Procedure:
The titration can be measured with a laboratory pH meter (a Corning pH meter 360i equipped with A-58905-66 High-performance combination pH electrode).

| Reagent | Volume (ml) |
|---|---|
| Deionized Water | 5.00 |
| Reagent H (Olive Oil) | 5.00 |
| Reagent B (NaCl) | 2.00 |
| Reagent C (Albumin) | 2.00 |
| Reagent D (CaCl2) | 1.00 |

Blank rate determination: Adjust the pH of the reaction mixture to 8.0 and record the volume of titrant required to maintain the pH at 8.0 for 3-4 minutes after a constant rate is achieved. Determine the "blank rate" as the volume of titrant added per minute from the final linear portion of the curve.

Sample determination: at zero time, add appropriately diluted enzyme and readjust the pH to 8.0 if necessary. Record the volume of titrant required to maintain the pH at 8.0 for 5-6 minutes. Determine the "sample rate" as the volume of titrant added per minute from the linear portion of the curve.

Calculations:

$$\text{Units}/\mu l \text{ enzyme} = \frac{(\text{sample-blank}) \times \text{normality of base} \times 1000}{\mu l \text{ enzyme in reaction mixture}}$$

REFERENCE (1993) *Reagent Chemicals ACS Specifications,* 8th ed. 95 Worthington, C. C (1988) in *Worthington Enzyme Manual* (Worthington, C. C. ed.) 212-214, Worthington Biochemical Corporation, Freehold, NJ Notes:
1 The standardization of NaOH solution is described in (1993) Reagent Chemicals ACS Specifications.
2 This assay is based on the cited references.
3 Where Sigma Product or Stock numbers are specified, equivalent reagents may be substituted.

TABLE 15

| | Lipase Activity Measured | | | |
|---|---|---|---|---|
| Acid Pre-treatment | Acid Pre-treat (g/15 ml)) | Acid Pre-treat (M) | pH of Acid pre-treat | Lipase activity (Units/µl |
| None (Water) | 0 | 0 | 7 | 6.69 |
| Lactic acid | 0.08 | 0.059 | 2.48 | 4.15 |
| Lactic acid | 0.04 | 0.030 | 2.57 | 5.8 |
| Acetic acid | 0.005 | 0.006 | 2.8 | 5.33 |
| Lactic acid | 0.02 | 0.015 | 2.85 | 6.45 |
| Hydrochloric | 0.02 | 0.036 | 1.5 | 0 |
| Antioxidant | | | | |
| Green tea extract | 0.04 | — | 6.36 | 5.77 |

Acid concentration is calculated:

Total dry weight acid/acid molecular weight=moles acid total water (15 ml)/1000=total water (L)

[acid conc.]=moles acid/liter water=molar concentration (M)

Summary

Each acid type, and concentration tested, decreased enzyme activity after a 40 min pre-treatment compared to control (no acid used in pre-treatment). Enzyme activity was observed to be lower after treatment at higher concentration of acid and at lower pH. Extremely low pH values, such as pH 1.5, resulted in complete loss of activity for the enzyme. Green tea extracts also inhibited the lipase activity.

Example 9

Effect of Anti-Oxidant Tempering on Whole Grain Flour Stability

The objective of this example was to test the effect of anti-oxidant tempering on the stability of whole grain flour during storage. The amount of free fatty acid formed was measured after flour storage in a sealed glass jar for 30 days under accelerated storage conditions of 82 F. Whole grain flour was prepared according to process described in examples 1 and 2. The antioxidants tested were: (1) soft red flour untreated (control); (2) soft red flour treated with cellulose; (3) soft red flour treated with NaCl; (4) soft red flour treated with TBHQ; (5) soft red flour treated with rosemary extract; (6) soft red flour treated with green tea extract; (7) soft red flour treated with lactic acid to pH 6.16; (8) soft red flour treated with phosphoric acid to pH 5.67; (9) soft red flour treated with phosphoric acid to pH 4.64; (10) soft red flour treated with hydrochloric acid to pH 5.55; (11) soft red flour treated with BHT in the manner described in Example 1. Tempered wheat was comminuted to flour in the manner described in Example 2. The amounts of free fatty acids formed in whole grain flour upon storage were compared to the amount of free fatty acids formed in untreated control flour. Whole grain flours were made with natural proportion of bran component and endosperm obtained from the flour mill. Whole grain flour ash content was used to confirm composition.

Free fatty acid content of whole grain flour (fresh flour and aged flour) was determined according to the method described in Example 3.

Table 16 contains the results of the total free fatty acids formed in whole grain flour after storage for up to 6 weeks at 82 F. Shown are: (1) treatment type (2) amount of treatment (3) lipase activity (4) pH (5) hexanal (6) free fatty acid concentration

TABLE 16

Effect of anti-oxidant treatment of wheat on whole grain flour FFA after aging

| | Amount of lipase inhibitor (dry WT acid/initial kernel weight) ppm) | [lipase inhibitor conc] (M) | Lipase activity (unit/g) | Flour pH | Lipase activity (unit/g) | 0 week FFA (ppm) | 6 weeks FFA (ppm) |
|---|---|---|---|---|---|---|---|
| Control | 0 | 0.00 | 379.2 | 6.6 | 154.6 | 828 | 4576 |
| Cellulose | 7000 | — | 389.1 | — | 225.8 | — | — |
| NaCl | 3000 | 5.13 | 371.1 | — | 209.5 | — | — |
| TBHQ | 200 | 0.12 | 171.5 | — | 137.6 | 739 | 3867 |
| Rosemary extract | 7000 | — | 290.1 | — | 104.1 | 1522.5 | 4216 |
| Green tea extract | 7000 | — | 216.9 | 6.5 | 117.6 | 709.5 | 3718 |
| Lactic acid | 3000 | 3.33 | 305.0 | 5.6 | 120.9 | 563 | 2496 |
| BHT | 200 | 0.09 | 360.1 | — | 164.3 | — | — |

Summary

Whole grain flour fatty acid content after storage at 82° F. was reduced compared to control when the wheat was treated with either green tea extract or lactic acid. Little reduction in free fatty content was noted for other treatments tested.

Example 10

Acid Treatment of Separated Bran

The objective of this example is to test the stabilization efficacy of acid treatment of separated bran. Water with lactic acid is added to bran and germ that is separated from the endosperm, either as coarse bran particles or after bran is ground to finer particles. After lactic acid is added, some of the samples are further stabilized by applying heat for 10 min at 90 C. The bran and germ are recombined to natural proportion of bran, germ and endosperm to make whole grain flour. Natural proportions were achieved by recombining the bran to 32%, and endosperm to 68%, of final flour weight. The whole grain flour is placed in a sealed container and stored at 100 F for 30 days. Lipase activity and free fatty acids formed in the flour are measured at the beginning and end of storage to assess the flour freshness and stability over time. Change to flour quality is measured by solvent retention capacity.

Material:

(1) Coarse Bran/germ separated from soft white wheat
(2) Coarse ground bran/germ
(3) Water or Lactic acid in water
(4) Endosperm Lipase is measured according to the method disclosed in example 2, fatty acids in flour are measured according to the method disclosed in example 3 and flour quality is measured according to the solvent retention capacity test disclosed in example 4.

Table 17 shows the flours generated by separating the bran and germ from the endosperm, and adding lactic acid dissolved in water to coarse or finely ground bran. The amount lactic acid added to the bran is indicated in the table. Where shown, the bran is also heat-treated for 10 min at 90 C after adding acid.

TABLE 17

Flours Produced

| WG Flour | % B&G Extracted during milling | Amount of lactic acid (acid, dwb/ final flour weight)ppm | total water added (g/100 g B&G) | Acid conc in water (M) | WG moisture | Heat 90° C. 10 min | Acid (moles/100 lb final flour) |
|---|---|---|---|---|---|---|---|
| WG flr, coarse bran | 32 | 0 | 6.25 | 0 | 14.126 | no | 0.0000 |
| WG flr, fine bran with 6.25 g water/100 g B&G | 32 | 0 | 6.25 | 0 | 13.488 | no | 0.0000 |
| WG flr, coarse bran, 6000 | 32 | 6000 | 6.25 | 3.33 | 13.638 | no | 3.0276 |
| WG flr, fine bran, 6000 with 6.25 g water/100 g B&G | 32 | 6000 | 6.25 | 3.33 | 13.588 | no | 3.0276 |
| WG flr, fine bran | 32 | 0 | 3.75 | 0 | 12.735 | no | 0.0000 |
| WG flr, fine bran, heat | 32 | 0 | 3.75 | 0 | 12.954 | yes | 0.0000 |
| WG flr, fine bran, 3000 | 32 | 3000 | 3.75 | 2.77 | 12.991 | no | 1.5138 |
| WG flr, fine bran, 3000 + heat | 32 | 3000 | 3.75 | 2.77 | 12.849 | yes | 1.5138 |
| WG flr, fine bran, 6000 with 3.75 g water/100 g B&G | 32 | 6000 | 3.75 | 5.55 | 12.742 | no | 3.0276 |
| WG flr, fine bran, 6000 + heat | 32 | 6000 | 3.75 | 5.55 | 12.959 | yes | 3.0276 |
| WG flr, fine bran, 10,000 | 32 | 10,000 | 3.75 | 9.25 | 12.298 | no | 5.0460 |
| WG flr, fine bran, 10,000 + heat | 32 | 10,000 | 3.75 | 9.25 | 12.112 | yes | 5.0460 |

Table 18 contains the results of the total free fatty acids formed in whole grain flour after storage for up to 30 days at 100 F. Shown are: (1) Flour (2) acid (dry wt/wt bran) (3) heat (4) % endosperm to make whole grain flour (5) Bran pH (6) particle size (9) Lipase activity (10) free fatty acid concentration, initial and 21 days (11) % inhibition of FFA formation in stored flour

TABLE 18

Stability of Whole Grain Flour made with Acid Treated or Acid + Heat-Moisture Treated Bran & Germ.

| | total water added (g/100 g B&G) | Amount of lactic Acid (acid, dwb/ final flour weight) ppm | Heat 90 C. 10 min | % wt flour endosperm | WG pH | Rotap thru 100 | Lipase Activity (units/g) | Initial FFA (ppm) | % lipase inhibition | FFA ppm 30 d 100 F. | % FFA Inhibition |
|---|---|---|---|---|---|---|---|---|---|---|---|
| WG flr, coarse bran | 6.25 | 0 | no | 68 | 5.86 | 41.66 | 215 | 1107 | 0 | 2551 | 0.00 |
| WG flr, fine bran with 6.25 g water/100 g B&G | 6.25 | 0 | no | 68 | 6.14 | 61.64 | 382 | 1309 | 0 | 5374 | 0.00 |
| WG flr, coarse bran, 6000 | 6.25 | 6000 | no | 68 | 4.23 | 42.12 | 174 | 1144 | 19.1 | 2077 | 18.58 |
| WG flr, fine bran, 6000 with 6.25 g water/100 g B&G | 6.25 | 6000 | no | 68 | 4.47 | 63.64 | 280 | 1218 | 26.7 | 3412 | 36.51 |
| WG flr, fine bran | 3.75 | 0 | no | 68 | 6.12 | 66.01 | 423 | 1319 | 0 | 5523 | 0.00 |
| WG flr, fine bran, heat | 3.75 | 0 | yes | 68 | 6.15 | 64.70 | 249 | 1299 | 41.13 | 5511 | 0.22 |

TABLE 18-continued

Stability of Whole Grain Flour made with Acid Treated or Acid + Heat-Moisture Treated Bran & Germ.

| | total water added (g/100 g B&G) | Amount of lactic Acid (acid, dwb/final flour weight) ppm | Heat 90 C. 10 min | % wt flour endosperm | WG pH | Rotap thru 100 | Lipase Activity (units/g) | Initial FFA (ppm) | % lipase inhibition | FFA ppm 30 d 100 F. | % FFA Inhibition |
|---|---|---|---|---|---|---|---|---|---|---|---|
| WG flr, fine bran, 3000 | 3.75 | 3000 | no | 68 | 5.04 | 63.86 | 325 | 1274 | 23.17 | 3847 | 30.35 |
| WG flr, fine bran, 3000 + heat | 3.75 | 3000 | yes | 68 | 5.07 | 62.68 | 222 | 1229 | 47.52 | 3689 | 33.21 |
| WG flr, fine bran, 6000 with 3.75 g water/100 g B&G | 3.75 | 6000 | no | 68 | 4.45 | 64.68 | 296 | 1227 | 30.02 | 3367 | 39.04 |
| WG flr, fine bran, 6000 + heat | 3.75 | 6000 | yes | 68 | 4.50 | 63.34 | 121 | 1167 | 71.39 | 2541 | 53.99 |
| WG flr, fine bran, 10,000 | 3.75 | 10,000 | no | 68 | 3.97 | 63.84 | 232 | 1146 | 45.15 | 2788 | 49.52 |
| WG flr, fine bran, 10,000 + heat | 3.75 | 10,000 | yes | 68 | 3.99 | 64.72 | 73 | 1140 | 82.74 | 1731 | 68.66 |

Solvent retention capacity testing of each flour during storage is used to assess the quality of the flour after each respective treatment. Especially important is the gluten strength of the flour as measured by maintenance of the lactic acid solvent retention indicating flour gluten remains functional. Overall flour absorption should remain low and unchanged from control values. Table 3 shows the SRC profile of each flour.

TABLE 19

Solvent Retention Capacity test

| | water | Sucrose | Sodium carbonate | Lactic acid | Ash (14% base) |
|---|---|---|---|---|---|
| WG flr, coarse bran | 60.36 | 65.66 | 68.89 | 64.12 | 1.33 |
| WG flr, fine bran with 6.25 g water/100 g B&G | 64.97 | 73.36 | 76.21 | 70.89 | 1.48 |
| WG flr, coarse bran, 6000 | 57.94 | 66.13 | 67.94 | 63.20 | 1.18 |
| WG flr, fine bran, 6000 with 6.25 g water/100 g B&G | 60.05 | 68.81 | 75.45 | 67.81 | 1.38 |
| WG flr, fine bran | 65.88 | 74.10 | 77.93 | 67.46 | 1.44 |
| WG flr, fine bran, heat | 64.71 | 73.63 | 79.97 | 67.33 | 1.42 |
| WG flr, fine bran, 3000 | 61.96 | 70.15 | 75.82 | 66.59 | 1.39 |
| WG flr, fine bran, 3000 + heat | 61.38 | 70.50 | 77.12 | 65.12 | 1.42 |
| WG flr, fine bran, 6000 with 3.75 g water/100 g B&G | 61.82 | 71.12 | 74.53 | 66.11 | 1.35 |
| WG flr, fine bran, 6000 + heat | 60.85 | 70.14 | 76.36 | 65.68 | 1.46 |
| WG flr, fine bran, 10,000 | 62.59 | 70.68 | 76.72 | 66.23 | 1.45 |
| WG flr, fine bran, 10,000 + heat | 63.71 | 69.44 | 75.96 | 65.60 | 1.39 |

Summary

Acid treatment of bran and germ enhanced conventional methods of stabilization, like heat treatment. The lipase activity, 141 units/g and free fatty acid formed of 1127 ppm in flour, made from bran that was both acid and heat treated, are lower than untreated control, 282 units/g and 3941 ppm and unexpectedly lower than bran stabilized with only heat treatment (201 units/g and 3014 ppm). The enhanced stabilization benefit of acid treatment combined with heat treatment enables lower lipase activity and lower free fatty acids formed during storage that can't be achieve by either acid treatment or heat treatment alone. There is significant synergistic effect of acid plus heat stabilization which reduced free fatty acid formed by 71.40% compared to only 23.5% free fatty acid reduction with heat treatment alone or only 37.66% reduction with acid treatment alone.

Example 11

Synergistic Effect of Non-Heat Stabilization and Heat Stabilization

The objective of this example was to identify the synergy between non-heat and heat stabilization on WG flour shelf life.

Material:

(1) Whole Grain Milling Trial:

Wheat kernels were tempered with/without lactic acid (6000 ppm), for the typical 4 hours with 2% tempering water.

Tempered SWW whole grain wheat flour control: 160 kg water was used for 8000 kg whole grain wheat Tempered SWW whole grain flour with lactic acid: 76.72 kg water and 27.28 kg lactic acid was used for 4000 kg whole grain wheat.

After 4 hour tempering, the wheat was milled in a flour mill. Bran and germ with/without lactic acid was collected, endosperm with/without lactic acid was also collected.

(2) Bran and Germ Heat/Moisture Stabilization in the Lab.

30 g B&G without lactic acid was packed in a foil bag (7 inch×6.5 inch) with 9 holes, then the bag was heated at 140° C. for 10 min.

30 g B&G with lactic acid was packed in a foil bag (7 inch×6.5 inch) with 9 holes, then the bag was heated at 140° C. for 10 min.

The whole grain flour reconstitution is shown in Table 20:

TABLE 20

| Whole Grain (WG) Flour Reconstitution | | |
|---|---|---|
| WG Flour | 24% of Bran and Germ | 76% of Endosperm |
| Control made with no treatment B&G | Bran and gem without lactic acid without heat | Endosperm without lactic acid without heat |
| WG Flour made with Heat treated B&G | Bran and gem without lactic acid with heat | Endosperm without lactic acid without heat |
| WG Flour made with Acid treated B&G | Bran and gem with lactic acid without heat | Endosperm with lactic acid without heat |
| WG Flour made with both acid + heat-treated B&G | Bran and gem with lactic acid with heat | Endosperm with lactic acid without heat |

The free fatty acid (FFA) content and lipase activity of the whole grain flours (fresh flour and 33 days aged flour) that were prepared were analyzed according to the method disclosed in Example 4, and the results are shown in Table 21. The particle size distribution of the flours is shown in Table 22:

TABLE 21

| Stabilization: acid + heat | | | | | | | | | |
|---|---|---|---|---|---|---|---|---|---|
| | Amount of lactic Acid (dry WT acid/initial kernel weight) ppm | Temper Time (min) | Temper Water Level (%) | [acid conc] (M) | Added Water (g) Per 1000 g wheat | Amt 0.885 Lactic (g) Per 1000 g wheat | Acid (moles/ 100 lb final flour) | % B&G Extracted during milling | B&G moist % |
| Control made with no treatment B&G | 0 | 240 min | 2 | 0 | 20 | 0 | 0 | 23 | 5.75 |
| WG Flour made with Heat treated B&G | 0 | 240 min | 2 | 0 | 20 | 0 | 0 | 22.82 | 5.07 |
| WG Flour made with Acid treated B&G | 6000 | 240 min | 2 | 3.49 | 19.18 | 6.82 | 3.04 | 23 | 4.65 |
| WG Flour made with both acid + heat-treated B&G | 6000 | 240 min | 2 | 3.49 | 19.18 | 6.82 | 3.04 | 22.92 | 4.32 |

| | Heat-treatment (temp/time) | wt flour endosperm | wt flour B&G | Lipase Activity (units/g) | Initial FFA (ppm) | FFA; 33 day at 100 F. (ppm) | % Inhibition | pH of WG |
|---|---|---|---|---|---|---|---|---|
| Control made with no treatment B&G | 0 | 82.76 | 38.55 | 282 | 628 | 3941 | 0 | 6.27 |
| WG Flour made with Heat treated B&G | 140 C., 10 min | 82.76 | 38.27 | 201 | 610 | 3014 | 23.52 | 6.25 |
| WG Flour made with Acid treated B&G | 0 | 82.76 | 38.1 | 241 | 579 | 2457 | 37.66 | 4.85 |
| WG Flour made with both acid + heat- | 140 C., 10 min | 82.76 | 37.97 | 141 | 655 | 1127 | 71.4 | 4.89 |

TABLE 21-continued

Stabilization: acid + heat treated
B&G

TABLE 22

Flour Particle Size

| | WG Flour MBAsh | Rotap +40 | Rotap +50 | Rotap +60 | Rotap +70 | Rotap +80 | Rotap +100 | Rotap through 100 | Total |
|---|---|---|---|---|---|---|---|---|---|
| Control made with no treatment B&G | 1.88 | 0.18 | 2.22 | 2.3 | 1.4 | 2.22 | 2.46 | 88.78 | 99.56 |
| WG Flour made with Heat treated B&G | 1.87 | 0.16 | 2.44 | 2.48 | 1.62 | 2.54 | 3.84 | 87.3 | 100.38 |
| WG Flour made with Acid treated B&G | 1.84 | 0.04 | 2 | 2.22 | 1.62 | 2.26 | 2.64 | 88.24 | 99.02 |
| WG Flour made with both acid + heat-treated B&G | 1.84 | 0.08 | 2.52 | 2.52 | 1.72 | 2.48 | 3.06 | 86.52 | 98.9 |

Summary

As shown in Tables 20-22:

Lactic Acid (LA) treated whole grain flour (WG) with heat stabilization reduced the lipase activity from 241 to 141 units/g compared with LA treated WG without heat stabilization.

LA treated WG with heat stabilization reduced the free fatty acids (FFA) from 2457 to 1127 ppm compared with LA treated WG without heat stabilization.

There is a significant synergistic effect (71.40% inhibition) between non-heat and heat stabilization (23.5%±37.66% combination inhibition).

Example 12

In this example sensory attributes of a heat stabilized whole grain wheat flour control, whole grain wheat flours stabilized using both heat stabilization and lactic acid as a lipase inhibitor in accordance with the present invention, and low fat biscuits or graham crackers, made with the stabilized flours were evaluated by an expert taste panel. The stabilized whole grain wheat flours used were 58 days old when the biscuits were made, and the biscuits were aged for six weeks before being evaluated for their sensory attributes. Flour free fatty acids (FFA) at 102° F. were determined at day 0, and at days 30, 45, and 60.

Each of the heat stabilized whole grain wheat flour samples or runs evaluated had about the same particle size distribution. The heat stabilization for each sample was conducted similarly using a heat stabilization temperature of 188° F. for the control sample and also for the samples produced using both heat stabilization and lactic acid. The bran hydration levels used in the stabilization were 4.5% by weight, and 7.5% by weight. The amount of lactic acid employed in the stabilization was 0 for the control sample, and 3000 ppm and 6000 ppm, based upon the weight of the whole grain flour for samples of the present invention. The stabilized whole grain wheat flours evaluated are shown in Table 23:

TABLE 23

Stabilized Whole Grain Wheat Flour Samples Evaluated

| Sample (Run) | Flour Age (days) | Bran Hydration Level (wt %) | Lactic Acid (ppm) | Stabilization Temperature (° F.) | Stabilization Type |
|---|---|---|---|---|---|
| 1 (Control) | 58 | 7.5 | 0 | 188 | Heat Only |
| 2 | 58 | 7.5 | 6,000 | 188 | Heat + Non-Heat |
| 3 | 58 | 7.5 | 3,000 | 188 | Heat + Non-Heat |
| 4 | 58 | 4.5 | 6,000 | 188 | Heat + Non-Heat |
| 5 | 58 | 4.5 | 3,000 | 188 | Heat + Non-Heat |

Each dough employed to produce the biscuits contained the same amount of stabilized whole grain wheat flour which was about 57% by weight based upon the weight of the dough, and the same amounts of sucrose, oil, salt, non-fat dry milk solids, high fructose corn syrup, ammonium bicarbonate, sodium bicarbonate, and water. The doughs were produced by mixing the ingredients in a jacketed farinograph-like mixing bowl and blade, the doughs were sheeted, laminated and cut into pieces, and baked to obtain biscuits with a moisture content of 3.5% by weight.

Sensory Attribute Evaluation Methodology

A descriptive panel (n=12) evaluated the products. Panelists were selected based on their sensory acuity and descriptive ability. They developed a vocabulary to describe the characteristics of the samples across all modalities through moderated discussion sessions.

The samples were evaluated by the panelists, individually, using the vocabulary they created. The samples were presented blind and in a balanced design to minimize bias due to presentation order. Each panelist evaluated all products for all attributes three times.

The data were collected using a web-based data collection system (Compusense at Hand, Canada). The unstructured line scale used for evaluation was electronically converted to a 100-point scale for analysis.

Attributes and Definitions Used to Evaluate the Sample Set

The sensory attributes, attribute definitions, and judge or panelist instructions for making the sensory attribute evaluations are shown in Table 24:

TABLE 24

Sensory Attributes, Attribute Definitions and Judge Instructions

| ATTRIBUTE | DEFINITION |
|---|---|
| Aroma - Judge Instructions: Lift the sample to the nose and evaluate the following aroma attributes: | |
| Flour (Weak-Strong) | The intensity of a flour aroma, reminiscent of a bag of white flour that has been opened. |

TABLE 24-continued

Sensory Attributes, Attribute Definitions and Judge Instructions

| ATTRIBUTE | DEFINITION |
|---|---|
| Flavor - Judge Instructions: Take 1 bite, about ⅓ of a rectangle, at a time, chew, and evaluate the following flavor attributes: | |
| Sweet (Weak-Strong) | The intensity of a sweet taste in the mouth, reminiscent of confectioners' sugar. |
| Cinnamon (Weak-Strong) | The intensity of a cinnamon flavor, reminiscent of McCormick ground cinnamon, or Cinnamon Teddy Grahams. |
| Aftertaste/Aftereffect - Judge Instructions: Take a bite of the cracker, chew and swallow. Wait 15 seconds after swallowing to evaluate the following aftertaste/aftereffect attributes: | |
| Baked/Toasted (Weak-Strong) | The intensity of a baked/toasted aftertaste. A weak baked/toasted aftertaste is reminiscent of the lightly baked crust of Italian bread. A strong baked/toasted aftertaste is reminiscent of darkly toasted bread. |
| Vanilla (Weak-Strong) | The intensity of a vanilla aftertaste, reminiscent of the vanilla note in yellow cake mix.. |
| Honey (Weak-Strong) | The intensity of a honey aftertaste, reminiscent of the honey aftertaste in Honey Teddy Grahams. |
| Sticks to Teeth (Slightly-Very) | The measure of how much the cracker is still stuck to the teeth and/or mouth. |
| Amount of Particulates (a little-a lot) | The measure of the amount of particles, or crumbs, felt lingering in the mouth. |

The sensory attribute means for the aroma, flavor, and aftertaste/aftereffect characteristics of the biscuit samples over their shelf life are shown in Table 25:

TABLE 25

Sensory Attribute Means for Aroma, Flavor, and Aftertaste/Aftereffect Characteristics of Biscuits over Shelf-life

| Sample ID and Attribute | Sample (Run) 1 (Control) | Sample (Run) 2 | Sample (Run) 3 | Sample (Run) 4 | Sample (Run) 5 |
|---|---|---|---|---|---|
| Flour Age (Days) | 58 | 58 | 58 | 58 | 58 |
| Bran Hydration Level (wt. %) | 7.5 | 7.5 | 7.5 | 4.5 | 4.5 |
| Lactic Acid Level (ppm) | 0 | 6,000 | 3,000 | 6,000 | 3,000 |
| Product Age (weeks) | 6 | 6 | 6 | 6 | 6 |
| Flour Aroma | 9.62 | 8.94 | 8.64 | 8.49 | 8.52 |
| Sweet Flavor | 29.91 | 32.30 | 33.41 | 33.14 | 32.08 |
| Cinnamon Flavor | 9.47 | 12.68 | 11.21 | 11.45 | 11.43 |
| Baked Toasted Aftertaste | 30.42 | 32.15 | 34.02 | 33.39 | 38.69 |
| Vanilla Aftertaste | 16.95 | 19.38 | 16.51 | 18.90 | 15.52 |
| Honey Aftertaste | 22.96 | 23.59 | 23.16 | 25.77 | 20.77 |
| Sticks to Teeth Aftereffect | 53.82 | 51.81 | 51.46 | 50.90 | 51.57 |
| Amount of Particles Aftereffect | 36.98 | 31.04 | 35.99 | 35.38 | 34.47 |
| FFA at Day 0 | 895 | 939 | 849 | 960 | 854 |
| FFA at Day 30 | 2391 | 2023 | 1779 | 1640 | 1766 |
| FFA at Day 45 | 2862 | 2346 | 2127 | 1986 | 2190 |
| FFA at Day 60 | 3384 | 2571 | 2791 | 2237 | 2386 |

Discussion of Results

As shown in Table 25, the whole grain flour which was stabilized using both lactic acid treatment and low heat (188° F.) resulted in baked goods with greater retention of sweet flavor of at least 32.08 scale units (Runs 2, 3, 4, and 5) compared to a score of 29.91 scale units (Run 1) for the control which used whole grain flour stabilized with only low heat stabilization (188° F.) and no lactic acid treatment, for an increase in sweet flavor score of at least 7.2%.

Also, as shown in Table 25, the whole grain flour which was stabilized using both lactic acid treatment and low beat (188° F.) resulted in baked goods with greater retention of cinnamon flavor of at least 11.21 scale units (Runs 2, 3, 4, and 5) compared to a score of 9.47 scale units (Run 1) for the control which used whole grain flour stabilized with only low heat stabilization (188° F.) and no lactic acid treatment, for an increase in cinnamon flavor score of at least 18.3%.

The negative attribute of raw flour aroma, as shown in Table 25 remained lower at maximum 9 scale units of 8.94 (Runs 2, 3, 4, and 5) compared to the control which scored 9.62 scale units (Run 1) for a decrease in flour aroma score of at least 7%.

Compared with run number 1 (without lactic acid; served as control), all the samples with lactic acid (Runs 2, 3, 4, and 5) have low raw flour aroma, higher sweet flavor, higher cinnamon flavor, higher baked toasted aftertaste, less stickiness to teeth and less amount of particulates after-effects.

Compared with run number 1 (without lactic acid; served as control): a) samples produced using 6000 ppm lactic acid (Runs 2 and 4), but not 3000 ppm lactic acid (Runs 3 and 5) have higher vanilla aftertaste, and b) all samples (Runs 2, 3, and 4) with lactic acid have higher honey aftertaste except for the sample (Run 5) produced using 3000 ppm lactic acid and 4.5% bran hydration.

The use of both lactic acid treatment and low heat treatment to stabilize whole grain wheat flour extends freshness of the whole grain flour and products containing it, as measured by free fatty acids (FFA) formed in flour over storage, and flavor retention in product made with aged flour compared to the freshness of the control whole grain flour stabilized without lactic acid treatment, and the flavor retention of products containing the control flour, as demonstrated in Table 25.

What is claimed is:

1. A method for producing stabilized flour, the method comprising:
milling whole grains to obtain a bran and germ fraction and an endosperm fraction,
treating the bran and germ fraction with an aqueous solution of a lipase inhibitor comprising lactic acid to hydrate the bran and germ fraction and inhibit lipase in the bran and germ fraction to form a treated bran and germ fraction;
combining the treated bran and germ fraction with the endosperm fraction to obtain a stabilized whole grain flour having a pH of 4.4 to 5.8 and comprising about 2.0 moles to about 5.0 moles of the lipase inhibitor per 100 lbs of stabilized whole grain flour, and having a free fatty acid content of less than about 4200 ppm when stored at 100° F. for 30 days,
wherein the concentration of the lipase inhibitor during treatment is from about 3 molar to about 7 molar, and the amount of the lipase inhibitor during treatment is from about 2.0 moles to about 5.0 moles of the lipase inhibitor per 100 lbs of the whole grains, and the lipase inhibitor is absorbed by the bran and germ fraction during treatment and is retained in the bran and germ fraction in the stabilized whole grain flour.

2. The method as claimed in claim 1, wherein the lipase inhibitor treatment is conducted at a temperature of less than 38° C.

3. The method as claimed in claim 1, wherein the lipase inhibitor treatment is conducted at a temperature of less than or equal to 98° C.

4. The method as claimed in claim 1, wherein the lipase inhibitor treatment is conducted at a temperature of 80° ° C. to 98° C.

5. The method as claimed in claim 1, wherein the lipase inhibitor treatment is conducted without the application of heat.

6. The method as claimed in claim 1, further comprising tempering the whole grains prior to milling.

7. The method as claimed in claim 1, wherein the lipase inhibitor treatment comprises spraying the lipase inhibitor onto the bran and germ in a hydrator to obtain the treated bran and germ fraction.

8. The method as claimed in claim 1, wherein the lipase inhibitor treatment comprises admixing the lipase inhibitor with the bran and germ fraction in a hydrator to obtain the treated bran and germ fraction.

9. The method as claimed in claim 1, wherein the lipase inhibitor treatment comprises soaking the bran and germ fraction in the lipase inhibitor to obtain the treated bran and germ fraction.

10. The method as claimed in claim 1, further comprising subjecting the treated bran and germ fraction to a heating treatment to further inhibit lipase in the bran and germ fraction prior combining the treated bran and germ fraction with the endosperm fraction, wherein the lipase inhibitor treatment reversibly inhibits lipase, and the heating treatment irreversibly inhibits lipase.

11. The method as claimed in claim 10, wherein the heating treatment is conducted at a temperature of less than 98° C.

12. The method as claimed in claim 10, wherein the heating treatment is conducted at a temperature of from 80° C. to 98° C.

13. The method as claimed in claim 10, wherein the heating treatment is conducted at a temperature of from 100° C. to 140° C.

14. The method as claimed in claim 10, wherein the heating treatment is conducted without the application of steam.

15. The method as claimed in claim 1, wherein the free fatty acid content of the stabilized whole grain flour is reduced to less than 3,000 ppm when stored at 100° F. for 30 days.

16. The method as claimed in claim 1, wherein the stabilized whole grain flour has a degree of starch gelatinization of less than about 25%, as measured by differential scanning calorimetry (DSC), a lactic acid solvent retention capacity (SRC lactic acid) of greater than or equal to 65%, and a ratio of lactic acid SRC to sodium carbonate-water solvent retention capacity (SRC sodium carbonate) of greater than 1.

17. The method as claimed in claim 1, wherein the stabilized flour has a hexanal content of less than about 10 ppm after 1 month storage at 95° C., based upon the weight of the stabilized whole grain flour.

18. The method as claimed in claim 1, wherein the stabilized flour has an Aerobic Plate Count (APC) of less than 150 CFU/g, and a heat resistant spore count of less than 75 CFU/g.

* * * * *